(12) United States Patent
Zhang et al.

(10) Patent No.: US 11,705,029 B1
(45) Date of Patent: Jul. 18, 2023

(54) CURVED DISPLAY PANEL COLOR AND BRIGHTNESS CALIBRATION SYSTEMS AND METHODS

(71) Applicant: Apple Inc., Cupertino, CA (US)

(72) Inventors: Sheng Zhang, San Jose, CA (US); Shengchang Cai, Sunnyvale, CA (US); ByoungSuk Kim, Palo Alto, CA (US); Yi Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/003,660

(22) Filed: Aug. 26, 2020

Related U.S. Application Data

(60) Provisional application No. 62/898,524, filed on Sep. 10, 2019.

(51) Int. Cl.
| | | |
|---|---|---|
| *G09G 3/00* | (2006.01) | |
| *G09G 5/10* | (2006.01) | |
| *G06T 7/00* | (2017.01) | |
| *G09G 3/20* | (2006.01) | |
| G09G 3/3208 | (2016.01) | |

(52) U.S. Cl.
CPC ............... *G09G 3/035* (2020.08); *G06T 7/97* (2017.01); *G09G 3/2003* (2013.01); *G09G 5/10* (2013.01); *G09G 3/3208* (2013.01); *G09G 2320/029* (2013.01); *G09G 2320/0233* (2013.01); *G09G 2320/0242* (2013.01); *G09G 2320/0646* (2013.01); *G09G 2320/0693* (2013.01); *G09G 2330/00* (2013.01); *G09G 2360/141* (2013.01); *G09G 2360/145* (2013.01)

(58) Field of Classification Search
None
See application file for complete search history.

(56) References Cited

U.S. PATENT DOCUMENTS

| | | | | |
|---|---|---|---|---|
| 2013/0162611 A1* | 6/2013 | Lim | ........................ | G09G 5/10 345/207 |
| 2015/0286457 A1* | 10/2015 | Kim | ..................... | G02B 3/0037 345/581 |
| 2016/0078592 A1* | 3/2016 | Kim | ........................ | G09G 5/363 345/619 |
| 2016/0202758 A1* | 7/2016 | Peana | ..................... | G06F 3/013 345/601 |
| 2016/0210901 A1* | 7/2016 | Cha | ........................ | G09G 3/03 |
| 2020/0066219 A1* | 2/2020 | Hsu | ........................ | G09G 3/006 |
| 2020/0294469 A1* | 9/2020 | Kim | ........................ | G09G 5/10 |

* cited by examiner

*Primary Examiner* — Amr A Awad
*Assistant Examiner* — Donna V Bocar
(74) *Attorney, Agent, or Firm* — Fletcher Yoder, P.C.

(57) ABSTRACT

Systems and methods are provided to compensate image data for display on a curved display. A pixel uniformity compensation factor may be applied based on a pixel uniformity compensation factor map that is calibrated to the display panel while the display panel has a flat shape, and a panel curvature compensation factor may be applied when the image content is to be displayed while the display panel has a curved shape. The panel curvature compensation factor may be based on a panel curvature compensation factor map that is calibrated to the display panel after the display panel is bent from the flat shape to the curved shape.

16 Claims, 15 Drawing Sheets

CURVED DISPLAY PANEL COLOR AND BRIGHTNESS CALIBRATION SYSTEMS AND METHODS

CROSS-REFERENCE TO RELATED APPLICATIONS

This application claims priority to and the benefit of U.S. Provisional Application No. 62/898,524, filed Sep. 10, 2019, and entitled, "CURVED DISPLAY PANEL COLOR AND BRIGHTNESS CALIBRATION SYSTEMS AND METHODS," which is incorporated herein by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to electronic displays, which may be implemented and/or operated to display one or more images (e.g., image frames and/or pictures) that present a visual representation of information. Accordingly, electronic devices, such as computers, mobile phones, portable media devices, tablets, televisions, virtual-reality headsets, and vehicle dashboards, among many others, often include and/or utilize one or more electronic displays. In any case, an electronic display may generally display image content by actively controlling light emission from display pixels, which each includes one or more color component sub-pixels, implemented on its display panel. For example, a display pixel may include one or more red sub-pixels that control magnitude of red light emission from the display pixel, one or more blue sub-pixels that control magnitude of blue light emission from the display pixel, one or more green sub-pixels that control magnitude of green light emission from the display pixel, one or more white sub-pixels that control magnitude of white light emission from the display pixel, or any combination thereof.

Generally, the magnitude of light emission from a display pixel (e.g., color component sub-pixel) varies with the amount of electrical energy stored therein. For example, in some instances, a display pixel may include a light emissive element, such as an organic light-emitting diode (OLED), that varies its light emission with current flowing therethrough, a current control switching device (e.g., transistor) coupled between the light emissive element and a pixel power (e.g., VDD) supply rail, and a storage capacitor coupled to a control (e.g., gate) terminal of the current control switching device at an internal node of the display pixel. As such, varying the amount of electrical energy stored in the storage capacitor may vary voltage applied to the control input of the current control switching device and, thus, the magnitude of electrical current supplied from the pixel power supply rail to the light emissive element. In other words, at least in such instances, the light emission response (e.g., magnitude) of a display pixel may be controlled at least in part by controlling the magnitude of electrical power (e.g., voltage and/or current) supplied to its internal node.

It should be appreciated that the OLED examples described in the present disclosure are merely intended to be illustrative and not limiting. In particular, it should be appreciated that the techniques described in the present disclosure may be applied to and/or implemented for other types of display panels. For example, the techniques may be adapted to a liquid crystal display (LCD) that uses a pixel electrode and a common electrode as a storage capacitor.

Generally, a display panel may be implemented such that each of its display pixels is capable of producing at least a range of light emission magnitudes from a pixel lower limit (e.g., minimum light emission magnitude and/or zero nits) to a pixel upper limit (e.g., maximum light emission magnitude and/or non-zero nits). Additionally, at least in some instances, a display panel may be implemented to selectively operate using one of multiple different panel brightness settings including a highest (e.g., brightest) panel brightness setting, which enables utilization of the full range of light emission magnitudes by default (e.g., for display of standard dynamic range (SDR) image content), and one or more lower (e.g., dimmer and/or darker) panel brightness settings, which each enables utilization of a different sub-range of the light emission magnitudes by default. For example, while in a first lower brightness setting, the display panel may display standard dynamic range image content using a first range (e.g., sub-range) of light emission magnitudes from the pixel lower limit to a first brightness setting upper limit, which is less (e.g., dimmer and/or darker) than the pixel upper limit, while in a second lower brightness setting, the display panel may display standard dynamic range image content using a second range of light emission magnitudes from the pixel lower limit to a second brightness setting upper limit, which is less than the first brightness setting upper limit, and so on.

Additionally, image data (e.g., image pixel) corresponding with a display pixel on a display panel may be indicative of target characteristics (e.g., color and/or magnitude) of light emission therefrom, for example, by indicating one or more target achromatic brightness (e.g., grayscale) levels (e.g., values) that are mapped to a light emission magnitude range associated with a panel brightness setting used to display corresponding image content on the display panel. Merely as an illustrative non-limiting example, 8-bit fixed point image data may be used to indicate a target grayscale level in a grayscale level range from zero (e.g., black or minimum grayscale level) to two hundred fifty-five (e.g., white or maximum grayscale level) irrespective of panel brightness setting. In other words, a target grayscale level of zero may be indicative of a target light emission magnitude that matches a pixel lower limit, a target grayscale level of two hundred fifty-five may be indicative of a target light emission magnitude that matches a panel brightness setting upper limit (e.g., pixel upper limit), and a target grayscale level between zero and two hundred fifty-five may be indicative of a target light emission magnitude between the pixel lower limit and the panel brightness setting upper limit, for example, in accordance with a gamma function calibrated for the display panel.

As described above, a display pixel may include one or more color component sub-pixels, which are each implemented and/or operated to control light emission of a specific color. For example, a display pixel may include a red sub-pixel that controls magnitude of red light emission from the display pixel, a green sub-pixel that controls magnitude of green light emission from the display pixel, a blue sub-pixel that controls magnitude of blue light emission from the display pixel, a white component sub-pixel that controls magnitude of white light emission from the display pixel, or any combination thereof. As such, in some instances, the corresponding image data may include red component image data indicative of target magnitude of red light emission from the display pixel, green component image data indicative of target magnitude of green light emission from the display pixel, blue component image data indicative of target magnitude of blue light emission from the display pixel, white component image data indicative of target magnitude of white light emission from the display pixel, or any combination thereof. Accordingly, to display image content, a display panel may adaptively control magnitude of analog electrical signals supplied to its display pixels and, thus, resulting light emission from its display pixel based at least in part on corresponding image data.

However, at least in some instances, different display pixels may exhibit varying light emission responses to the same analog electrical signal. In particular, at least in some instances, display pixels implemented on different types of display panels may exhibit varying light emission responses, for example, due to display pixels and/or driver circuitry for different types of display panels being implemented and/or organized differently. Moreover, at least in some instances, a display pixel may exhibit varying light emission responses under different operating conditions, such as pixel temperature, pixel age (e.g., burn-in), backlight brightness, panel brightness setting, or any combination thereof. For example, as a display pixel ages with use (e.g., operation), its internal resistance may gradually increase, thereby resulting in burn-in that affects (e.g., reduces) magnitude of electrical energy stored therein and, thus, resulting light emission. In other words, supplying an analog electrical signal to an older display pixel may result in less light emission compared to supplying the same analog electrical signal to a newer (e.g., younger) display pixel.

In fact, at least in some instances, color component sub-pixels in a display pixel may exhibit differing light emission responses under the same set of operating conditions. For example, pixel temperature may affect a first color component sub-pixel in the display pixel differently compared to a second color component sub-pixel in the display pixel, thereby producing a color shift that affects white point of light emission from the display pixel. When perceivable, a difference between actual light emission magnitude and target light emission magnitude of a display pixel may result in a perceivable visual artifact occurring in displayed image content, which affects (e.g., reduces) perceived quality of the displayed image content and, thus, potentially a display panel and/or an electronic device displaying the image content.

To facilitate improving perceived image quality, in some instances, an electronic device may include image processing circuitry implemented and/or operated to process image data based at least in part on compensation parameters before processed image data is used to display corresponding image content on a display panel. For example, to facilitate compensating (e.g., correcting) for color shift, the image processing circuitry may process image data based at least in part on white point compensation (WPC) parameters. Additionally or alternatively, to facilitate compensating for pixel aging, the image processing circuitry may process image data based at least in part on burn-in compensation (BIC) parameters.

Since light emission response may vary between different types of display panels and/or under different operating conditions, in some instances, at least a portion of the compensation parameters may be calibrated (e.g., tuned) to a specific type of display panel under multiple different sets of operating conditions. When calibrated in this manner, processing image data based at least in part on the compensation parameters calibrated for a specific display panel type may result in actual light emission magnitude used to display corresponding image content on a display panel of the specific type on average matching target light emission magnitude. However, due to manufacturing tolerances, light emission response of different display pixels implemented on the same type of display panel may nevertheless differ.

In fact, due to manufacturing tolerances, light emission response of display pixels implemented on the same display panel may nevertheless vary. For example, a display panel may include a first display pixel and a second display pixel both manufactured (e.g., implemented) in accordance with manufacturing tolerances. By supplying analog electrical signals to the first display pixel and the second display pixel based on image data processed using properly calibrated compensation parameters, an average of actual light emission from the first display pixel and actual light emission from the second display pixel may match a target light emission indicated via the image data. However, due to slight implementation differences that are still within the manufacturing tolerances, internal impedance of the first display pixel may be greater than internal impedance of the second display pixel, thereby resulting in the second display pixel emitting more light than the first display pixel in response to supply of analog electrical signals with the same magnitude. In other words, at least in some instances, non-uniformity of display pixels implemented on a display panel may nevertheless affect perceived quality of displayed image content and, thus, potentially a display panel and/or an electronic device displaying the image content.

As such, to facilitate further improving perceived image quality, image processing circuitry in an electronic device may be implemented and/or operated to process image data to perform pixel uniformity compensation (PUC). At least in some instances, the image processing circuitry may perform pixel uniformity compensation based at least in part on pixel uniformity compensation parameters after performing upstream (e.g., white point and/or burn-in) compensation based at least in part on calibrated upstream compensation parameters, for example, to facilitate maintaining a target white point produced by the upstream white point compensation. To facilitate compensating for light emission response non-uniformity, the pixel uniformity compensation parameters may include a pixel uniformity compensation factor map that explicitly associates (e.g., maps) each of one or more pixel positions on a display panel to a pixel uniformity compensation factor (e.g., offset value and/or gain value) to be applied to image data corresponding with a display pixel at the pixel position.

In other words, at least in some instances, the pixel uniformity compensation parameters may enable independently controllable and, thus, potentially differing pixel uniformity compensation factors to be applied to image data corresponding with different pixel positions on a display panel, which, at least in some instances, may facilitate reducing perceivability of pixel non-uniformity. To help illustrate, continuing with the above example, the image processing circuitry may apply a pixel uniformity compensation factor to first image data corresponding with the first display pixel to boost (e.g., increase) a first target grayscale level indicated in the first image data relative to a second target grayscale level indicated in the second image data to facilitate compensating for the higher internal impedance of the first display pixel. In this manner, processing image data to perform pixel uniformity compensation may facilitate bringing actual light emission of individual display pixels closer to corresponding target light emissions, which, at least in some instances, may facilitate further improving perceived image quality provided by a display panel.

Generally, light emitted (e.g., output) from a light source, such as a display pixel, radiates outwardly from the light source, for example, in a conical shape. As such, magnitude of light emission from a display pixel is generally strongest (e.g., highest and/or brightest) along a normal axis of the display pixel and weakens (e.g., dims) as viewing (e.g., perception) angle moves away from the normal axis. Moreover, at least in some instances, a portion of light emitted from a display pixel may not actually be perceived by a user's eye. As such, to facilitate improving perceived image quality, a target grayscale level of a display pixel indicated in corresponding image data may be set (e.g., generated) such that resulting light emission is expected to produce an actual perceived luminance at a corresponding pixel position that matches a corresponding target perceived luminance.

In fact, at least in some instances, the portion of light emitted from a display pixel that is actually perceived and, thus, perceived luminance at a corresponding pixel position may vary with viewing angle. On a flat display panel, the display pixels may be implemented such that their normal axes are each oriented (e.g., point) in the same direction (e.g., orientation), which generally results in perceived luminance of each display pixel being affected by the same (e.g., a uniform) viewing angle. Thus, at least in some instances, bringing actual light emission magnitude of a display pixel on a flat display panel closer to its target light emission magnitude may facilitate bringing actual perceived luminance at a corresponding pixel position closer to its target perceived luminance and, thus, improving perceived image quality provided by the flat display panel and/or an electronic device using the flat display panel to display image content.

However, in some instances, an electronic device may additionally or alternatively display image content using a curved display panel, which may result in the same light emission magnitudes producing different perceived luminances, for example, due to curvature of the curved display panel resulting in different display pixels being concurrently perceived from different viewing angles. In some embodiments, a curved display panel may be implemented with a concave shape such that side portions of the curved display panel extend out from the electronic device farther than a central (e.g., middle) portion of the curved display panel. In other embodiments, a curved display panel may be implemented with a convex shape such that a central portion of the curved display panel extends out from the electronic device farther than side portions of the curved display panel. For example, a convex display panel may be curved about (e.g., relative to) a vertical axis running along the central portion of the display panel, thereby resulting in display pixels in the central portion extending out from the electronic device farther than display pixels in a left portion of the display panel as well as display pixels in a right portion of the display panel.

As such, in some embodiments, a curved display panel may be implemented such that normal axes of its display pixels are oriented in multiple different directions (e.g., orientations). For example, on a convex display panel, a first (e.g., left and/or off-axis) display pixel may have a first normal axis, which is oriented a first non-zero angle away from a normal axis of a central (e.g., on-axis) display pixel, and a second (e.g., right and/or off-axis) display pixel may have a second normal axis, which is oriented a second (e.g., different and/or opposite) non-zero angle away from the normal axis of the central display pixel. In other words, displaying image content on a curved display panel using image data processed based at least in part on compensation parameters calibrated for a flat display panel may result in actual light emission magnitudes matching corresponding target light emission magnitudes, but actual perceived luminances nevertheless differing from corresponding target luminances, which, at least in some instances, may affect (e.g., reduce) perceived quality of displayed image content and, thus, potentially the curved display panel displaying the image content and/or an electronic device that uses the curved panel to display the image content.

Accordingly, to facilitate improving perceived image quality provided by a curved display panel, the present disclosure provides techniques for implementing and/or operating an electronic device to adaptively process image data corresponding with image content (e.g., image frame) to be displayed on the curved display panel and/or for calibrating one or more compensation parameters to be used to process the image data. To facilitate processing image data, an electronic device may include image processing circuitry communicatively coupled to a (e.g., curved) display panel. In particular, the image processing circuitry may receive source image data output from an image source, process the source image data based at least in part on an associated set of expected operating conditions to determine display image data, and output the display image data for supply to the display panel.

For example, the image processing circuitry may include a white point compensation block (e.g., circuitry group) implemented and/or operated to process image data based at least in part on white point compensation (WPC) parameters that facilitate accounting (e.g., correcting and/or compensating) for color shift resulting from temperature and/or backlight brightness variations. Additionally or alternatively, the image processing circuitry may include a burn-in compensation block implemented and/or operated to process image data based at least in part on burn-in compensation (BIC) parameters that facilitate accounting for light emission variations resulting from pixel aging (e.g., burn-in). Furthermore, the image processing circuitry may include a pixel uniformity compensation (PUC) block implemented downstream relative to one or more other compensation blocks, such as the white point compensation (WPC) block and/or the burn-in compensation (BIC) block. In particular, the pixel uniformity compensation block may process image data based at least in part on pixel uniformity compensation (PUC) parameters that facilitate accounting for pixel non-uniformity, such as light emission response non-uniformity resulting from manufacturing tolerances and/or viewing angle non-uniformity resulting from curvature of a display panel.

To facilitate accounting for pixel non-uniformity on a curved display panel, pixel uniformity compensation parameters to be used by the pixel uniformity compensation block may be calibrated to the curved display panel via a calibration (e.g., tuning) process, for example, performed at least in part by a calibration (e.g., design and/or tuning) system. In fact, to facilitate improving calibration (e.g., tuning, design, computing, and/or operational) efficiency, in some embodiments, compensation parameters to be used to process image data supplied to a curved display panel may be calibrated (e.g., determined) based on compensation parameters calibrated for a flat display panel, for example, as compared to calibrating the compensation parameters directly using the curved display panel. In other words, in such embodiments, curved panel compensation parameters to be used by image processing circuitry may be calibrated based at least in part on corresponding calibrated flat panel compensation parameters.

For example, curved panel white point compensation parameters to be used by a white point compensation block may be calibrated to match calibrated flat panel white point compensation parameters. Additionally or alternatively, curved panel burn-in compensation parameters to be used by a burn-in compensation block may be calibrated to match calibrated flat panel burn-in compensation parameters. Furthermore, curved panel pixel uniformity compensation parameters to be used by a pixel uniformity compensation block may be calibrated based at least in part on calibrated flat panel pixel uniformity compensation parameters.

As described above, to facilitate compensating for light emission response non-uniformity resulting from manufacturing tolerances, pixel uniformity compensation parameters may include a pixel uniformity compensation factor map that explicitly associates (e.g., maps) each of one or more pixel positions on a display panel to a pixel uniformity compensation factor (e.g., offset value and/or gain value) to be applied to image data corresponding with a display pixel at the pixel position. However, as described above, a curved display panel may additionally suffer from viewing angle non-uniformity. To facilitate compensating for viewing angle non-uniformity, in some embodiments, curved panel pixel uniformity compensation parameters may include a panel curvature compensation (PCC) factor map that explicitly associates each of one or more pixel positions on the display panel to a panel curvature compensation factor (e.g., offset value and/or gain value) to be applied to image data corresponding with a display pixel at the pixel position, for example, on top of a corresponding pixel uniformity compensation factor determined based on a calibrated flat panel pixel uniformity compensation factor map.

As such, in some embodiments, a calibration process may include calibrating compensation parameters for a flat display panel before calibrating the compensation parameters for a curved display panel, for example, which is implemented by bending the flat display panel. In particular, the calibration process may include calibrating upstream compensation parameters to be used by upstream image processing circuitry, such as a white point compensation block and/or a burn-in compensation block, to process image data for a specific type of flat display panel. A flat display panel of the specific type may be used (e.g., instructed) to display a (e.g., first and/or light emission response non-uniformity) calibration image based on image data processed using the calibrated upstream compensation parameters. As described above, controlling light emission based on image data processed using properly calibrated upstream compensation parameters may result in actual light emission magnitudes that on average match corresponding target light emission magnitudes.

However, as described above, the actual magnitude of light emission from an individual display pixel may nevertheless differ from its target light emission magnitude, for example, due to light emission response non-uniformity resulting from manufacturing tolerances. To facilitate compensating for light emission response non-uniformity, the calibration process may include capturing a picture of the calibration image displayed on the flat display panel based on the image data processed using the calibrated upstream compensation parameters, for example, via one or more image sensors, such as a camera. Based on the captured picture, the calibration process may identify characteristics, such as location (e.g., pixel position) and/or strength, of light emission response non-uniformities on the flat display panel and calibrate flat panel pixel uniformity compensation parameters, such as a flat panel pixel uniformity compensation factor map, accordingly.

In some embodiments, light emission response non-uniformity on a display panel may vary with its panel brightness setting. For example, due to its smaller default range of light emission magnitudes, a light emission response non-uniformity may be more pronounced when image content is displayed using a lower (e.g., dimmer) panel brightness setting compared to when displayed using a higher (e.g., brighter) panel brightness setting. Thus, in such embodiments, a pixel uniformity compensation factor map may be calibrated for each of multiple different panel brightness settings. In other words, in such embodiments, the calibration process may sweep multiple different panel brightness settings of the flat display panel, capture a picture of the calibration image displayed on the flat display panel using each of the panel brightness settings, and calibrate flat panel pixel uniformity compensation parameters, such as a flat panel pixel uniformity compensation factor map, for each of the panel brightness settings accordingly.

As described above, controlling light emission based on image data processed using calibrated upstream compensation parameters as well as calibrated pixel uniformity compensation parameters may result in actual light emission magnitudes that more closely match corresponding target light emission magnitudes, for example, compared to using image data processed merely using the calibrated upstream compensation parameters and/or without using the calibrated pixel uniformity compensation parameters. Additionally, as described above, actual light emission magnitudes that more closely match corresponding target light emission magnitudes may result in actual perceived luminance at pixel positions on a flat display panel more closely matching corresponding target perceived luminances. However, even when actual magnitudes of light emission from display pixels implemented on a curved display panel match corresponding target light emission magnitudes, as described above, actual perceived luminance at pixel position of the curved display panel may nevertheless vary from corresponding target perceived luminances, for example, due to viewing angle non-uniformities.

To facilitate compensating for viewing angle differences between the flat display panel and a curved display panel, the calibration process may include displaying a (e.g., second and/or viewing angle non-uniformity) calibration image on the flat display panel based on image data processed using the calibrated upstream compensation parameters and the calibrated flat panel pixel uniformity compensation parameters. Additionally, the calibration process may include displaying the calibration image on the curved display panel based on the image data processed using the calibrated upstream compensation parameters and the calibrated flat panel pixel uniformity compensation parameters. In some embodiments, the curved display panel to which the compensation parameters are being calibrated may be implemented by bending the flat display panel used during the calibration process, for example, about a vertical axis running along a central portion of the display panel. In other embodiments, the curved display panel to which the compensation parameters are being calibrated may be implemented by bending another flat display panel of the same type as the flat display panel used during the calibration process.

Furthermore, the calibration process may include capturing a first picture of the calibration image being displayed on the flat display panel and a second picture of the calibration image being displayed on the curved display panel, for example, via one or more image sensors, such as a camera. In some embodiments, an image sensor may capture a picture by generating captured image data that indicates characteristics, such as color and/or achromatic brightness (e.g., grayscale) level, of light sensed (e.g., measured) at one or more pixel positions. For example, the captured image data corresponding with a pixel position may include captured red component image data that indicates brightness level of red light sensed at the pixel position, captured blue component image data that indicates brightness level of blue light sensed at the pixel position, captured green component image data that indicates brightness level of green light sensed at the pixel position, captured white component image data that indicates brightness level of white light sensed at the pixel position, or any combination thereof. In other words, captured image data corresponding with a picture of a calibration image being displayed on display panel may be indicative of luminance that would actually be perceived by a user's eye.

Thus, in some embodiments, the calibration process may determine an expected difference between actual perceived luminance produced by the flat display panel and actual perceived luminance produced by the curved display panel based at least in part on captured flat panel image data corresponding with the first picture and captured curved panel image data corresponding with the second picture. To facilitate improving perceived image quality, the calibration process may calibrate a panel curvature compensation factor map, which explicitly associates each of one or more pixel positions on the display panel to a panel curvature compensation factor (e.g., offset value and/or gain value) to be applied to image data corresponding with a display pixel at the pixel position, to compensate for (e.g., offset) the expected differences between perceived luminances produced by the flat display panel and corresponding perceived luminances produced by the curved display panel. In other words, in such embodiments, the calibration process may calibrate curved panel compensation parameters, such as a panel curvature compensation factor map, based at least in part on captured flat panel image data corresponding with a picture of image content (e.g., calibration image) displayed on the flat panel and captured curved panel image data corresponding with a picture of the same image content displayed on the curved display panel.

For example, the panel curvature compensation factor map may be calibrated such that a red component panel curvature compensation factor associated with a pixel position is set as a ratio of red component brightness (e.g., grayscale) level identified for the pixel position in the captured flat panel image data to red component brightness level identified for the pixel position in the captured curved panel image data. Additionally, the panel curvature compensation factor map may be calibrated such that a blue component panel curvature compensation factor associated with a pixel position is set as a ratio of blue component brightness (e.g., grayscale) level identified for the pixel position in the captured flat panel image data to blue component brightness level identified for the pixel position in the captured curved panel image data. Furthermore, the panel curvature compensation factor map may be calibrated such that a green component panel curvature compensation factor associated with a pixel position is set as a ratio of green component brightness (e.g., grayscale) level identified for the pixel position in the captured flat panel image data to green component brightness level identified for the pixel position in the captured curved panel image data. Additionally or alternatively, the panel curvature compensation factor map may be calibrated such that a white component panel curvature compensation factor associated with a pixel position is set as a ratio of white component brightness (e.g., grayscale) level identified for the pixel position in the captured flat panel image data to white component brightness level identified for the pixel position in the captured curved panel image data.

However, at least in some instances, applying a panel curvature compensation factor, which is set as a corresponding ratio of sensed flat panel brightness level to sensed curved panel brightness level, to image data may result in a target light emission magnitude that exceeds a pixel upper limit of display pixels implemented on the curved display panel. Since light emission from each of its display pixels is limited to the pixel upper limit, a target light emission magnitude greater than the pixel upper limit may result in a corresponding display pixel nevertheless emitting the pixel upper limit. In other words, at least in some such instances, multiple different target light emission magnitudes may nevertheless result in the same actual light emission magnitude and, thus, potentially affect (e.g., reduce) perceived image quality provided by the curved display panel, for example, due to a reduction in the number of different light emission magnitudes reducing contrast perceived in displayed image content.

Accordingly, to facilitate further improving perceived image quality provided by a curved display panel, in some embodiments, the calibration process may determine whether application of a panel curvature compensation factor, which is set as a ratio of sensed flat panel brightness level to sensed curved panel brightness level, to image data would potentially result in a target light emission magnitude that exceeds a pixel upper limit of the curved display panel. For example, the calibration process may determine whether applying a panel curvature compensation factor, which is set as a ratio of flat panel brightness level to curved panel brightness level, to a highest (e.g., maximum and/or two hundred fifty-five) color component grayscale level results in a target light emission magnitude that exceeds the pixel upper limit of the curved display panel. When application to the highest color component grayscale level results in a target light emission magnitude that does not exceed the pixel upper limit, the calibration process may determine that each lower color component grayscale level also results in a target light emission magnitude that does not exceed the pixel upper limit of the curved display panel and, thus, maintain the value of the panel curvature compensation factor as the ratio of the sensed flat panel brightness level to the sensed curved panel brightness level.

On the other hand, the calibration process may adjust the value of the panel curvature compensation factor when application to the highest color component grayscale level results in a target light emission magnitude that exceeds the pixel upper limit light of the curved display panel. For example, in some embodiments, the calibration process may adjust the value of the panel curvature compensation factor such that application to the highest color component grayscale level results in a target light emission magnitude that matches the pixel upper limit and application to each lower color component grayscale level results in a different lower target light emission magnitude. By processing image data based on compensation parameters, such as a panel curvature compensation factor map, calibrated in this manner, as will be described in more detail below, the techniques described in the present disclosure may facilitate improving perceived image quality provided by a curved display panel, for example, by maintaining perceivable contrast in an image displayed on the curved display panel and/or compensating for viewing angle non-uniformity resulting from curvature of the curved display panel.

BRIEF DESCRIPTION OF THE DRAWINGS

Various aspects of the present disclosure may be better understood upon reading the following detailed description and upon reference to the drawings in which.

DETAILED DESCRIPTION

Figure 1:
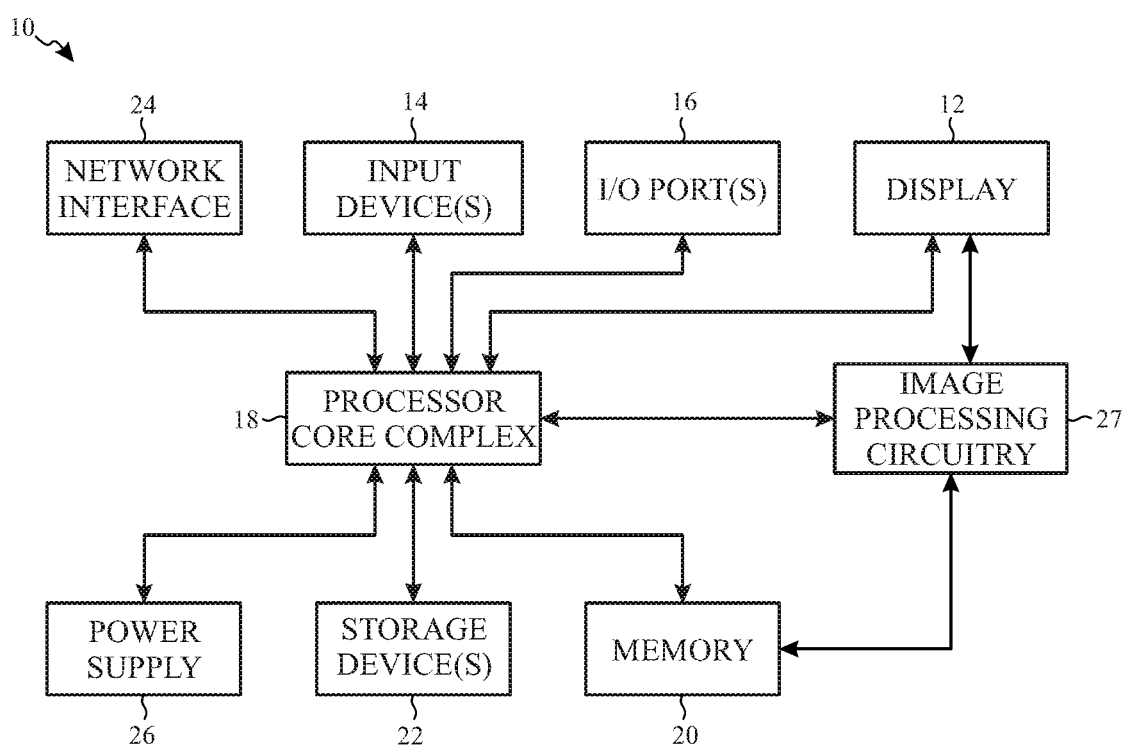
FIG. 1 is a block diagram of an electronic device including a display panel, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to display panels (e.g., electronic displays), which may be implemented and/or operated to display one or more images (e.g., image frames and/or pictures) that present a visual representation of information. Accordingly, electronic devices, such as computers, mobile phones, portable media devices, tablets, televisions, virtual-reality headsets, and vehicle dashboards, among many others, often include and/or utilize one or more display panels. In any case, a display panel may generally display image content by actively controlling light emission from its display pixels, which each includes one or more color component sub-pixels. For example, a display pixel may include one or more red sub-pixels that control magnitude of red light emission from the display pixel, one or more blue sub-pixels that control magnitude of blue light emission from the display pixel, one or more green sub-pixels that control magnitude of green light emission from the display pixel, one or more white sub-pixels that control magnitude of white light emission from the display pixel, or any combination thereof.

Generally, magnitude of light emission from a display pixel (e.g., color component sub-pixel) varies with the amount of electrical energy stored therein. For example, in some instances, a display pixel may include a light emissive element, such as an organic light-emitting diode (OLED), that varies its light emission with current flowing therethrough, a current control switching device (e.g., transistor) coupled between the light emissive element and a pixel power (e.g., VDD) supply rail, and a storage capacitor coupled to a control (e.g., gate) terminal of the current control switching device at an internal node of the display pixel. As such, varying the amount of electrical energy stored in the storage capacitor may vary voltage applied to the control input of the current control switching device and, thus, magnitude of electrical current supplied from the pixel power supply rail to the light emissive element. In other words, at least in such instances, light emission response (e.g., magnitude) of a display pixel may be controlled at least in part by controlling magnitude of electrical power (e.g., voltage and/or current) supplied to its internal node.

It should be appreciated that the OLED examples described in the present disclosure are merely intended to be illustrative and not limiting. In particular, it should be appreciated that the techniques described in the present disclosure may be applied to and/or implemented for other types of display panels. For example, the techniques may be adapted to a liquid crystal display (LCD) that uses a pixel electrode and a common electrode as a storage capacitor.

Generally, a display panel may be implemented such that each of its display pixels is capable of producing at least a range of light emission magnitudes from a pixel lower limit (e.g., minimum light emission magnitude and/or zero nits) to a pixel upper limit (e.g., maximum light emission magnitude and/or non-zero nits). Additionally, at least in some instances, a display panel may be implemented to selectively operate using one of multiple different panel brightness settings including a highest (e.g., brightest) panel brightness setting, which enables utilization of the full range of light emission magnitudes by default (e.g., for display of standard dynamic range (SDR) image content), and one or more lower (e.g., dimmer and/or darker) panel brightness settings, which each enables utilization of a different sub-range of the light emission magnitudes by default. For example, while in a first lower brightness setting, the display panel may display standard dynamic range image content using a first range (e.g., sub-range) of light emission magnitudes from the pixel lower limit to a first brightness setting upper limit, which is less (e.g., dimmer and/or darker) than the pixel upper limit, while in a second lower brightness setting, the display panel may display standard dynamic range image content using a second range of light emission magnitudes from the pixel lower limit to a second brightness setting upper limit, which is less than the first brightness setting upper limit, and so on.

Additionally, image data (e.g., image pixel) corresponding with a display pixel on a display panel may be indicative of target characteristics (e.g., color and/or magnitude) of light emission therefrom, for example, by indicating one or more target achromatic brightness (e.g., grayscale) levels (e.g., values) that are mapped to a light emission magnitude range associated with a panel brightness setting used to display corresponding image content on the display panel. Merely as an illustrative non-limiting example, 8-bit fixed point image data may be used to indicate a target grayscale level in a grayscale level range from zero (e.g., black or minimum grayscale level) to two hundred fifty-five (e.g., white or maximum grayscale level) irrespective of panel brightness setting. In other words, a target grayscale level of zero may be indicative of a target light emission magnitude that matches a pixel lower limit, a target grayscale level of two hundred fifty-five may be indicative of a target light emission magnitude that matches a panel brightness setting upper limit (e.g., pixel upper limit), and a target grayscale level between zero and two hundred fifty-five may be indicative of a target light emission magnitude between the pixel lower limit and the panel brightness setting upper limit, for example, in accordance with a gamma function calibrated for the display panel.

As described above, a display pixel may include one or more color component sub-pixels, which are each implemented and/or operated to control light emission of a specific color. For example, a display pixel may include a red sub-pixel that controls magnitude of red light emission from the display pixel, a green sub-pixel that controls magnitude of green light emission from the display pixel, a blue sub-pixel that controls magnitude of blue light emission from the display pixel, a white component sub-pixel that controls magnitude of white light emission from the display pixel, or any combination thereof. As such, in some instances, the corresponding image data may include red component image data indicative of target magnitude of red light emission from the display pixel, green component image data indicative of target magnitude of green light emission from the display pixel, blue component image data indicative of target magnitude of blue light emission from the display pixel, white component image data indicative of target magnitude of white light emission from the display pixel, or any combination thereof. Accordingly, to display image content, a display panel may adaptively control magnitude of analog electrical signals supplied to its display pixels and, thus, resulting light emission from its display pixel based at least in part on corresponding image data.

However, at least in some instances, different display pixels may exhibit varying light emission responses to the same analog electrical signal. In particular, at least in some instances, display pixels implemented on different types of display panels may exhibit varying light emission responses, for example, due to display pixels and/or driver circuitry on different types of display panels being implemented and/or organized differently. Moreover, at least in some instances, a display pixel may exhibit varying light emission responses under different operating conditions, such as pixel temperature, pixel age (e.g., burn-in), backlight brightness, panel brightness setting, or any combination thereof. For example, as a display pixel ages with use (e.g., operation), its internal resistance may gradually increase, thereby resulting in burn-in that affects (e.g., reduces) magnitude of electrical energy stored therein and, thus, resulting light emission. In other words, supplying an analog electrical signal to an older display pixel may result in less light emission compared to supplying the same analog electrical signal to a newer (e.g., younger) display pixel.

In fact, at least in some instances, color component sub-pixels in a display pixel may exhibit differing light emission responses under the same set of operating conditions. For example, pixel temperature may affect a first color component sub-pixel in the display pixel differently compared to a second color component sub-pixel in the display pixel, thereby producing a color shift that affects white point of light emission from the display pixel. When perceivable, a difference between actual light emission magnitude and target light emission magnitude of a display pixel may result in a perceivable visual artifact occurring in displayed image content, which affects (e.g., reduces) perceived quality of the displayed image content and, thus, potentially a display panel and/or an electronic device displaying the image content.

To facilitate improving perceived image quality, in some instances, an electronic device may include image processing circuitry implemented and/or operated to process image data based at least in part on compensation parameters before processed image data is used to display corresponding image content on a display panel. For example, to facilitate compensating (e.g., correcting) for color shift, the image processing circuitry may process image data based at least in part on white point compensation (WPC) parameters. Additionally or alternatively, to facilitate compensating for pixel aging, the image processing circuitry may process image data based at least in part on burn-in compensation (BIC) parameters.

Since light emission response may vary between different types of display panels and/or under different operating conditions, in some instances, at least a portion of the compensation parameters may be calibrated (e.g., tuned) to a specific type of display panel under multiple different sets of operating conditions. When calibrated in this manner, processing image data based at least in part on the compensation parameters calibrated for a specific display panel type may result in actual light emission magnitude used to display corresponding image content on a display panel of the specific type on average matching target light emission magnitude. However, due to manufacturing tolerances, light emission response of different display pixels implemented on the same type of display panel may nevertheless differ.

In fact, due to manufacturing tolerances, light emission response of display pixels implemented on the same display panel may nevertheless vary. For example, a display panel may include a first display pixel and a second display pixel both manufactured (e.g., implemented) in accordance with manufacturing tolerances. By supplying analog electrical signals to the first display pixel and the second display pixel based on image data processed using properly calibrated compensation parameters, an average of actual light emission from the first display pixel and actual light emission from the second display pixel may match a target light emission indicated via the image data. However, due to slight implementation differences that are still within the manufacturing tolerances, internal impedance of the first display pixel may be greater than internal impedance of the second display pixel, thereby resulting in the second display pixel emitting more light than the first display pixel in response to supply of analog electrical signals with the same magnitude. In other words, at least in some instances, non-uniformity of display pixels implemented on a display panel may nevertheless affect perceived quality of displayed image content and, thus, potentially a display panel and/or an electronic device displaying the image content.

As such, to facilitate further improving perceived image quality, image processing circuitry in an electronic device may be implemented and/or operated to process image data to perform pixel uniformity compensation (PUC). At least in some instances, the image processing circuitry may perform pixel uniformity compensation based at least in part on pixel uniformity compensation parameters after performing upstream (e.g., white point and/or burn-in) compensation based at least in part on calibrated upstream compensation parameters, for example, to facilitate maintaining a target white point produced by the upstream white point compensation. To facilitate compensating for light emission response non-uniformity, the pixel uniformity compensation parameters may include a pixel uniformity compensation factor map that explicitly associates (e.g., maps) each of one or more pixel positions on a display panel to a pixel uniformity compensation factor (e.g., offset value and/or gain value) to be applied to image data corresponding with a display pixel at the pixel position.

In other words, at least in some instances, the pixel uniformity compensation parameters may enable independently controllable and, thus, potentially differing pixel uniformity compensation factors to be applied to image data corresponding with different pixel positions on a display panel, which, at least in some instances, may facilitate reducing perceivability of pixel non-uniformity. To help illustrate, continuing with the above example, the image processing circuitry may apply a pixel uniformity compensation factor to first image data corresponding with the first display pixel to boost (e.g., increase) a first target grayscale level indicated in the first image data relative to a second target grayscale level indicated in the second image data to facilitate compensating for the higher internal impedance of the first display pixel. In this manner, processing image data to perform pixel uniformity compensation may facilitate bringing actual light emission of individual display pixels closer to corresponding target light emissions, which, at least in some instances, may facilitate further improving perceived image quality provided by a display panel.

Generally, light emitted (e.g., output) from a light source, such as a display pixel, radiates outwardly from the light source, for example, in a conical shape. As such, magnitude of light emission from a display pixel is generally strongest (e.g., highest and/or brightest) along a normal axis of the display pixel and weakens (e.g., dims) as viewing (e.g., perception) angle moves away from the normal axis. Moreover, at least in some instances, a portion of light emitted from a display pixel may not actually be perceived by a user's eye. As such, to facilitate improving perceived image quality, a target grayscale level of a display pixel indicated in corresponding image data may be set (e.g., generated) such that resulting light emission is expected to produce an actual perceived luminance at a corresponding pixel position that matches a corresponding target perceived luminance.

In fact, at least in some instances, the portion of light emitted from a display pixel that is actually perceived and, thus, perceived luminance at a corresponding pixel position may vary with viewing angle. On a flat display panel, the display pixels may be implemented such that their normal axes are each oriented (e.g., point) in the same direction (e.g., orientation), which generally results in perceived luminance of each display pixel being affected by the same (e.g., a uniform) viewing angle. Thus, at least in some instances, bringing actual light emission magnitude of a display pixel on a flat display panel closer to its target light emission magnitude may facilitate bringing actual perceived luminance at a corresponding pixel position closer to its target perceived luminance and, thus, improving perceived image quality provided by the flat display panel and/or an electronic device using the flat display panel to display image content.

However, in some instances, an electronic device may additionally or alternatively display image content using a curved display panel, which may result in the same light emission magnitudes producing different perceived luminances, for example, due to curvature of the curved display panel resulting in different display pixels being concurrently perceived from different viewing angles. In some embodiments, a curved display panel may be implemented with a concave shape such that side portions of the curved display panel extend out from the electronic device farther than a central (e.g., middle) portion of the curved display panel. In other embodiments, a curved display panel may be implemented with a convex shape such that a central portion of the curved display panel extends out from the electronic device farther than side portions of the curved display panel. For example, a convex display panel may be curved about (e.g., relative to) a vertical axis running along the central portion of the display panel, thereby resulting in display pixels in the central portion extending out from the electronic device farther than display pixels in a left portion of the display panel as well as display pixels in a right portion of the display panel.

As such, in some embodiments, a curved display panel may be implemented such that normal axes of its display pixels are oriented in multiple different directions (e.g., orientations). For example, on a convex display panel, a first (e.g., left and/or off-axis) display pixel may have a first normal axis, which is oriented a first non-zero angle away from a normal axis of a central (e.g., on-axis) display pixel, and a second (e.g., right and/or off-axis) display pixel may have a second normal axis, which is oriented a second (e.g., different and/or opposite) non-zero angle away from the normal axis of the central display pixel. In other words, displaying image content on a curved display panel using image data processed based at least in part on compensation parameters calibrated for a flat display panel may result in actual light emission magnitudes matching corresponding target light emission magnitudes, but actual perceived luminances nevertheless differing from corresponding target luminances, which, at least in some instances, may affect (e.g., reduce) perceived quality of displayed image content and, thus, potentially the curved display panel displaying the image content and/or an electronic device that uses the curved panel to display the image content.

Accordingly, to facilitate improving perceived image quality provided by a curved display panel, the present disclosure provides techniques for implementing and/or operating an electronic device to adaptively process image data corresponding with image content (e.g., image frame) to be displayed on the curved display panel and/or for calibrating one or more compensation parameters to be used to process the image data. To facilitate processing image data, an electronic device may include image processing circuitry communicatively coupled to a (e.g., curved) display panel. In particular, the image processing circuitry may receive source image data output from an image source, process the source image data based at least in part on an associated set of expected operating conditions to determine display image data, and output the display image data for supply to the display panel.

For example, the image processing circuitry may include a white point compensation block (e.g., circuitry group) implemented and/or operated to process image data based at least in part on white point compensation (WPC) parameters that facilitate accounting (e.g., correcting and/or compensating) for color shift resulting from temperature and/or backlight brightness variations. Additionally or alternatively, the image processing circuitry may include a burn-in compensation block implemented and/or operated to process image data based at least in part on burn-in compensation (BIC) parameters that facilitate accounting for light emission variations resulting from pixel aging (e.g., burn-in). Furthermore, the image processing circuitry may include a pixel uniformity compensation (PUC) block implemented downstream relative to one or more other compensation blocks, such as the white point compensation (WPC) block and/or the burn-in compensation (BIC) block. In particular, the pixel uniformity compensation block may process image data based at least in part on pixel uniformity compensation (PUC) parameters that facilitate accounting for pixel non-uniformity, such as light emission response non-uniformity resulting from manufacturing tolerances and/or viewing angle non-uniformity resulting from curvature of a display panel.

To facilitate accounting for pixel non-uniformity on a curved display panel, pixel uniformity compensation parameters to be used by the pixel uniformity compensation block may be calibrated to the curved display panel via a calibration (e.g., tuning) process, for example, performed at least in part by a calibration (e.g., design and/or tuning) system. In fact, to facilitate improving calibration (e.g., tuning, design, computing, and/or operational) efficiency, in some embodiments, compensation parameters to be used to process image data supplied to a curved display panel may be calibrated (e.g., determined) based on compensation parameters calibrated for a flat display panel, for example, as compared to calibrating the compensation parameters directly using the curved display panel. In other words, in such embodiments, curved panel compensation parameters to be used by image processing circuitry may be calibrated based at least in part on corresponding calibrated flat panel compensation parameters.

For example, curved panel white point compensation parameters to be used by a white point compensation block may be calibrated to match calibrated flat panel white point compensation parameters. Additionally or alternatively, curved panel burn-in compensation parameters to be used by a burn-in compensation block may be calibrated to match calibrated flat panel burn-in compensation parameters. Furthermore, curved panel pixel uniformity compensation parameters to be used by a pixel uniformity compensation block may be calibrated based at least in part on calibrated flat panel pixel uniformity compensation parameters.

As described above, to facilitate compensating for light emission response non-uniformity resulting from manufacturing tolerances, pixel uniformity compensation parameters may include a pixel uniformity compensation factor map that explicitly associates (e.g., maps) each of one or more pixel positions on a display panel to a pixel uniformity compensation factor (e.g., offset value and/or gain value) to be applied to image data corresponding with a display pixel at the pixel position. However, as described above, a curved display panel may additionally suffer from viewing angle non-uniformity. To facilitate compensating for viewing angle non-uniformity, in some embodiments, curved panel pixel uniformity compensation parameters may include a panel curvature compensation (PCC) factor map that explicitly associates each of one or more pixel positions on the display panel to a panel curvature compensation factor (e.g., offset value and/or gain value) to be applied to image data corresponding with a display pixel at the pixel position, for example, on top of a corresponding pixel uniformity compensation factor determined based on a calibrated flat panel pixel uniformity compensation factor map.

As such, in some embodiments, a calibration process may include calibrating compensation parameters for a flat display panel before calibrating the compensation parameters for a curved display panel, for example, which is implemented by bending the flat display panel. In particular, the calibration process may include calibrating upstream compensation parameters to be used by upstream image processing circuitry, such as a white point compensation block and/or a burn-in compensation block, to process image data for a specific type of flat display panel. A flat display panel of the specific type may be used (e.g., instructed) to display a (e.g., first and/or light emission response non-uniformity) calibration image based on image data processed using the calibrated upstream compensation parameters. As described above, controlling light emission based on image data processed using properly calibrated upstream compensation parameters may result in actual light emission magnitudes that on average match corresponding target light emission magnitudes.

However, as described above, actual magnitude of light emission from an individual display pixel may nevertheless differ from its target light emission magnitude, for example, due to light emission response non-uniformity resulting from manufacturing tolerances. To facilitate compensating for light emission response non-uniformity, the calibration process may include capturing a picture of the calibration image displayed on the flat display panel based on the image data processed using the calibrated upstream compensation parameters, for example, via one or more image sensors, such as a camera. Based on the captured picture, the calibration process may identify characteristics, such as location (e.g., pixel position) and/or strength, of light emission response non-uniformities on the flat display panel and calibrate flat panel pixel uniformity compensation parameters, such as a flat panel pixel uniformity compensation factor map, accordingly.

In some embodiments, light emission response non-uniformity on a display panel may vary with its panel brightness setting. For example, due to its smaller default range of light emission magnitudes, a light emission response non-uniformity may be more pronounced when image content is displayed using a lower (e.g., dimmer) panel brightness setting compared to when displayed using a higher (e.g., brighter) panel brightness setting. Thus, in such embodiments, a pixel uniformity compensation factor map may be calibrated for each of multiple different panel brightness settings. In other words, in such embodiments, the calibration process may sweep multiple different panel brightness settings of the flat display panel, capture a picture of the calibration image displayed on the flat display panel using each of the panel brightness settings, and calibrate flat panel pixel uniformity compensation parameters, such as a flat panel pixel uniformity compensation factor map, for each of the panel brightness settings accordingly.

As described above, controlling light emission based on image data processed using calibrated upstream compensation parameters as well as calibrated pixel uniformity compensation parameters may result in actual light emission magnitudes that more closely match corresponding target light emission magnitudes, for example, compared to using image data processed merely using the calibrated upstream compensation parameters and/or without using the calibrated pixel uniformity compensation parameters. Additionally, as described above, actual light emission magnitudes that more closely match corresponding target light emission magnitudes may result in actual perceived luminance at pixel positions on a flat display panel more closely matching corresponding target perceived luminances. However, even when actual magnitudes of light emission from display pixels implemented on a curved display panel match corresponding target light emission magnitudes, as described above, actual perceived luminance at pixel position of the curved display panel may nevertheless vary from corresponding target perceived luminances, for example, due to viewing angle non-uniformities.

To facilitate compensating for viewing angle differences between the flat display panel and a curved display panel, the calibration process may include displaying a (e.g., second and/or viewing angle non-uniformity) calibration image on the flat display panel based on image data processed using the calibrated upstream compensation parameters and the calibrated flat panel pixel uniformity compensation parameters. Additionally, the calibration process may include displaying the calibration image on the curved display panel based on the image data processed using the calibrated upstream compensation parameters and the calibrated flat panel pixel uniformity compensation parameters. In some embodiments, the curved display panel to which the compensation parameters are being calibrated may be implemented by bending the flat display panel used during the calibration process, for example, about a vertical axis running along a central portion of the display panel. In other embodiments, the curved display panel to which the compensation parameters are being calibrated may be implemented by bending another flat display panel of the same type as the flat display panel used during the calibration process.

Furthermore, the calibration process may include capturing a first picture of the calibration image being displayed on the flat display panel and a second picture of the calibration image being displayed on the curved display panel, for example, via one or more image sensors, such as a camera. In some embodiments, an image sensor may capture a picture by generating captured image data that indicates characteristics, such as color and/or achromatic brightness (e.g., grayscale) level, of light sensed (e.g., measured) at one or more pixel positions. For example, the captured image data corresponding with a pixel position may include captured red component image data that indicates brightness level of red light sensed at the pixel position, captured blue component image data that indicates brightness level of blue light sensed at the pixel position, captured green component image data that indicates brightness level of green light sensed at the pixel position, captured white component image data that indicates brightness level of white light sensed at the pixel position, or any combination thereof. In other words, captured image data corresponding with a picture of a calibration image being displayed on display panel may be indicative of luminance that would actually be perceived by a user's eye.

Thus, in some embodiments, the calibration process may determine an expected difference between actual perceived luminance produced by the flat display panel and actual perceived luminance produced by the curved display panel based at least in part on captured flat panel image data corresponding with the first picture and captured curved panel image data corresponding with the second picture. To facilitate improving perceived image quality, the calibration process may calibrate a panel curvature compensation factor map, which explicitly associates each of one or more pixel positions on the display panel to a panel curvature compensation factor (e.g., offset value and/or gain value) to be applied to image data corresponding with a display pixel at the pixel position, to compensate for (e.g., offset) the expected differences between perceived luminances produced by the flat display panel and corresponding perceived luminances produced by the curved display panel. In other words, in such embodiments, the calibration process may calibrate curved panel compensation parameters, such as a panel curvature compensation factor map, based at least in part on captured flat panel image data corresponding with a picture of image content (e.g., calibration image) displayed on the flat panel and captured curved panel image data corresponding with a picture of the same image content displayed on the curved display panel.

For example, the panel curvature compensation factor map may be calibrated such that a red component panel curvature compensation factor associated with a pixel position is set as a ratio of red component brightness (e.g., grayscale) level identified for the pixel position in the captured flat panel image data to red component brightness level identified for the pixel position in the captured curved panel image data. Additionally, the panel curvature compensation factor map may be calibrated such that a blue component panel curvature compensation factor associated with a pixel position is set as a ratio of blue component brightness (e.g., grayscale) level identified for the pixel position in the captured flat panel image data to blue component brightness level identified for the pixel position in the captured curved panel image data. Furthermore, the panel curvature compensation factor map may be calibrated such that a green component panel curvature compensation factor associated with a pixel position is set as a ratio of green component brightness (e.g., grayscale) level identified for the pixel position in the captured flat panel image data to green component brightness level identified for the pixel position in the captured curved panel image data. Additionally or alternatively, the panel curvature compensation factor map may be calibrated such that a white component panel curvature compensation factor associated with a pixel position is set as a ratio of white component brightness (e.g., grayscale) level identified for the pixel position in the captured flat panel image data to white component brightness level identified for the pixel position in the captured curved panel image data.

However, at least in some instances, applying a panel curvature compensation factor, which is set as a corresponding ratio of sensed flat panel brightness level to sensed curved panel brightness level, to image data may result in a target light emission magnitude that exceeds a pixel upper limit of display pixels implemented on the curved display panel. Since light emission from each of its display pixels is limited to the pixel upper limit, a target light emission magnitude greater than the pixel upper limit may result in a corresponding display pixel nevertheless emitting the pixel upper limit. In other words, at least in some such instances, multiple different target light emission magnitudes may nevertheless result in the same actual light emission magnitude and, thus, potentially affect (e.g., reduce) perceived image quality provided by the curved display panel, for example, due to a reduction in the number of different light emission magnitudes reducing contrast perceived in displayed image content.

Accordingly, to facilitate further improving perceived image quality provided by a curved display panel, in some embodiments, the calibration process may determine whether application of a panel curvature compensation factor, which is set as a ratio of sensed flat panel brightness level to sensed curved panel brightness level, to image data would potentially result in a target light emission magnitude that exceeds a pixel upper limit of the curved display panel. For example, the calibration process may determine whether applying a panel curvature compensation factor, which is set as a ratio of flat panel brightness level to curved panel brightness level, to a highest (e.g., maximum and/or two hundred fifty-five) color component grayscale level results in a target light emission magnitude that exceeds the pixel upper limit of the curved display panel. When application to the highest color component grayscale level results in a target light emission magnitude that does not exceed the pixel upper limit, the calibration process may determine that each lower color component grayscale level also results in a target light emission magnitude that does not exceed the pixel upper limit of the curved display panel and, thus, maintain the value of the panel curvature compensation factor as the ratio of the sensed flat panel brightness level to the sensed curved panel brightness level.

On the other hand, the calibration process may adjust the value of the panel curvature compensation factor when application to the highest color component grayscale level results in a target light emission magnitude that exceeds the pixel upper limit light of the curved display panel. For example, in some embodiments, the calibration process may adjust the value of the panel curvature compensation factor such that application to the highest color component grayscale level results in a target light emission magnitude that matches the pixel upper limit and application to each lower color component grayscale level results in a different lower target light emission magnitude. By processing image data based on compensation parameters, such as a panel curvature compensation factor map, calibrated in this manner, as will be described in more detail below, the techniques described in the present disclosure may facilitate improving perceived image quality provided by a curved display panel, for example, by maintaining perceivable contrast in an image displayed on the curved display panel and/or compensating for viewing angle non-uniformity resulting from curvature of the curved display panel.

To help illustrate, an example of an electronic device 10, which utilizes an electronic display 12, is shown in FIG. 1. As will be described in more detail below, the electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores, main memory 20, one or more storage devices 22, a network interface 24, a power supply 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the main memory 20 and the storage device 22 may be included in a single component. Additionally or alternatively, the image processing circuitry 27 may be included in the processor core complex 18 or the electronic display 12.

As depicted, the processor core complex 18 is operably coupled with the main memory 20 and the storage device 22. As such, in some embodiments, the processor core complex 18 may execute instructions stored in the main memory 20 and/or the storage device 22 to perform operations, such as generating image data. Additionally or alternatively, the processor core complex 18 may operate based on circuit connections formed therein. As such, in some embodiments, the processor core complex 18 may include one or more general purpose microprocessors, one or more application specific processors (ASICs), one or more field programmable logic arrays (FPGAs), or any combination thereof.

In addition to instructions, in some embodiments, the main memory 20 and/or the storage device 22 may store data, such as image data. Thus, in some embodiments, the main memory 20 and/or the storage device 22 may include one or more tangible, non-transitory, computer-readable media that store instructions executable by processing circuitry, such as the processor core complex 18 and/or the image processing circuitry 27, and/or data to be processed by the processing circuitry. For example, the main memory 20 may include random access memory (RAM) and the storage device 22 may include read only memory (ROM), rewritable non-volatile memory, such as flash memory, hard drives, optical discs, and/or the like.

As depicted, the processor core complex 18 is also operably coupled with the network interface 24. In some embodiments, the network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 5G or LTE cellular network. In other words, in some embodiments, the network interface 24 may enable the electronic device 10 to transmit data (e.g., image data) to a communication network and/or receive data from the communication network.

Additionally, as depicted, the processor core complex 18 is operably coupled to the power supply 26. In some embodiments, the power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter.

Furthermore, as depicted, the processor core complex 18 is operably coupled with one or more I/O ports 16. In some embodiments, the I/O ports 16 may enable the electronic device 10 to interface with another electronic device 10. For example, a portable storage device may be connected to an I/O port 16, thereby enabling the electronic device 10 to communicate data, such as image data, with the portable storage device.

As depicted, the processor core complex 18 is also operably coupled with one or more input devices 14. In some embodiments, an input device 14 may enable a user to interact with the electronic device 10. For example, the input devices 14 may include one or more buttons, one or more keyboards, one or more mice, one or more trackpads, and/or the like. Additionally, in some embodiments, the input devices 14 may include touch sensing components implemented in the electronic display 12. In such embodiments, the touch sensing components may receive user inputs by detecting occurrence and/or position of an object contacting the display surface of the electronic display 12.

In addition to enabling user inputs, the electronic display 12 may facilitate providing visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include one or more display pixels implemented on a display panel. Additionally, in some embodiments, each display pixel may include one or more color component sub-pixels, which each controls light emission of a specific color (e.g., red, blue, green, or white).

As described above, the electronic display 12 may display an image by controlling light emission from its display pixels based at least in part on image data associated with corresponding image pixels (e.g., points) in the image. In some embodiments, image data may be generated by an image source, such as the processor core complex 18, a graphics processing unit (GPU), and/or an image sensor. Additionally, in some embodiments, image data may be received from another electronic device 10, for example, via the network interface 24 and/or an I/O port 16. In any case, as described above, the electronic device 10 may be any suitable electronic device.

Figure 2:
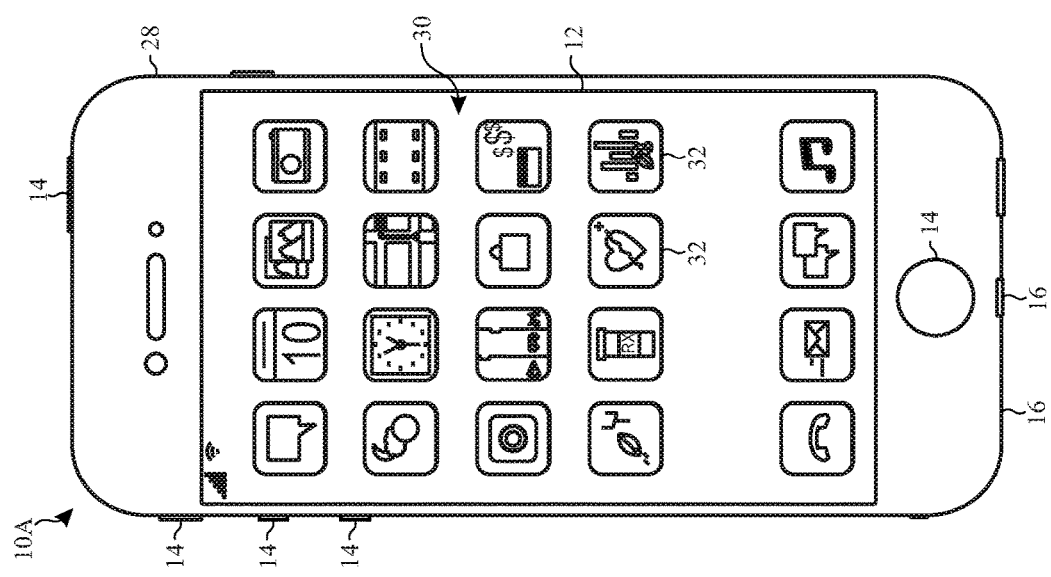
FIG. 2 is an example of the electronic device of FIG. 1, in accordance with an embodiment of the present disclosure.

To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
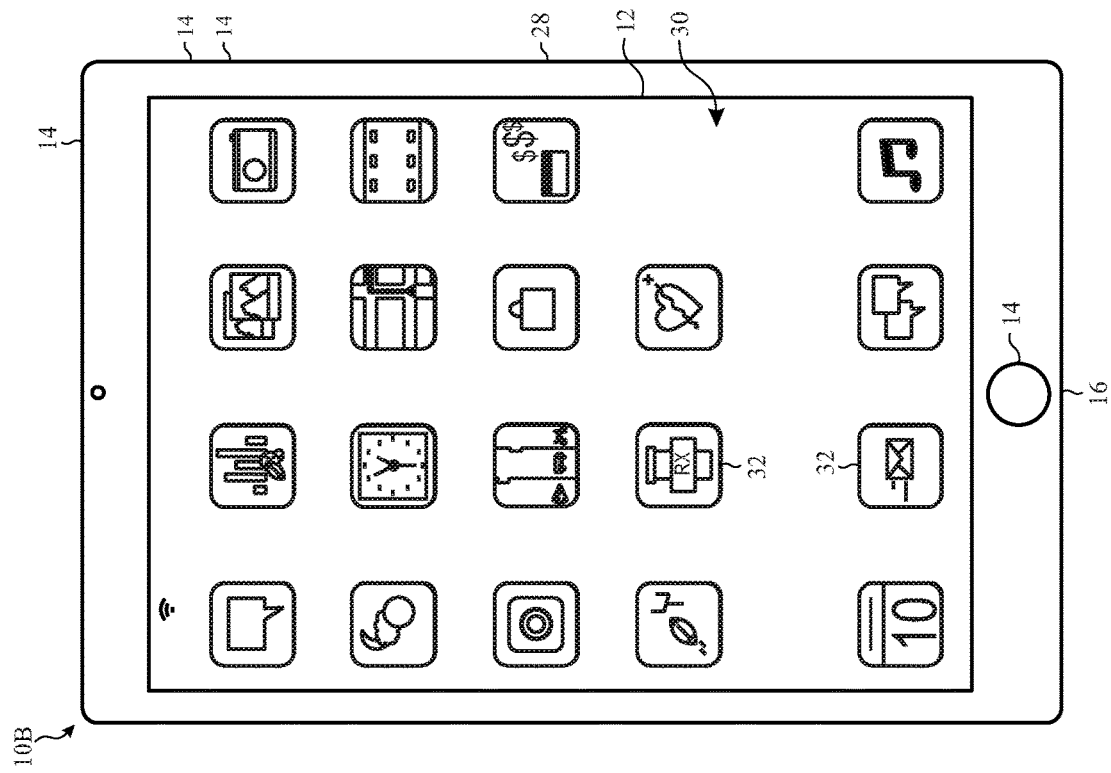
FIG. 3 is another example of the electronic device of FIG. 1, in accordance with an embodiment of the present disclosure.
Figure 4:
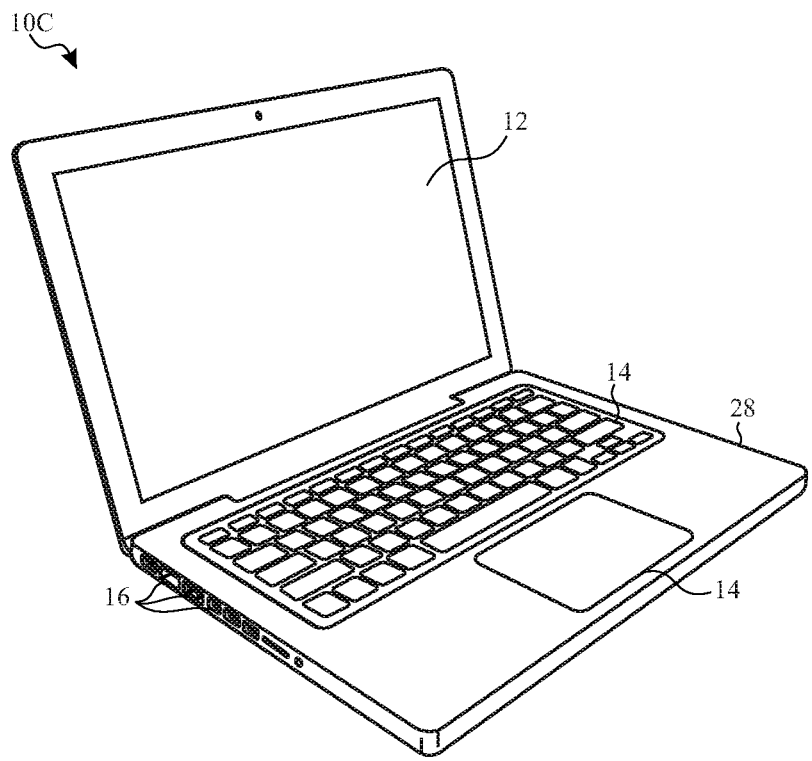
FIG. 4 is another example of the electronic device of FIG. 1, in accordance with an embodiment of the present disclosure.
Figure 5:
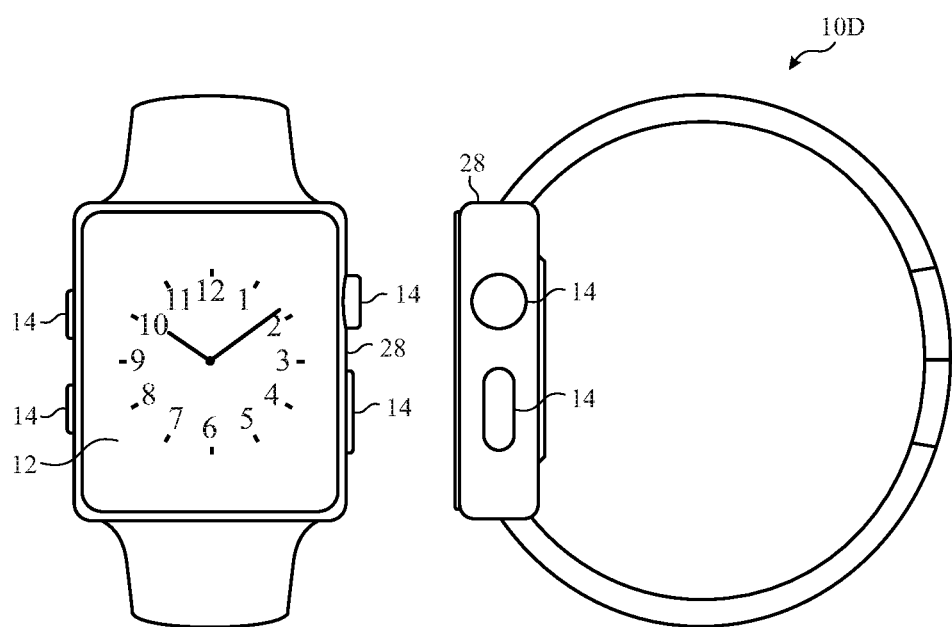
FIG. 5 is another example of the electronic device of FIG. 1, in accordance with an embodiment of the present disclosure.

To help further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28. In any case, as described above, an electronic display 12 may generally display image content (e.g., one or more image frames) based at least in part on image data, for example, output from the processor core complex 18 and/or the image processing circuitry 27.

Figure 6:
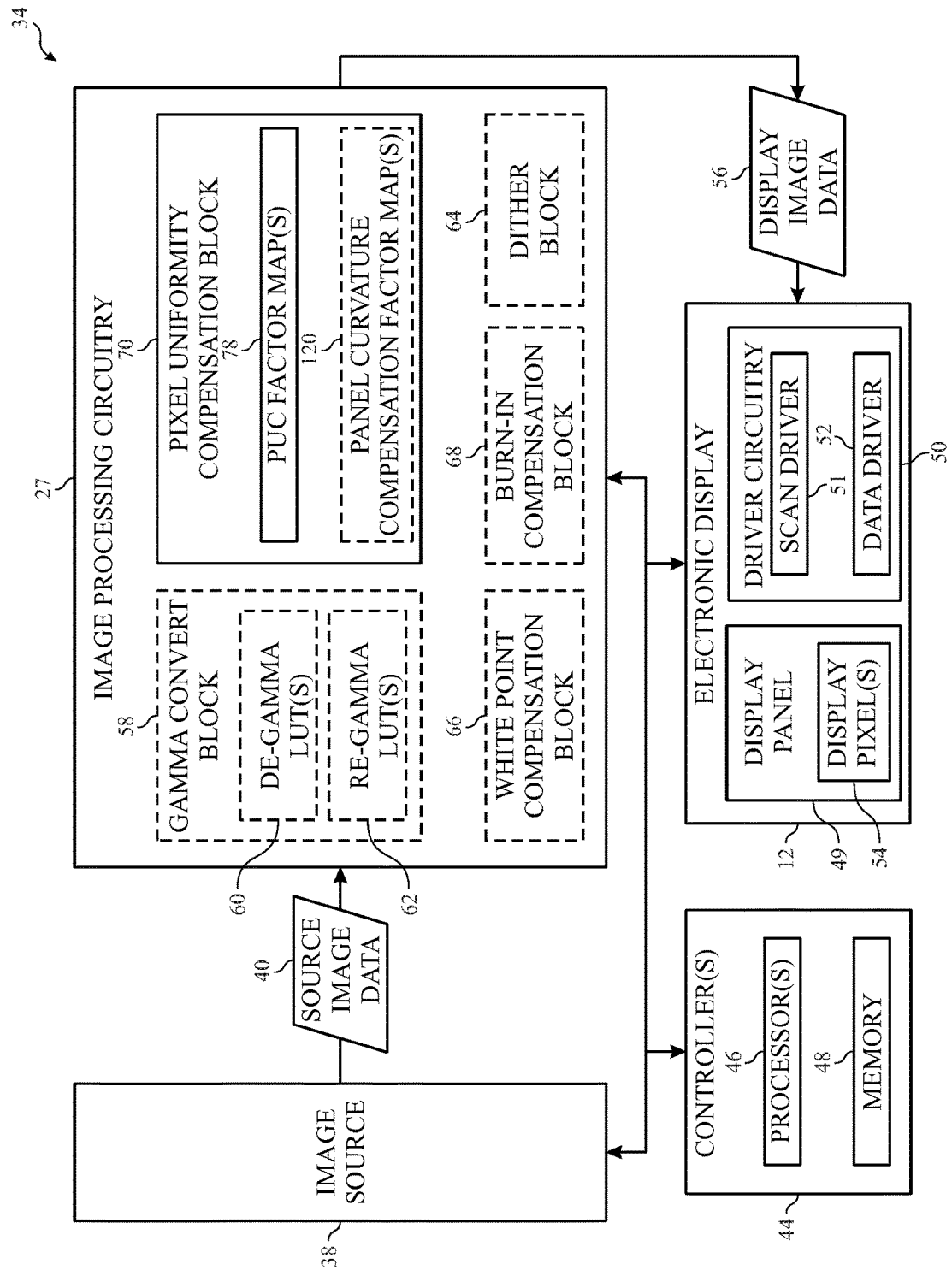
FIG. 6 is a block diagram of an example portion of the electronic device of FIG. 1 including a display panel and image processing circuitry, in accordance with an embodiment of the present disclosure.

To help illustrate, an example of a portion 34 of an electronic device 10, which includes an electronic display 12, is shown in FIG. 6. As depicted, the portion 34 of the electronic device 10 additionally includes an image source 38, image processing circuitry 27 coupled between the image source 38 and the electronic display 12, and one or more controllers (e.g., control circuitry and/or control logic) 44. However, it should be appreciated that the depicted example is merely intended to be illustrative and not limiting.

In some embodiments, a controller 44 may generally control operation of the image source 38, the image processing circuitry 27, and/or the electronic display 12. Although depicted as a single controller 44, in other embodiments, one or more separate controllers 44 may be used to control operation of the image source 38, the image processing circuitry 27, the electronic display 12, or any combination thereof. To facilitate controlling operation, as in the depicted example, the controller 44 may include one or more controller processors (e.g., processing circuitry) 46 and controller memory 48.

In some embodiments, a controller processor 46 may be included in the processor core complex 18 and/or separate processing circuitry and the controller memory 48 may be included in main memory 20, the storage device 22, and/or a separate, tangible, non-transitory computer-readable medium. Additionally, in some embodiments, a controller processor 46 may execute instructions and/or process data stored in the controller memory 48 to control operation of the image source 38, the image processing circuitry 27, and/or the electronic display 12. In other embodiments, the controller processor 46 may be hardwired with instructions that, when executed, control operation of the image processing circuitry 27, the electronic display 12, and/or the image source 38.

Generally, the image source 38 may be implemented and/or operated to generate source image data 40 corresponding with image content to be displayed on a display panel 49 of the electronic display 12. Thus, in some embodiments, the image source 38 may be a processor core complex 18, a graphics processing unit (GPU), an image sensor (e.g., camera), and/or the like. To facilitate displaying images, as in the depicted example, the electronic display 12 may include one or more display pixels 54, which each includes one or more color component sub-pixels, implemented on its display panel 49 and driver circuitry 50, which includes a scan driver 51 and a data driver 52. For example, each display pixel 54 implemented on the display panel 49 may include a red sub-pixel, a blue sub-pixel, and a green sub-pixel. As another example, the display panel 49 may include a first set (e.g., half) of display pixels 54, which each include a red sub-pixel and a green sub-pixel, and a second set (e.g., half) of display pixels 58, which each includes a blue sub-pixel and a green sub-pixel. In some embodiments, one or more display pixels 54 implemented on a display panel 49 may additionally or alternatively include a white sub-pixel.

As described above, an electronic display 12 may display image content by appropriately controlling light emission from its display pixels 54. Generally, light emission from a display pixel 54 may vary with the magnitude of electrical energy stored therein. For example, in some instances, a display pixel (e.g., color component sub-pixel) 54 may include a light emissive element, such as an organic light-emitting diode (OLED), that varies its light emission with current flow therethrough, a current control switching device (e.g., transistor) coupled between the light emissive element and a pixel power (e.g., VDD) supply rail, and a storage capacitor coupled to a control (e.g., gate) terminal of the current control switching device. As such, varying the amount of energy stored in the storage capacitor may vary voltage applied to the control terminal of the current control switching device and, thus, magnitude of electrical current supplied from the pixel power supply rail to the light emissive element of the display pixel 54.

However, it should be appreciated that discussion with regard to OLED display pixels 54, OLED electronic displays 12, and OLED display panels 49 are merely intended to be illustrative and not limiting. In other words, the techniques described in the present disclosure may be applied to and/or adapted for other types of display panels 49, such as liquid crystal display (LCD) panels 49 and/or micro light-emitting diode (LED) display panels 49. In any case, since light emission from a display pixel 54 generally varies with electrical energy storage therein, to display image content, an electronic display 12 may write a display pixel 54 at least in part by supplying an analog electrical (e.g., voltage and/or current) signal to the display pixel 54, for example, to charge and/or discharge a storage capacitor implemented in the display pixel 54.

To facilitate selectively writing its display pixels 54, in some embodiments, an electronic display 12 may be implemented such that each of its display pixels 54 is coupled to the scan driver 51 via a corresponding scan line and to the data driver 52 via a corresponding data line. For example, to write a row of display pixels 54, the scan driver 51 may output an activation (e.g., logic high) control signal to a corresponding scan line that causes each display pixel 54 coupled to the scan line to electrically connect its storage capacitor to a corresponding data line. Additionally, the data driver 52 may output an analog electrical signal to each data line coupled to an activated display pixel 54 to control the amount of electrical energy stored in the display pixel 54 and, thus, magnitude of resulting light emission.

As described above, image data (e.g., image pixel) corresponding with a display pixel 54 may be indicative of its target light emission magnitude, for example, by indicating one or more target achromatic brightness (e.g., grayscale) levels (e.g., values) that are mapped to a light emission magnitude range associated with a panel brightness setting used to display corresponding image content on the display panel 49. Merely as an illustrative non-limiting example, image data corresponding with a display pixel 54 may include red component image data indicative of target light emission magnitude of a red sub-pixel in the display pixel 54, blue component image data indicative of target light emission magnitude of a blue sub-pixel in the display pixel 54, green component image data indicative of target light emission magnitude of a green sub-pixel in the display pixel 54, white component image data indicative of target light emission magnitude of a white sub-pixel in the display pixel 54, or any combination thereof. As such, to display image content, the electronic display 12 may control supply (e.g., magnitude and/or duration) of analog electrical signals from its data driver 52 to its display pixels 54 based at least in part on corresponding image data.

However, to improve image quality, image processing circuitry 27 may be implemented and/or operated to process (e.g., adjust) image data before processed image data is used to display corresponding image content on the display panel 49. Thus, in some embodiments, the image processing circuitry 27 may be included in the processor core complex 18, a display pipeline (e.g., chip or integrated circuit device), a timing controller (TCON) in an electronic display 12, or any combination thereof. Additionally or alternatively, the image processing circuitry 27 may be implemented as a system-on-chip (SoC).

As in the depicted example, the image processing circuitry 27 may be implemented and/or operated to process source image data 40 output from the image source 38. In some embodiments, the image processing circuitry 27 may directly receive the source image data 40 from the image source 38. Additionally or alternatively, the source image data 40 output from the image source 38 may be stored in a tangible, non-transitory, computer-readable medium, such as main memory 20, and, thus, the image processing circuitry 27 may receive (e.g., retrieve) the source image data 40 from the tangible, non-transitory, computer-readable medium, for example, via a direct memory access (DMA) technique.

The image processing circuitry 27 may process the source image data 40 to generate display (e.g., processed or output) image data 56, for example, which adjusts target light emission magnitudes to compensate for operating conditions under which corresponding image content is expected to be displayed on the display panel 49. The display image data 56 may be supplied (e.g., output) to driver circuitry 50 of the electronic display 12 to enable electronic display 12 to display the corresponding image content based on the display image data 56. Due to the processing (e.g., compensation and/or corrections) performed by the image processing circuitry 27, at least in some instances, displaying image content based on display (e.g., processed) image data 56 may facilitate improving perceived quality of the image content and, thus, a display panel 49 and/or an electronic device 10 displaying the image content, for example, compared to displaying the image content directly using corresponding source image data 40.

In some embodiments, the image processing circuitry 27 may be organized into one or more image processing blocks (e.g., circuitry groups). As in the depicted example, the image processing circuitry 27 may include a gamma convert block 58, which is implemented and/or operated to process image data to convert the image data between a linear domain and a gamma (e.g., non-linear) domain. For example, using one or more de-gamma look-up-tables (LUTs) 60, the gamma convert block 58 may convert color component grayscale (e.g., achromatic brightness) levels from a gamma domain to the linear domain. Additionally or alternatively, using one or more re-gamma look-up-tables (LUTs) 62, the gamma convert block 58 may convert color component grayscale levels from the linear domain to a gamma domain. In some embodiments, the image processing circuitry 27 may additionally or alternatively include a dither block 64, for example, which is implemented and/or operated to process image data to introduce structured noise in corresponding image content.

As in the depicted example, the image processing blocks may additionally include one or more compensation (e.g., correction) blocks (e.g., circuitry groups), which each processes image data based at least in part on corresponding compensation parameters to facilitate compensating for operating conditions under which corresponding image content is to be displayed on the display panel 49. For example, the image processing circuitry 27 may include a white point compensation block 66, which is implemented and/or operated to process image data based at least in part on white point compensation parameters to facilitate compensating for a color shift that would otherwise be produced by temperature of the display panel 49 when corresponding image content is displayed and/or backlight brightness of the display panel 49 used to display the corresponding image content. Additionally or alternatively, the image processing circuitry 27 may include a burn-in compensation block 68, which is implemented and/or operated to process image data based at least in part on burn-in compensation parameters to facilitate compensating for light emission variations that would otherwise result from aging of the display pixels 54.

However, it should again be appreciated that the depicted example is merely intended to be illustrative and not limiting. In particular, in other embodiments, image processing circuitry 27 may not include a white point compensation block 66, a burn-in compensation block 68, a dither block 64, a gamma convert block 58, or any combination thereof.

Additionally or alternatively, in other embodiments, image processing circuitry 27 may include one or more other compensation blocks, such as a panel response compensation (PRC) block and/or a pixel drive compensation (PDC) block.

As depicted, the compensation (e.g., correction) blocks additionally include a pixel uniformity compensation (PUC) block 70, which is implemented and/or operated to process image data to facilitate compensating for pixel non-uniformity, such as light emission response non-uniformity resulting from manufacturing tolerances and/or viewing angle non-uniformity resulting from curvature of the display panel 49, based at least in part on pixel uniformity compensation parameters. In some embodiments, the pixel uniformity compensation block 70 may be implemented in the image processing circuitry 27 downstream relative to one or more other compensation blocks, such as the white point compensation block 66 and/or the burn-in compensation block 68, for example, to facilitate maintaining a target white point resulting from upstream processing by the white point compensation block 66. In fact, at least in some embodiments, displaying image content based on image data processed using properly calibrated upstream compensation parameters may result in actual light emission magnitudes that generally (e.g., on average) match corresponding target light emission magnitudes.

Figure 7:
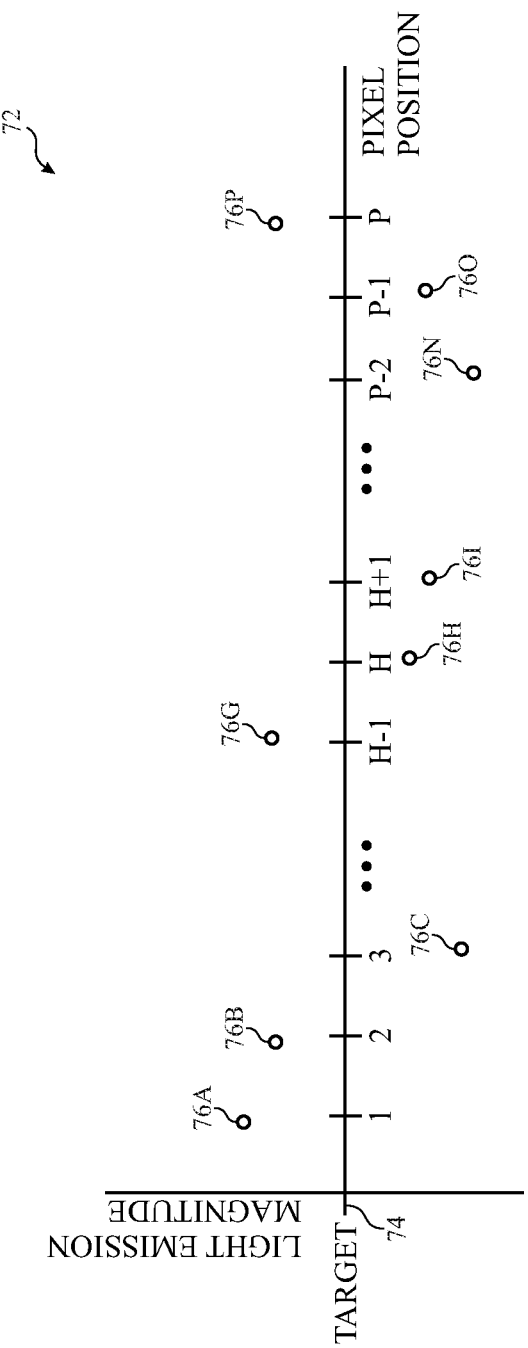
FIG. 7 is an example plot of actual light emission magnitudes resulting from image data processed based on properly calibrated upstream compensation parameters, in accordance with an embodiment of the present disclosure.

To help illustrate, an example plot 72 of light emission magnitudes, which result from image data processed using properly calibrated upstream compensation parameters at pixel positions along a line (e.g., row or column) of display pixels 54, is shown in FIG. 7. However, it should be appreciated that the depicted example is merely intended to be illustrative and not limiting. In particular, in other embodiments, light emission magnitudes resulting from image data processed using properly calibrated upstream compensation parameters may exhibit a different profile.

Merely for illustrative purposes, each of the display pixels 54 described in depicted example has the same target light emission magnitude 74. As depicted, the actual light emission magnitude 76 the display pixels 54 at each of the pixel positions may be relatively close to the target light emission magnitude 74. In fact, in some embodiments, an average of the actual light emission magnitudes 76 output from multiple of the display pixels 54 may match the target light emission magnitude 74. However, as depicted, actual light emission magnitudes 76 output from individual display pixels 54 may nevertheless deviate from the target light emission magnitude 74.

In particular, as depicted, a first actual light emission magnitude 76A of a display pixel 54 at a first (e.g., left-most and/or top-most) pixel position is slightly higher than the target light emission magnitude 74, a second actual light emission magnitude 76B of a display pixel 54 at a second pixel position is slightly higher than the target light emission magnitude 74, and a third actual light emission magnitude 76C of a display pixel 54 at a third pixel position is slightly lower than the target light emission magnitude 74. Additionally, as depicted, an Hth actual light emission magnitude 76H of a display pixel 54 at an Hth (e.g., halfway, middle, and/or central) pixel position is slightly lower than the target light emission magnitude 74, an H−1th actual light emission magnitude 76G of a display pixel 54 at an H−1th pixel position is slightly higher than the target light emission magnitude 74, and an H+1th actual light emission magnitude 76I of a display pixel 54 at an H+1th pixel position is slightly lower than the target light emission magnitude 74. Furthermore, as depicted, a Pth actual light emission magnitude 76P of a display pixel 54 at a Pth (e.g., right-most and/or bottom-most) pixel position is slightly higher than the target light emission magnitude 74, a P−1th actual light emission magnitude 76O of a display pixel 54 at a P−1th pixel position is slightly lower than the target light emission magnitude 74, and a P−2th actual light emission magnitude 76N of a display pixel 54 at a P−2th pixel position is slightly lower than the target light emission magnitude 74.

As described above, in some embodiments, actual light emission magnitude 76 of individual display pixels 54 may deviate from target light emission magnitudes 74 indicated by corresponding image data due to manufacturing tolerances, which allow for slight implementation differences that potentially affect light emission response of display pixels 54. Merely as an illustrative non-limiting example, the manufacturing tolerances may result in different display pixels 54 exhibiting different internal resistances. For example, although the display pixel 54 at the first pixel position and the display pixel 54 at the second pixel position are both within manufacturing tolerances, internal resistance of the display pixel 54 at the first pixel position may be less than the internal resistance of the display pixel 54 at the second pixel position, thereby resulting in the first actual light emission magnitude 76A of the display pixel 54 at the first pixel position being greater than the second actual light emission magnitude 76B of the display pixel 54 at the second pixel position.

As another example, although the display pixel 54 at the first pixel position and the display pixel 54 at the third pixel position are both within manufacturing tolerances, internal resistance of the display pixel 54 at the third pixel position may be greater than the internal resistance of the display pixel 54 at the first pixel position, thereby resulting in the third actual light emission magnitude 76C of the display pixel 54 at the third pixel position being less than the first actual light emission magnitude 76A of the display pixel 54 at the first pixel position. In other words, at least in some instances, manufacturing tolerances may result in light emission response non-uniformly varying between different display pixels 54 implemented on a display panel 49. Although relatively close, at least in some instances, deviation of actual light emission magnitudes 76 from corresponding target light emission magnitudes 74 due to light emission response non-uniformity may nevertheless be perceived as a visual artifact and, thus, affect (e.g., reduce) perceived quality of displayed image content.

Returning to the image processing circuitry 27 of FIG. 6, as described above, to facilitate compensating for pixel non-uniformity including light emission response non-uniformity, the pixel uniformity compensation block 70 may be implemented and/or operated to process image data based at least in part on pixel uniformity compensation parameters. To facilitate compensating for pixel non-uniformity, the pixel uniformity compensation parameters may include one or more pixel uniformity compensation (PUC) factor maps 78, which each explicitly associates (e.g., maps) each of one or more pixel positions on the display panel 49 to a pixel uniformity compensation factor to be applied to image data corresponding with a display pixel 54 at the pixel position. In some embodiments, a pixel uniformity compensation factor may include an offset value, which when applied to image data, biases a target color component grayscale level indicated in the image data. Additionally or alternatively, a pixel uniformity compensation factor may include a gain value, which when applied to image data, scales a target color component grayscale level indicated in the image data. Furthermore, in some embodiments, a pixel uniformity compensation factor map 78 may explicitly associate each pixel position on the display panel 49 to one or more corresponding pixel uniformity compensation factors.

However, at least in some instances, the effect of pixel non-uniformity on perceived image quality may vary between different brightness settings of the display panel 49. For example, due to its smaller default range of light emission magnitudes, a light emission response non-uniformity may be more pronounced when image content is displayed using a lower (e.g., dimmer) panel brightness setting compared to when displayed using a higher (e.g., brighter) panel brightness setting. Conversely, due to its larger default range of light emission magnitudes, a light emission response non-uniformity may be less pronounced when an image is displayed using a higher (e.g., brighter) panel brightness setting compared to when displayed using a lower (e.g., dimmer) panel brightness setting.

Accordingly, to facilitate compensating for variations in pixel non-uniformity, in some embodiments, different pixel uniformity compensation factor maps 78 may be associated with different panel brightness settings of the display panel 49. Additionally, in some embodiments, each of the pixel uniformity compensation factor maps 78 may be stored in the electronic device 10, for example, in main (e.g., external) memory 20, a storage device 22, and/or internal memory of the image processing circuitry 27. As such, to facilitate conserving (e.g., optimizing) storage capacity of the electronic device 10, in some embodiments, a pixel uniformity compensation factor map 78 may explicitly associate each of a subset of pixel positions on the display panel 49 with one or more corresponding pixel uniformity compensation factors. In such embodiments, a pixel uniformity compensation factor to be applied to image data corresponding with a pixel position that is not explicitly identified in the pixel uniformity compensation factor map 78 may be determined by interpolating pixel uniformity compensation factors associated with pixel positions explicitly identified in the pixel uniformity compensation factor map 78, for example, using a linear interpolation, a bi-linear interpolation, a spline interpolation, and/or the like.

Figure 8:
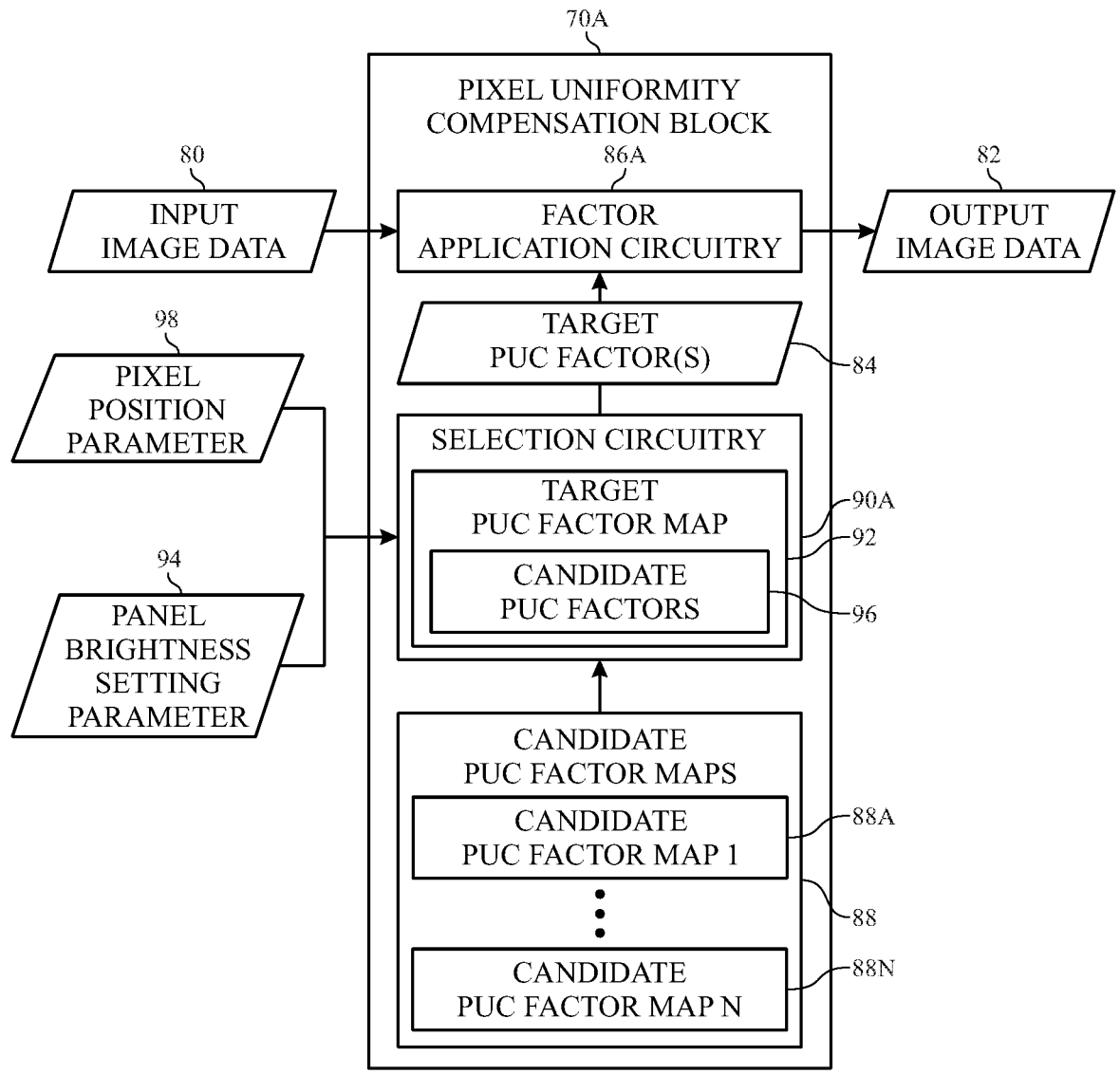
FIG. 8 is a block diagram of a pixel uniformity compensation block that may be implemented in the image processing circuitry of FIG. 6, in accordance with an embodiment of the present disclosure.

To help further illustrate, a more detailed example of a pixel uniformity compensation block (e.g., circuitry group) 70A, which may be implemented in image processing circuitry 27 of an electronic device 10, is shown in FIG. 8. As depicted, the pixel uniformity compensation block 70A receives input image data 80. In some embodiments, the input image data 80 may be source image data 40 output from an image source 38. In other embodiments, upstream image processing circuitry may process the source image data 40 and supply the input image data 80 to the pixel uniformity compensation block 70A.

Additionally, as in the depicted example, the pixel uniformity compensation block 70A may process the input image data 80 to determine (e.g., generate) output image data 82. In some embodiments, the output image data 82 may be display image data 56, which will be supplied to an electronic display 12 to enable the electronic display 12 to display corresponding image content. In other embodiments, the output image data 82 may be supplied to downstream image processing circuitry 27, such as a dither block 64 and/or a pixel drive compensation (PDC) block, for further processing to determine the display image data 56.

As described above, image data may include color component image data indicative of target light emission magnitude of one or more specific color components. For example, the input image data 80 may include red component input image data 80, blue component input image data 80, green component input image data 80, and/or white component input image data 80. Accordingly, the output image data 82 determined by processing the input image data 80 may include red component output image data 82, blue component output image data 82, green component output image data 82, and/or white component output image data 82.

To determine the output image data 82, the pixel uniformity compensation block 70A may apply one or more target pixel uniformity compensation factors 84 to the input image data 80. In particular, as in the depicted example, the pixel uniformity compensation block 70A may include factor application circuitry 86A that receives the input image data 80 and applies the one or more target pixel uniformity compensation factors 84 to the input image data 80 to determine the output image data 82. In some embodiments, a different target pixel uniformity compensation factor 84 may be applied to different color components in the input image data 80. For example, the factor application circuitry 86A may apply a target red pixel uniformity compensation factor 84 to red component input image data 80, a target blue pixel uniformity compensation factor 84 to blue component input image data 80, a target green pixel uniformity compensation factor 84 to green component input image data 80, a target white pixel uniformity compensation factor 84 to white component input image data 80, or any combination thereof.

As described above, pixel uniformity compensation factors to be applied to image data may be indicated via a pixel uniformity compensation factor map 78, which associates each of one or more pixel positions on a display panel 49 to a pixel uniformity compensation factor to be applied to image data corresponding with a display pixel 54 at the pixel position. Additionally, as described above, the effect of pixel non-uniformity on perceived image quality may vary with panel brightness setting of the display panel 49. To facilitate adaptively adjusting pixel non-uniformity compensation applied to input image data 80, as in the depicted example, the pixel uniformity compensation block 70A may include and/or have access to multiple candidate pixel uniformity compensation factor maps 88 from which a target pixel uniformity compensation factor map 92 may be determined (e.g., selected and/or identified).

In some embodiments, each of the candidate pixel uniformity compensation factor maps 88 may be associated with a different panel brightness setting. For example, a first candidate pixel uniformity compensation factor map 88A may be associated with a first panel brightness setting, an Nth candidate pixel uniformity compensation factor map 88N may be associated with an Nth panel brightness setting, and so on. To facilitate determining the target pixel uniformity compensation factor map 92 based on the candidate pixel uniformity compensation factor maps 88, as in the depicted example, the pixel uniformity compensation block 70A may include selection circuitry 90A, which receives a panel brightness setting parameter 94 indicative of a current panel brightness setting of a display panel 49 and/or a panel brightness setting that is expected to be used to display corresponding image content.

Additionally, in some embodiments, a candidate pixel uniformity compensation factor map 88 may explicitly be defined for each panel brightness setting of the display panel 49, for example, via a calibration process, which will be described in more detail below. Thus, at least in such embodiments, the selection circuitry 90A may identify (e.g., select) a candidate pixel uniformity compensation factor map 88 associated with the panel brightness setting indicated by the panel brightness setting parameter 94 as the target pixel uniformity compensation factor map 92. However, as described above, in some embodiments, pixel uniformity compensation factor maps 78 may be stored in the electronic device 10, for example, in main memory 20, a storage device 22, and/or internal memory of the image processing circuitry 27.

As such, to facilitate conserving (e.g., optimizing) storage capacity of the electronic device 10, in some embodiments, candidate pixel uniformity compensation factor maps 88 may be explicitly defined for each of a subset of panel brightness settings, for example, via a calibration process. In other words, in such embodiments, a candidate pixel uniformity compensation factor map 78 may not be explicitly defined for one or more panel brightness settings of the display panel 49. Thus, in such embodiments, when a candidate pixel uniformity compensation factor map 78 corresponding with a panel brightness setting indicated by the panel brightness setting parameter 94 is not explicitly defined, the selection circuitry 90A may determine the target pixel uniformity compensation factor map 92 based on the explicitly defined candidate pixel uniformity compensation factor maps 88, for example, by interpolating by pixel position and color component pixel uniformity compensation factors indicated in a candidate pixel uniformity compensation factor map 78 associated with a higher (e.g., brighter) panel brightness setting and corresponding pixel uniformity compensation factors indicated in a candidate pixel uniformity compensation factor map 78 associated with a lower (e.g., dimmer) brightness setting.

In this manner, the pixel uniformity compensation block 70A may operate to determine a target pixel uniformity compensation factor map 92 to be used to process the input image data 80 based at least in part on a panel brightness setting indicated by the panel brightness setting parameter 94. As described above, in some embodiments, a pixel uniformity compensation factor map explicitly associates each of one or more pixel positions on a display panel 49 to an independently variable (e.g., adjustable) pixel uniformity compensation factor to facilitate compensating for pixel non-uniformity. In other words, in such embodiments, the target pixel uniformity compensation factor map 92 may associate each of the one or more pixel positions on the display panel 49 to a corresponding candidate pixel uniformity compensation factor 96 from which a target pixel uniformity compensation factor 84 to be applied to the input image data 80 may be determined (e.g., selected and/or identified).

As described above, in some embodiments, a pixel uniformity compensation factor map 78, such as a candidate pixel uniformity compensation factor map 88 and/or a target pixel uniformity compensation factor map 92, used by the pixel uniformity compensation block 70A may explicitly associate each pixel position on a display panel 49 with a corresponding pixel uniformity compensation factor. As such, to facilitate determining a target pixel uniformity compensation factor 84 to be applied to the input image data 80, as in the depicted example, the selection circuitry 90A may determine (e.g., receive) a pixel position parameter 98 indicative of a pixel position of a display pixel 54 corresponding with the input image data 80. In some embodiments, a frame of image content may be written to display pixels 54 and, thus, processed in raster order. Accordingly, in such embodiments, image processing circuitry 27 (e.g., pixel uniformity compensation block 70) may determine the pixel position corresponding with the input image data 80 based at least in part on its processing order relative to other image data in the same frame, for example, in view of pixel dimensions of the display panel 49 that will be used to display the image content.

However, as described above, in some embodiments, pixel uniformity compensation factor maps 78 may be stored in the electronic device 10, for example, in main memory 20, a storage device 22, and/or internal memory of the image processing circuitry 27. As such, to facilitate conserving (e.g., optimizing) storage capacity of the electronic device 10, in some embodiments, the pixel uniformity compensation factor maps 78 may each be implemented to explicitly associate a subset of pixel positions on a display panel 49 to one or more corresponding pixel uniformity compensation factors, for example, via a calibration process. In other words, in such embodiments, a target pixel uniformity compensation factor 84 may not be explicitly defined for one or more pixel position on the display panel 49. Thus, in such embodiments, when a candidate pixel uniformity compensation factor 96 corresponding with a pixel position indicated by the pixel position parameter 98 is not explicitly defined in the target pixel uniformity compensation factor map 92, the selection circuitry 90A may determine the target pixel uniformity compensation factor 84 by interpolating by pixel position and color component pixel uniformity compensation factors associated with pixel positions explicitly identified in the pixel uniformity compensation factor map 78, for example, using a linear interpolation, a bi-linear interpolation, a spline interpolation, and/or the like.

As described above, the factor application circuitry 86A may apply one or more target pixel uniformity compensation factors 84 to the input image data 80, thereby processing the input image data 80 to determine (e.g., generate) output image data 82. In particular, as described above, processing the input image data 80 in this manner may enable different pixel uniformity compensation factors to be applied at different pixel positions and/or to different color components, which, at least in some instances may facilitate compensating (e.g., correcting and/or offsetting) for variations in light emission response. In other words, when pixel uniformity compensation parameters, such as candidate pixel uniformity compensation factor maps 88, interpolation scheme used to determine a target pixel uniformity compensation factor map 92 from the candidate pixel uniformity compensation factor maps 88, and/or interpolation scheme used to determine a target pixel uniformity compensation factor 84 from candidate pixel uniformity compensation factors 96 explicitly identified in the target pixel uniformity compensation factor map 92, are properly calibrated for a display panel 49 of an electronic display 12, processing input image data 80 based on the calibrated pixel uniformity compensation parameters may result in corresponding output image data 82 that facilitates bringing actual light emission magnitude 76 of individual display pixels 54 on the display panel 49 closer to corresponding target light emission magnitudes 74.

Figure 9:
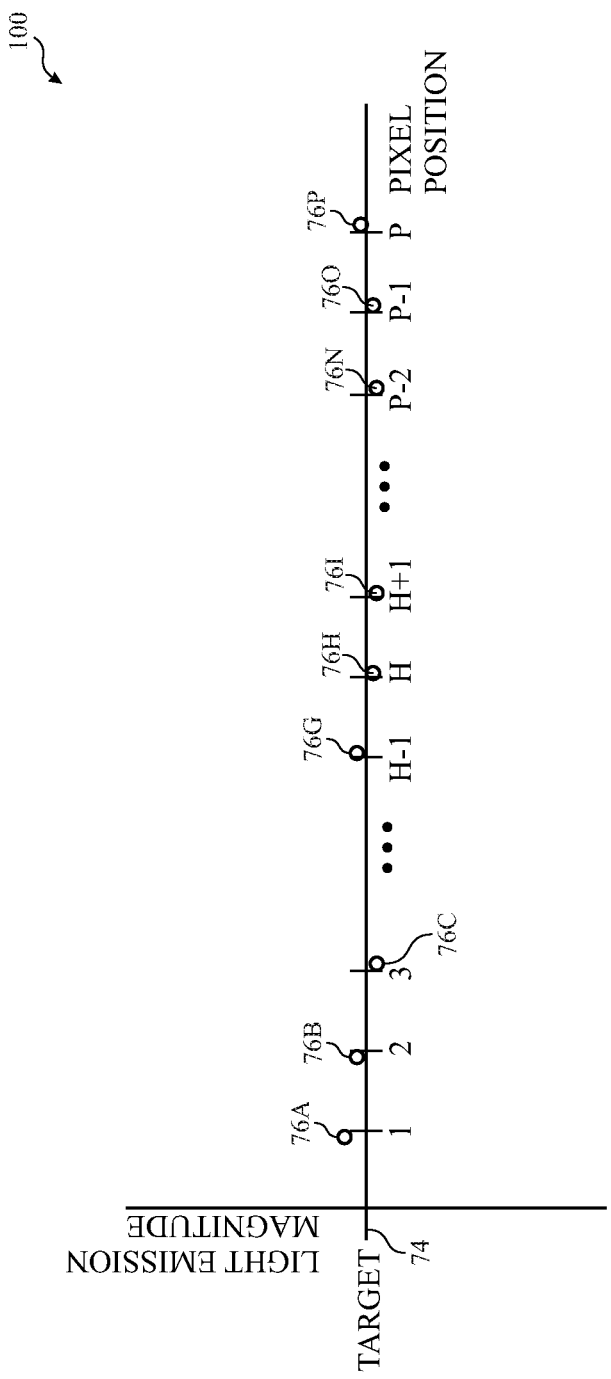
FIG. 9 is an example plot of actual light emission magnitudes resulting from image data processed based on properly calibrated upstream compensation parameters and properly calibrated flat panel pixel uniformity compensation parameters, in accordance with an embodiment of the present disclosure.

To help illustrate, an example plot 100 of light emission magnitudes, which result from image data processed using properly calibrated upstream compensation parameters as well as properly calibrated pixel uniformity compensation parameters at pixel positions along a line (e.g., row or column) of display pixels 54, is shown in FIG. 9. However, it should be appreciated that the depicted example is merely intended to be illustrative and not limiting. In particular, in other embodiments, light emission magnitudes resulting from image data processed using properly calibrated upstream compensation parameters and properly calibrated pixel uniformity compensation parameters may exhibit a different profile.

Merely for illustrative purposes, as in the example plot 72 of FIG. 7, each of the display pixels 54 described in the example plot 100 of FIG. 9 has the same target light emission magnitude 74. As depicted, the actual light emission magnitude 76 of display pixels 54 at one or more of the pixel positions may nevertheless differ from the target light emission magnitude 74. However, as depicted, compared to the actual light emission magnitudes 76 of FIG. 7, the actual light emission magnitudes 76 of FIG. 9 at each of the pixel positions is closer to the target light emission magnitude 74.

As described above, since processing image data using properly calibrated upstream compensation parameters may result in actual light emission magnitudes 76 that match target light emission magnitudes 74 on average, in some embodiments, pixel uniformity compensation parameters may calibrated such that different pixel uniformity compensation factors are applied at different pixel positions to facilitate compensating (e.g., offsetting) for variations in light emission response expected to occur at the different pixel positions. For example, the pixel uniformity compensation parameters may be calibrated such that application of a target pixel uniformity compensation factor 84 results in the target light emission magnitude 74 of a display pixel 54 at the third pixel position being increased (e.g., boosted) relative to the target light emission magnitude 74 of a display pixel 54 at the first pixel position, a display pixel 54 at the second pixel position, a display pixel 54 at the H−1th pixel position, and/or a display pixel 54 at the Pth pixel position. Additionally or alternatively, the pixel uniformity compensation parameters may be calibrated such that application of a target pixel uniformity compensation factor 84 results in target light emission magnitude 74 of the display pixel 54 at the first pixel position being decreased relative to the target light emission magnitude 74 of the display pixel 54 at the third pixel position, a display pixel 54 at the Hth pixel position, a display pixel 54 at the H+1th pixel position, a display pixel 54 at the P−2th pixel position, and/or a display pixel 54 at the P−1th pixel position.

However, at least in some instances, a portion of light emitted from a display pixel 54 may not actually be perceived by a user. In fact, at least in some instances, the portion of light emitted from a display pixel 54 that is actually perceived by a user and, thus, perceived luminance of the display pixel 54 may vary with viewing angle, for example, due to light emission generally being strongest along a normal axis of the display pixel 54 and weakening as viewing angle moves away from the normal axis. On a flat display panel 49, display pixels 54 may be implemented such that their normal axes are each oriented (e.g., point) in the same direction (e.g., orientation), which generally results in perceived luminance at pixel positions on the flat display panel 49 being affected by the same viewing angle. Thus, at least in some instances, bringing actual light emission magnitude 76 of one or more display pixels 54 on a flat display panel 49 closer to corresponding target light emission magnitudes 74 may facilitate bringing actual perceived luminance at one or more pixel positions on the flat display panel 49 closer to corresponding target perceived luminances and, thus, improving perceived image quality provided by the flat display panel 49 and/or an electronic device 10 using the flat display panel 49.

However, in some embodiments, an electronic device 10 may display image content using a curved display panel 49. In such embodiments, curvature of the curved display panel 49 may result in display pixels 54 concurrently being viewed from different viewing angles. In other words, in such embodiments, actual light emission magnitude 76 and, thus, perceived luminance of display pixels 54 on the curved display panel 49 may concurrently be affected by different viewing angles. In fact, at least in some instances, viewing angle non-uniformity due to curvature of a curved display panel 49 may result in actual light emission magnitudes 76, which match corresponding target light emission magnitudes 74, producing actual perceived luminances that differ from corresponding target perceived luminances.

Figure 10:
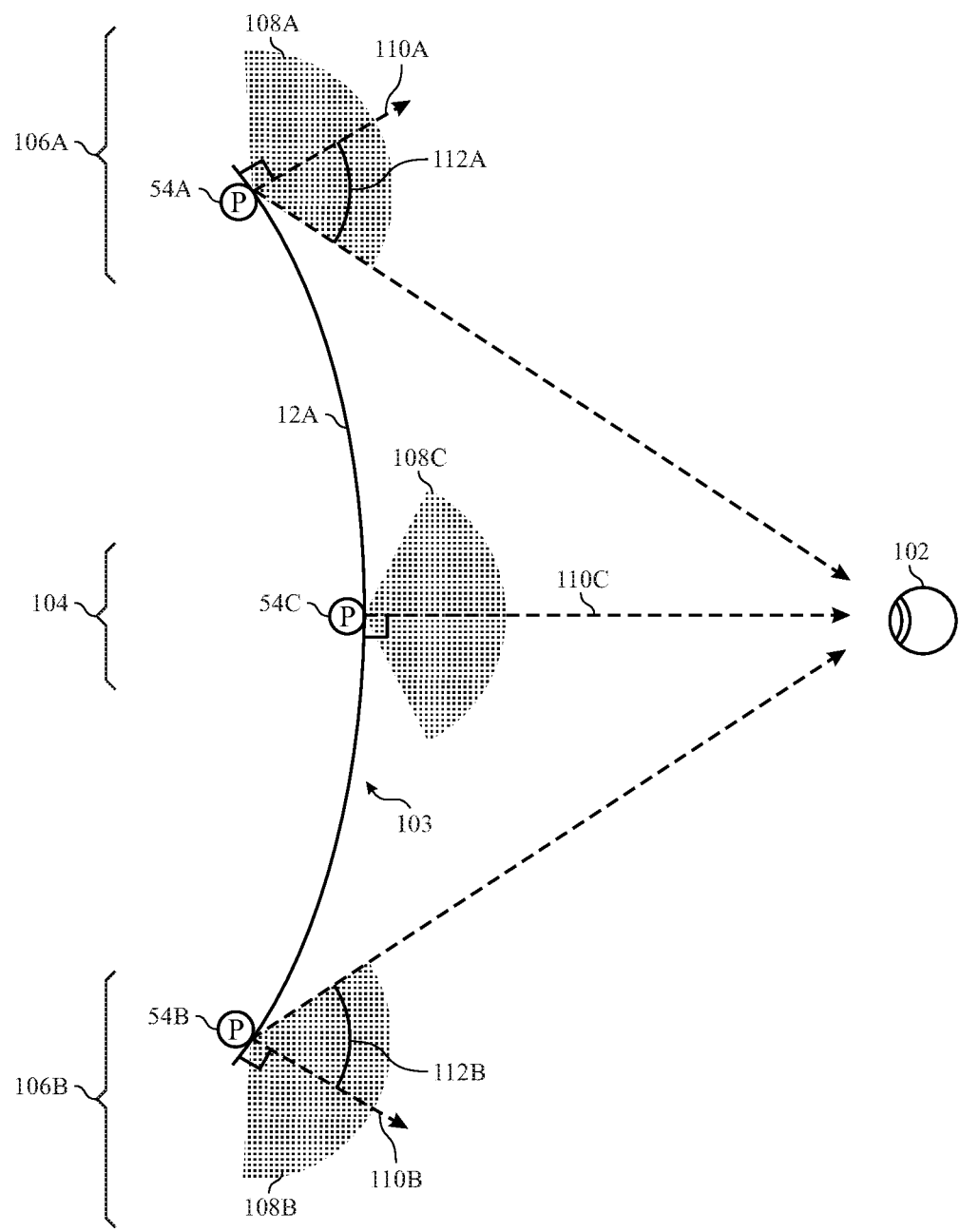
FIG. 10 is a side (e.g., profile) view of an example of a curved display panel, in accordance with an embodiment of the present disclosure.

To help illustrate, an example of a side (e.g., profile) view of a curved (e.g., convex) display panel 49 relative to a user's eye 102 facing its viewing surface 103 is shown in FIG. 10. However, it should be appreciated that the depicted example is merely intended to be illustrative and not limiting. In particular, in other embodiments, the techniques described in the present disclosure may be implemented for a curved display panel 49 with a different shape (e.g., profile), such as a concave shape.

As depicted, the curved display panel 49 includes a central (e.g., middle and/or on-axis) portion 104 and multiple side (e.g., off-axis) portions 106—namely a first side portion 106A and a second side portion 106B. In some embodiments, the curved display panel 49 may be curved about (e.g., relative to) a vertical axis and, thus, the first side portion 106A may be a right portion of the curved display panel 49A and the second side portion 106B may be a left portion of the curved display panel 49A. Additionally or alternatively, the curved display panel 49 may be curved about (e.g., relative to) a horizontal axis and, thus, the first side portion 106A may be a top portion of the curved display panel 49A and the second side portion 106B may be a bottom portion of the curved display panel 49A.

Furthermore, as depicted, a central (e.g., middle and/or on-axis) display pixel 54C is implemented in the central portion 104 of the curved display panel 49A, while a first side (e.g., off-axis) display pixel 54A is implemented in the first side portion 106A of the curved display panel 49A and a second side (e.g., off-axis) display pixel 54B is implemented in the second side portion 106B of the curved display panel 49A. Moreover, as depicted, each of the display pixels 54 emits light 108 centered around its normal axis 110. In particular, the first side display pixel 54A emits light 108A centered around a first normal axis 110A, the second side display pixel 54B emits light 108B centered around a second normal axis 110B, and the central display pixel 54C emits light 108C centered around a third normal axis 110C.

As in the depicted example, light 108 emitted by a display pixel 54 generally radiates outwardly from the display pixel 54, for example, in a conical shape. Thus, as described above, magnitude of light 108 emitted from a display pixel 54 is generally strongest (e.g., greatest and/or brightest) along its normal axis 110 and weakens as viewing angle moves away from the normal axis 110. In other words, the amount of light 108 emitted from a display pixel 54 that is actually perceived by a user's eye 102 and, thus, perceived luminance of the display pixel 54 may vary with viewing angle of the display pixel 54 relative to its normal axis 110.

However, due to curvature of the curved display panel 49A, as depicted, the first normal axis 110A of the first side display pixel 54A, the second normal axis 110B of the second side display pixel 54B, and the third normal axis 110C of the central display pixel 54C may each be oriented in a different direction (e.g., orientation) and, thus, concurrently viewed by the user's eye 102 with different viewing angles. For example, when viewing angle of the central display pixel 54C matches its third normal axis 110C, the user's eye 102 may also concurrently perceive the first side display pixel 54A with a first viewing angle, which deviates from its first normal axis 110A by a first non-zero angle 112A, and the second side display pixel 54B with a second viewing angle, which deviates from the second normal axis 110B by a second non-zero angle 112B. In other words, due to at least in part to its curvature, display pixels 54 implemented on the curved display panel 49A may be concurrently viewed (e.g., perceived) with differing (e.g., non-uniform) viewing angles. As such, even when actual light emission magnitude 76 of each display pixel 54 on the curved display panel 49A matches the same target light emission magnitude 74, different perceived luminances may nevertheless result.

Figure 11:
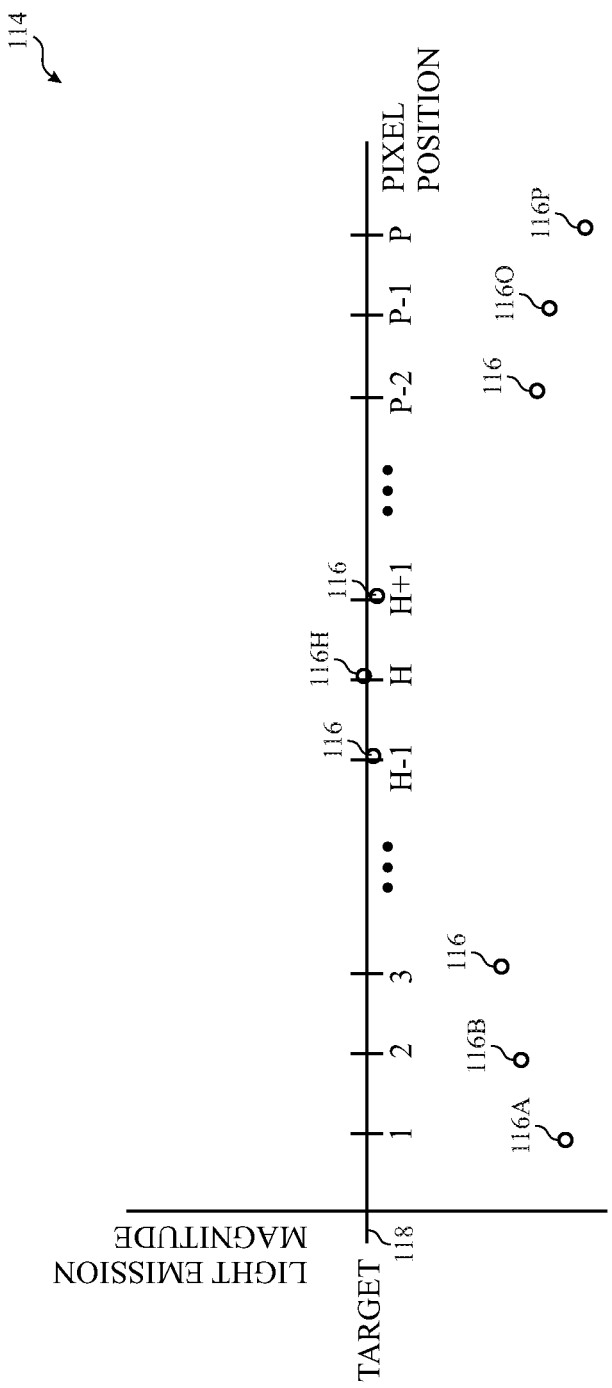
FIG. 11 is an example plot of actual perceived luminances resulting from producing the actual light emission magnitudes of FIG. 9 on the curved display panel of FIG. 10, in accordance with an embodiment of the present disclosure.

To help illustrate, an example plot 114 of actual perceived luminances 116, which result from the actual light emission magnitudes 74 of FIG. 9 at pixel positions along a line (e.g., row or column) of display pixels 54 on a curved (e.g., convex) display panel 49, is shown in FIG. 11. However, it should be appreciated that the depicted example is merely intended to be illustrative and not limiting. In particular, in other embodiments, actual perceived luminances 116 produced by a different curved display panel 49 may exhibit a different profile.

Merely for illustrative purposes, each of the display pixels 54 is associated with the same target perceived luminance 118. Additionally, merely for illustrative purposes, each of the display pixels 54 produces an actual light emission magnitude 76 that matches a target flat panel light emission magnitude 74. Thus, as depicted in the depicted example, an Hth actual perceived luminance 116H at the Hth pixel position may match the target perceived luminance 118, for example, due to a user's eye 102 perceiving a display pixel 54 at the Hth pixel position with a viewing angle that matches its normal axis 110.

However, as depicted, actual perceived luminance 116 at other pixel positions nevertheless deviate from the target perceived luminance 118. In fact, as depicted, the amount of deviation of actual perceived luminance 116 and the target perceived luminance 118 may vary by pixel position, for example, due to a user's eye 102 concurrently perceiving display pixels 54 at different pixel positions with viewing angles that deviate different amounts from corresponding normal axes 110. For example, deviation of a first actual perceived luminance 116A at the first pixel position may be greater than deviation of a second actual perceived luminance 116B at the second pixel position due to curvature of the curved display panel 49 resulting in viewing angle of a display pixel 54 at the first pixel position deviating from its normal axis 110 by more than the viewing angle of a display pixel 54 at the second pixel position deviates from its normal axis 110. Similarly, deviation of a Pth actual perceived luminance 116P at the Pth pixel position may be greater than deviation of a P−1th actual perceived luminance 116O at the P−1th pixel position due to curvature of the curved display panel 49 resulting in viewing angle of a display pixel 54 at the Pth pixel position deviating from its normal axis 110 by more than the viewing angle of a display pixel 54 at the P−1th pixel position deviates from its normal axis 110.

However, at least in some instances, actual perceived luminance 116 differing from a corresponding target perceived luminance 118 may result in one or more perceivable visual artifacts occurring in displayed image content. In other words, at least in some instances, displaying image content on a curved display panel 49 based on image data processed using compensation parameters calibrated for a flat display panel 49 may affect (e.g., reduce) perceived quality of the image content and, thus, potentially the curved display panel 49 displaying the image content. To facilitate improving perceived image quality provided by a curved display panel 49, in some embodiments, image processing circuitry 27 may process image data based on curved panel compensation parameters, for example, determined via a calibration process, which will be described in more detail below.

Returning to the image processing circuitry 27 of FIG. 6, as in the depicted example, the curved panel compensation factors may include one or more panel curvature compensation (PCC) factor maps 120, which each associates each of one or more pixel positions on the display panel 49 to a panel curvature compensation (PCC) factor to be applied to image data corresponding with a display pixel 54 at the pixel position. In some embodiments, a panel curvature compensation factor may include an offset value, which when applied to image data, biases a target color component grayscale level indicated in the image data. Additionally or alternatively, a panel curvature compensation factor may include a gain value, which when applied to image data, scales a target color component grayscale level indicated in the image data. Furthermore, in some embodiments, a panel curvature compensation factor map 120 may explicitly associate each pixel position on the display panel 49 to one or more corresponding panel curvature compensation factors.

However, at least in some instances, the effect of pixel non-uniformity, such as viewing angle non-uniformity resulting from curvature of a curved display panel 49, may vary between different brightness settings of the display panel 49. Accordingly, to facilitate compensating for variations in pixel non-uniformity, in some embodiments, different panel curvature compensation factor maps 120 may be associated with different panel brightness settings of the display panel 49. In fact, in some embodiments, a panel curvature compensation factor map 120 and a flat panel pixel uniformity compensation factor map 78 associated with the same panel brightness setting may be combined to generate a curved panel pixel uniformity compensation factor map 78, which explicitly associates each of one or more pixel positions on the display panel 49 to a curved panel pixel uniformity compensation factor to be applied to image data corresponding with a display pixel 54 at the pixel position.

In other words, in some such embodiments, image processing circuitry 27 may process image data based on calibrated flat panel compensation parameters when corresponding image content is to be displayed on a flat display panel 49 while processing the image data based on calibrated curved panel compensation parameters when the corresponding image content is to be displayed on a curved display panel 49. To help illustrate, with regard to the example of FIG. 8, the pixel uniformity compensation block 70A may determine a target flat panel pixel uniformity compensation factor map 92 from candidate flat panel pixel uniformity compensation factor maps 88 and determine a target flat panel pixel uniformity compensation factor 84 to be applied to input image data 80 based on one or more candidate flat panel pixel uniformity compensation factors 96 explicitly identified in the target flat panel pixel uniformity compensation factor map 92 in response to determining that corresponding image content will be displayed on a flat display panel 49. On the other hand, in response to determining that corresponding image content will be displayed on a curved display panel 49, the pixel uniformity compensation block 70A may determine a target curved panel pixel uniformity compensation factor map 92 from candidate curved panel pixel uniformity compensation factor maps 88 and determine a target curved panel pixel uniformity compensation factor 84 to be applied to input image data 80 based on one or more candidate curved panel pixel uniformity compensation factors 96 indicated in the target curved panel pixel uniformity compensation factor map 92.

In other embodiments, a panel curvature compensation factor determined based on a panel curvature compensation factor map 120 may be separately applied to image data, for example, after application of a flat panel pixel uniformity compensation factor determined based on a flat panel pixel uniformity compensation factor map 78. Accordingly, in such embodiments, each of the panel curvature compensation factor maps 120 may be stored in the electronic device 10, for example, in main (e.g., external) memory 20, a storage device 22, and/or internal memory of the image processing circuitry 27. To facilitate conserving (e.g., optimizing) storage capacity of the electronic device 10, in some embodiments, a panel curvature compensation factor map 120 may explicitly associate each of a subset of pixel positions on the display panel 49 with one or more corresponding panel curvature compensation factors. In such embodiments, a panel curvature compensation factor to be applied to image data corresponding with a pixel position that is not explicitly identified in a panel curvature compensation factor map 120 may be determined by interpolating panel curvature compensation factors associated with pixel positions explicitly identified in the panel curvature compensation factor map 120, for example, using a linear interpolation, a bi-linear interpolation, a spline interpolation, and/or the like.

Figure 12:
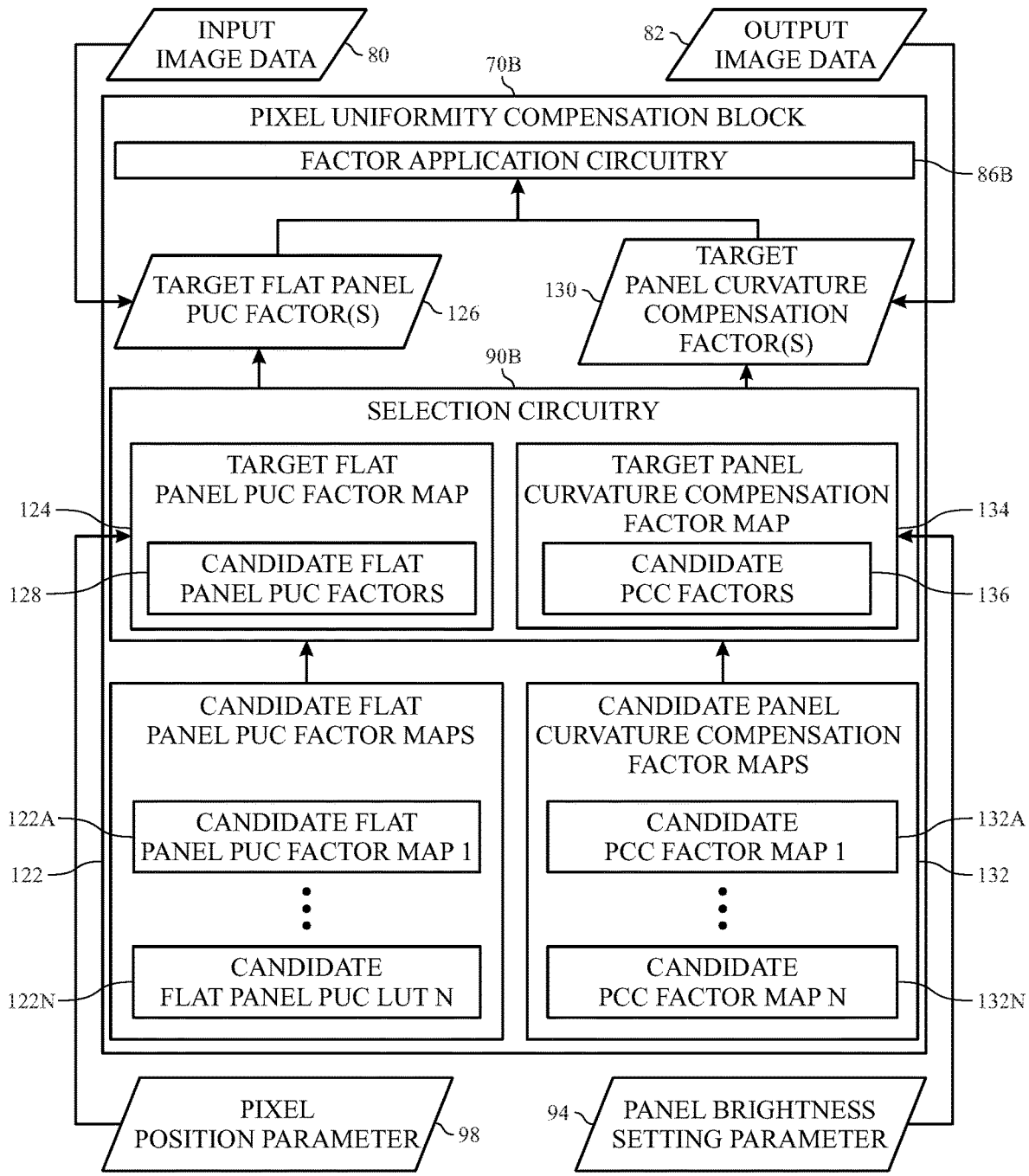
FIG. 12 is another example of a pixel uniformity compensation block that may be implemented in the image processing circuitry of FIG. 6, in accordance with an embodiment of the present disclosure.

To help further illustrate, another example of a pixel uniformity compensation block (e.g., circuitry group) 70B, which may be implemented in image processing circuitry 27 of an electronic device 10, is shown in FIG. 12. As with the pixel uniformity compensation block 70A of FIG. 8, the pixel uniformity compensation block 70B of FIG. 12 receives input image data 80, which may be source image data 40 output from an image source 38 and/or processed image data resulting from upstream processing of the source image data 40. Additionally, as with the pixel uniformity compensation block 70A of FIG. 8, the pixel uniformity compensation block 70B of FIG. 12 may process the input image data 80 to determine (e.g., generate) output image data 82, which may be output to an electronic display 12 as display image data 56 and/or further processed by downstream image processing circuitry 27 to determine the display image data 56. Furthermore, as with the pixel uniformity compensation block 70A of FIG. 8, to facilitate processing the input image data 80, the pixel uniformity compensation block 70B of FIG. 12 includes factor application circuitry 86B and selection circuitry 90B.

In particular, similar to the selection circuitry 90A of FIG. 8, the selection circuitry 90B of FIG. 12 may have access to candidate pixel uniformity compensation factor maps 88—namely candidate flat panel pixel uniformity compensation factor maps 122—which are each associated with a different panel brightness setting. For example, a first candidate flat panel pixel uniformity compensation factor map 122A may be associated with a first panel brightness setting, an Nth candidate flat panel pixel uniformity compensation factor map 122N may be associated with an Nth panel brightness setting, and so on. Based on the candidate flat panel pixel uniformity compensation factor maps 122, similar to the selection circuitry 90A of FIG. 8, the selection circuitry 90B of FIG. 12 may determine (e.g., identify and/or select) a target pixel uniformity compensation factor map 92—namely a target flat panel pixel uniformity compensation factor map 124—associated with a panel brightness setting indicated by a panel brightness setting parameter 94. Furthermore, similar to the selection circuitry 90A of FIG. 8, the selection circuitry 90B of FIG. 12 may determine one or more target pixel uniformity compensation factors 84—namely target flat panel pixel uniformity compensation factors 126—corresponding with a pixel position identified by a pixel position parameter 98 based at least in part on one or more candidate pixel uniformity compensation factors 96—namely candidate flat panel pixel uniformity compensation factors 128—associated with a pixel position explicitly identified in the target flat panel pixel uniformity compensation factor map 124.

Moreover, similar to the factor application circuitry 86A of FIG. 8, the factor application circuitry 86B of FIG. 12 may apply the one or more target flat panel pixel uniformity compensation factors 126 to the input image data 80 to facilitate determining (e.g., generating) the output image data 82. However, as in the depicted example, the factor application circuitry 86B of FIG. 12 may additionally apply one or more target panel curvature compensation (PCC) factors 130, for example, on top of (e.g., after) the one or more target flat panel pixel uniformity compensation (PUC) factors 126. In fact, in some embodiments, a different target panel curvature compensation factor 130 may be applied to different color components in the input image data 80. For example, the factor application circuitry 86B may apply a target red component panel curvature compensation factor 130 to red component image data, a target blue component panel curvature compensation factor 130 to blue component image data, a target green component panel curvature compensation factor to green component image data, a target white component panel curvature compensation factor to white component image data, or any combination thereof.

As described above, panel curvature compensation factors to be applied to image data may be indicated via a panel curvature compensation factor map 120, which explicitly associates each of one or more pixel positions on a display panel 49 to a panel curvature compensation factor to be applied to image data corresponding with a display pixel 54 at the pixel position. Additionally, as described above, the effect of pixel non-uniformity, such as viewing angle non-uniformity resulting from curvature of a curved display panel 49, on perceived image quality may vary with panel brightness setting of the display panel 49. To facilitate adaptively adjusting panel curvature compensation factors applied, as depicted, the selection circuitry 90B may additionally have access to multiple candidate panel curvature compensation factor maps 132 from which a target panel curvature compensation factor map 134 may be determined (e.g., selected and/or identified).

In some embodiments, each of the candidate panel curvature compensation factor maps 132 may be associated with a different panel brightness setting. In fact, in some embodiments, a candidate panel curvature compensation factor map 132 may be explicitly defined for each panel brightness setting for which a candidate flat panel pixel uniformity compensation factor map 122 is also defined. In other words, continuing with the above example, a first candidate panel curvature compensation factor map 132A may be associated with the first panel brightness setting (e.g., same panel brightness setting as first candidate flat panel pixel uniformity compensation factor map 120A), an Nth candidate panel curvature compensation factor map 132N may be associated with the Nth panel brightness setting (e.g., same panel brightness setting as Nth candidate flat panel pixel uniformity compensation factor map 120N), and so on.

Additionally, in some embodiments, a candidate panel curvature compensation factor map 132 may explicitly be defined for each panel brightness setting of the display panel 49, for example, via a calibration process, which will be described in more detail below. Thus, at least in such embodiments, the selection circuitry 90B may identify (e.g., select) a candidate panel curvature compensation factor map 132 associated with the panel brightness setting indicated by the panel brightness setting parameter 94 as the target panel curvature compensation factor map 134. However, as described above, in some embodiments, panel curvature compensation factor maps 120 may be stored in the electronic device 10, for example, in main memory 20, a storage device 22, and/or internal memory of the image processing circuitry 27.

As such, to facilitate conserving (e.g., optimizing) storage capacity of the electronic device 10, in some embodiments, candidate panel curvature compensation factor maps 132 may be explicitly defined for a subset of panel brightness settings of a display panel 49, for example, via a calibration process. In other words, in such embodiments, a candidate panel curvature compensation factor map 132 may not be explicitly defined for one or more panel brightness settings of the display panel 49. Thus, in such embodiments, when a candidate panel curvature compensation factor map 132 corresponding with a panel brightness setting indicated by the panel brightness setting parameter 94 is not explicitly defined, the selection circuitry 90B may determine the target panel curvature compensation factor map 134 based on the explicitly defined candidate panel curvature compensation factor maps 132, for example, by interpolating by pixel position and color component the panel curvature compensation factors indicated in a candidate panel curvature compensation factor map 132 associated with a higher (e.g., brighter) panel brightness setting and corresponding panel curvature compensation factors indicated in a candidate panel curvature compensation factor map 132 associated with a lower (e.g., dimmer) panel brightness setting.

As described above, in some embodiments, a panel curvature compensation factor map 120, such as a candidate panel curvature compensation factor map 132 and/or a target panel curvature compensation factor map 134, used by the pixel uniformity compensation block 70B may explicitly associate each pixel position on a display panel 49 with one or more corresponding panel curvature compensation factors. As such, to facilitate determining a target panel curvature compensation factor to be applied to image data, as in the depicted example, the selection circuitry 90B may determine (e.g., receive) a pixel position parameter 98 indicative of a pixel position of a display pixel 54 corresponding with the input image data 80.

However, as described above, in some embodiments, panel curvature compensation factor maps 120 may be stored in the electronic device 10, for example, in main memory 20, a storage device 22, and/or internal memory of the image processing circuitry 27. As such, to facilitate conserving (e.g., optimizing) storage capacity of the electronic device 10, in some embodiments, the panel curvature compensation factor maps 120 may each be implemented to explicitly associate a subset of pixel positions on a display panel 49 to one or more corresponding panel curvature compensation factors, for example, via a calibration process. In other words, in such embodiments, a target panel curvature compensation factor 130 may not be explicitly defined for one or more pixel position on the display panel 49. Thus, in such embodiments, when a candidate panel curvature compensation factor 136 corresponding with a pixel position indicated by the pixel position parameter 98 is not explicitly defined in the target panel curvature compensation factor map 134, the selection circuitry 90A may determine the target panel curvature compensation factor 130 based on the explicitly defined candidate panel curvature compensation factors 136, for example, by interpolating by pixel position and color component candidate panel curvature compensation factors 136 explicitly associated with surrounding pixel positions in the target panel curvature compensation factor map 134.

As described above, the factor application circuitry 86B may apply the target panel curvature compensation factors 130 and the target flat panel pixel uniformity compensation factors 126 to the input image data 80, thereby processing the input image data 80 to determine (e.g., generate) output image data 82. In particular, as described above, processing the input image data 80 in this manner may enable different panel curvature compensation factors to be applied at different pixel positions and/or to different color components, which, at least in some instances may facilitate compensating (e.g., correcting and/or offsetting) for viewing angle non-uniformity resulting from curvature of a curved display panel 49. In other words, when curved panel pixel uniformity compensation parameters are properly calibrated for a curved display panel 49, image processing circuitry 27 (e.g., pixel uniformity compensation block 70) implemented in this manner may operate to process image data based on the calibrated pixel uniformity compensation parameters, which, at least in some instances, may facilitate bringing actual perceived luminance 116 at one or more pixel positions on the curved display panel 49 closer to corresponding target perceived luminances 118 and, thus, improving perceived image quality provided by the curved display panel 49.

Figure 13:
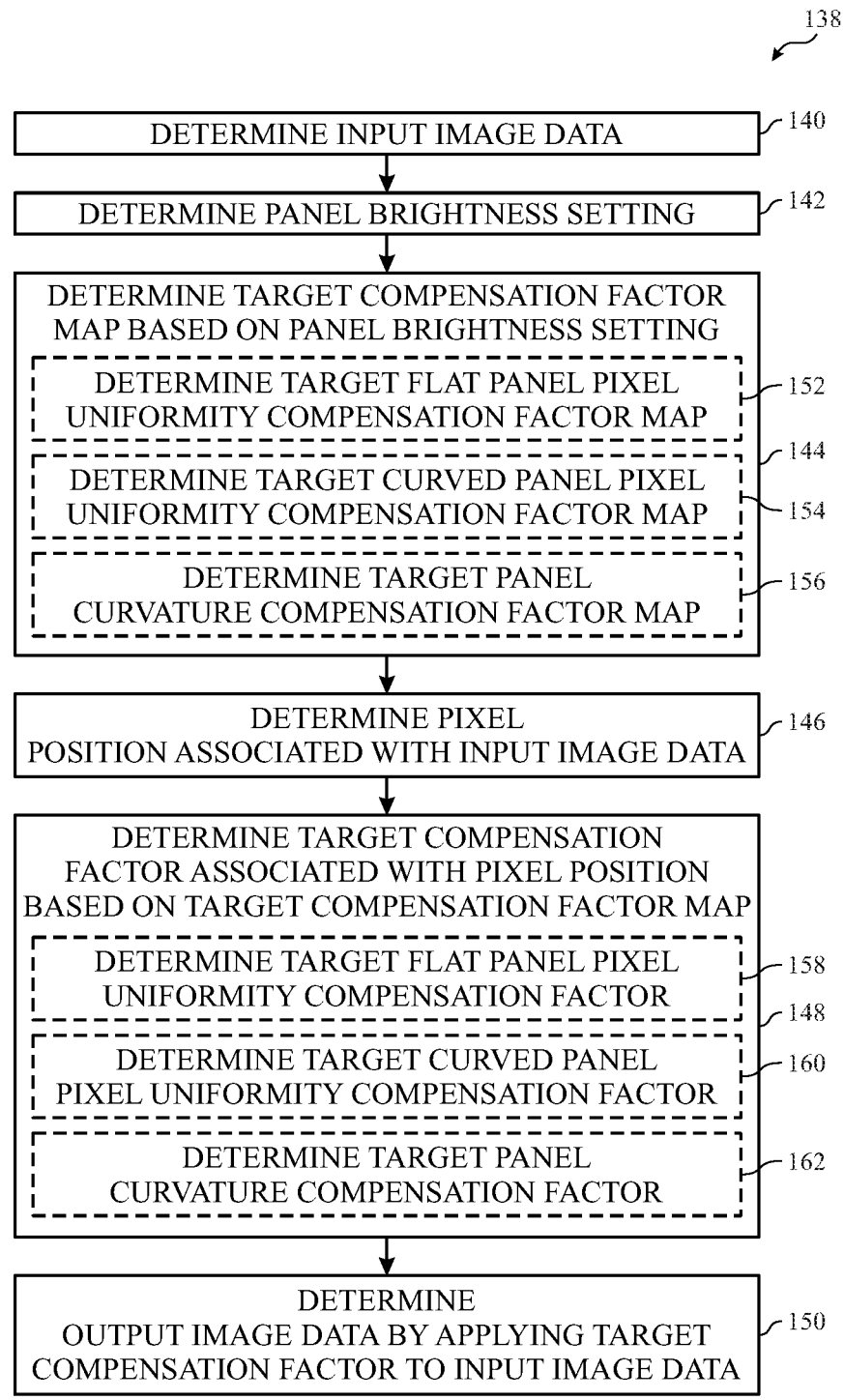
FIG. 13 is a flow diagram of an example process for operating a pixel uniformity compensation block implemented in the image processing circuitry of FIG. 6, in accordance with an embodiment of the present disclosure.

To help further illustrate, an example of a process 138 for operating a pixel uniformity compensation block (e.g., circuitry group) 70, which may be implemented in image processing circuitry 27 of an electronic device 10, is described in FIG. 13. Generally, the process 138 includes determining input image data (process block 140), determining a panel brightness setting (process block 142), and determining a target compensation factor map based on the panel brightness setting (process block 144). Additionally, the process 138 includes determining a pixel position associated with the input image data (process block 146), determining a target compensation factor associated with the pixel position based on the target compensation factor map (process block 148), and determining output image data by applying the target compensation factor to the input image data (process block 150).

Although described in a particular order, which represents a particular embodiment, it should be noted that the process 138 may be performed in any suitable order. Additionally, embodiments of the process 138 may omit process blocks and/or include additional process blocks. Moreover, in some embodiments, the process 138 may be implemented at least in part by executing instructions stored in a tangible, non-transitory, computer-readable medium, such as controller memory 48, using processing circuitry, such as the controller processor 46.

Accordingly, in some embodiments, a controller 44 may instruct image processing circuitry 27 implemented in an electronic device 10 to determine input image data 80, which is to be supplied to a pixel uniformity compensation block 70 implemented therein (process block 140). As described above, in some embodiments, the input image data 80 may be source image data 40 and, thus, output and/or received from an image source 38. In other embodiments, upstream image processing circuitry 27 may process the source image data 40 to determine the input image data 80 supplied to the pixel uniformity compensation block 70.

Additionally, the pixel uniformity compensation block 70 may determine a panel brightness setting of a (e.g., curved) display panel 49 that will be used to display image content corresponding with the input image data 80 (process block 142). As described above, in some embodiments, the pixel uniformity compensation block 70 may receive a panel brightness setting parameter 94 indicative of a panel brightness setting of the display panel 49. For example, the panel brightness setting parameter 94 may identify a current panel brightness setting of the display panel 49 and/or a panel brightness setting that is expected to be used to display the image content corresponding with the input image data 80.

Based at least in part on the panel brightness setting, the pixel uniformity compensation block 70 may determine (e.g., identify and/or select) one or more target compensation factor maps, such as a target pixel uniformity compensation factor map 92 (e.g., a target flat panel pixel uniformity compensation factor map 124) and/or a target panel curvature compensation factor map 134 (process block 144). As described above, in some embodiments, a compensation factor map, such as a pixel uniformity compensation factor map 78 and/or a panel curvature compensation factor map 120, may be calibrated to a specific type of display panel 49. For example, candidate flat panel pixel uniformity compensation factor maps 122 used to determine a target flat panel pixel uniformity compensation factor 126 may be calibrated for a specific type of flat display panel 49. Additionally or alternatively, candidate panel curvature compensation factor maps 132 used to determine a target panel curvature compensation factor 130 may calibrated for a specific type of curved display panel 49, for example, which is implemented by bending a flat display panel 49.

As such, when the image content corresponding with the input image data 80 is to be displayed on a flat display panel 49, the pixel uniformity compensation block 70 may determine a target flat panel pixel uniformity compensation factor map 124 associated with the panel brightness setting, for example, by selecting a candidate flat panel pixel uniformity compensation factor map 122 explicitly defined for the panel brightness setting and/or interpolating a candidate flat panel pixel uniformity compensation factor map 122 explicitly defined for a higher (e.g., brighter) panel brightness setting with a candidate flat panel pixel uniformity compensation factor map 122 explicitly defined for lower (e.g., dimmer) panel brightness setting (process block 152). On the other hand, when the image content corresponding with the input image data 80 is to be displayed on a curved display panel 49, the pixel uniformity compensation block 70 may determine a target curved panel pixel uniformity compensation factor map 92 associated with the panel brightness setting, for example, by selecting a candidate curved panel pixel uniformity compensation factor map 88 explicitly defined for the panel brightness setting and/or interpolating a candidate curved panel pixel uniformity compensation factor map 88 explicitly defined for a higher (e.g., brighter) panel brightness setting with a candidate curved panel compensation factor map 88 explicitly defined for a lower (e.g., dimmer) panel brightness setting (process block 154).

As described above, in some embodiments, a curved panel pixel uniformity compensation factor map 78 may be determined by combining a flat panel pixel uniformity compensation factor map 78 and a panel curvature compensation factor map 120 associated with the same panel brightness setting. Thus, in some such embodiments, the pixel uniformity compensation block 70 may alternatively determine a target panel curvature compensation factor map 134 associated with the panel brightness setting when the image content corresponding with the input image data 80 is to be displayed on a curved display panel 49, for example, in addition the target flat panel pixel uniformity compensation factor map 124 associated with the panel brightness setting (process block 156). In particular, in some embodiments, the pixel uniformity compensation block 70 may determine the target panel curvature compensation factor map 134 by selecting a candidate panel curvature compensation factor map 132 explicitly defined for the panel brightness setting and/or interpolating a candidate panel curvature compensation factor map 132 explicitly defined for a higher (e.g., brighter) panel brightness setting with a candidate panel curvature compensation factor map 132 explicitly defined for a lower (e.g., dimmer) panel brightness setting.

Additionally, the pixel uniformity compensation block 70 may determine (e.g., identify) a pixel position of a display pixel 54 on the display panel 49 that will be used to display image content corresponding with the input image data 80 (process block 146). As described above, in some embodiments, a frame of image content may be written to display pixels 54 and, thus, processed in raster order. Accordingly, in some such embodiments, the pixel uniformity compensation block 70 may determine the pixel position corresponding with the input image data 80 based at least in part on its processing order relative to other image data in the same frame, for example, in view of pixel dimensions of the display panel 49 that will be used to display the image content. Additionally or alternatively, as described above, the pixel uniformity compensation block 70 may receive a pixel position parameter 98, which identifies a pixel position associated with the input image data 80. Furthermore, as described above, a compensation factor map, such as a pixel uniformity compensation factor map 78 and/or a panel curvature compensation factor map 120, may explicitly associate each of one or more pixel positions on a display panel 49 with one or more compensation factors, such as a pixel uniformity compensation factor and/or a panel curvature compensation factor, to be applied to image data corresponding with a display pixel 54 implemented at the pixel position.

Thus, based at least in part on the one or more target compensation factor maps, the pixel uniformity compensation block 70 may determine one or more target compensation factors to be applied at the pixel position corresponding with the input image data 80 (process block 148). In particular, when the corresponding image content is to be displayed on a flat display panel 49, the pixel uniformity compensation block 70 may determine a target flat panel pixel uniformity compensation factor 126 to be applied at the pixel position corresponding with the input image data 80 based on the target flat panel pixel uniformity compensation factor map 124, for example, by selecting a candidate flat panel pixel uniformity compensation factor 128 explicitly associated with the pixel position and/or interpolating candidate flat panel pixel uniformity compensation factors 128 explicitly associated with surrounding pixel positions in the target flat panel pixel uniformity compensation factor map 124 (process block 158). On the other hand, when the corresponding image content is to be displayed on a curved display panel 49, the pixel uniformity compensation block 70 may determine a target curved panel pixel uniformity compensation factor 84 to be applied at the pixel position corresponding with the input image data 80 based on the target curved panel pixel uniformity compensation factor map 92, for example, by selecting a candidate curved panel pixel uniformity compensation factor 96 explicitly associated with the pixel position and/or interpolating candidate curved panel pixel uniformity compensation factors 96 explicitly associated with surrounding pixel positions in the target curved panel pixel uniformity compensation factor map 92 (process block 160).

Additionally or alternatively, when the corresponding image content is to be displayed on a curved display panel 49, the pixel uniformity compensation block 70 may determine a target panel curvature compensation factor 130 associated with the pixel position based on the target panel curvature compensation factor map 134, for example, in addition to a target flat panel pixel uniformity compensation factor 126 associated with the pixel position (process block 162). In particular, in some embodiments, the pixel uniformity compensation block 70 may determine the target panel curvature compensation factor 130 by selecting a candidate panel curvature compensation factor 136 explicitly associated with the pixel position in the target panel curvature compensation factor map 134. Additionally or alternatively, the pixel uniformity compensation block 70 may determine the target panel curvature compensation factor 130 by interpolating candidate panel curvature compensation factors 136 explicitly associated with surrounding pixel positions in the target panel curvature compensation factor map 134.

The pixel uniformity compensation block 70 may apply the one or more target compensation factors to the input image data 80 to determine (e.g., generate) output image data 82 (process block 150). For example, when the corresponding image content is to be display on a flat display panel 49, the pixel uniformity compensation block 70 may apply a target flat panel pixel uniformity compensation factor 126 to a corresponding color component of the input image data 80. As described above, when flat panel compensation factors, such as the candidate flat panel pixel uniformity compensation factor maps 122, are properly calibrated for the flat display panel 49, processing image data in this manner may facilitate improving perceived image quality provided by the flat display panel 49, for example, by compensating for light emission response non-uniformity resulting from manufacturing tolerances to facilitate reducing likelihood of actual light emission magnitude 76 of individual display pixels 54 perceivably differing from corresponding target light emission magnitudes 74 and, thus, perceivable visual artifacts occurring in displayed image content.

On the other hand, when the corresponding image content is to be display on a curved display panel 49, the pixel uniformity compensation block 70 may apply a target curved panel pixel uniformity compensation factor 84 to a corresponding color component of the input image data 80. Additionally or alternatively, when the corresponding image content is to be displayed on a curved display panel 49, the pixel uniformity compensation block 70 may apply a target panel curvature compensation factor 130 to a corresponding color component of the input image data 80, for example, in addition to (e.g., on top of and/or after) a target flat panel pixel uniformity compensation factor 126. As described above, when curved panel compensation parameters, such as the candidate panel curvature compensation factor maps 132, are properly calibrated for the curved display panel 49, processing image data in this manner may facilitate improving perceived image quality provided by the curved display panel 49, for example, by compensating for viewing angle non-uniformity resulting from curvature of the curved display panel 49 to facilitate reducing likelihood of actual perceived luminances 116 perceivably differing from corresponding target perceived luminances 118 and, thus, perceivable visual artifacts occurring in displayed image content.

In other words, at least in some instances, the perceived image quality provided by a curved display panel 49 may be dependent on calibration of curved panel compensation parameters, such as curved panel pixel uniformity compensation parameters, that will be used by image processing circuitry 27 to process image data corresponding with image content to be displayed on the curved display panel 49. In some embodiments, the curved panel pixel uniformity compensation parameters may include the candidate curved panel pixel uniformity compensation factor maps 88 used to determine a target curved panel pixel uniformity compensation factor map 92, an interpolation scheme used to determine the target curved panel pixel uniformity compensation factor map 92, and/or an interpolation scheme used to determine a target curved panel pixel uniformity compensation factor 84 based on the target curved panel pixel uniformity compensation factor map 92. Additionally or alternatively, the curved panel pixel uniformity compensation parameters may include the candidate panel curvature compensation factor maps 132 used to determine a target panel curvature compensation factor map 134, an interpolation scheme used to determine the target panel curvature compensation factor map 134, and/or an interpolation scheme used to determine a target panel curvature compensation factor 130 based on the target panel curvature compensation factor map 134, for example, in addition to flat panel pixel uniformity compensation parameters including the candidate flat panel pixel uniformity compensation factor maps 122 used to determine a target flat panel pixel uniformity compensation factor map 124, an interpolation scheme used to determine the target flat panel pixel uniformity compensation factor map 124, and/or an interpolation scheme used to determine a target flat panel pixel uniformity compensation factor 126 based on the target flat panel pixel uniformity compensation factor map 124.

In fact, as will be described in more detail below, in some embodiments, a calibration process may calibrate curved panel compensation parameters based at least in part on calibrated flat panel compensation parameters. For example, the calibration process may calibrate curved panel upstream compensation parameters to match corresponding calibrated flat panel upstream compensation parameters. Additionally or alternatively, the calibration process may calibrate curved panel pixel uniformity compensation parameters, such as a panel curvature compensation factor map 120, based on calibrated flat panel pixel uniformity compensation factors, such as a flat panel pixel uniformity compensation factor map 78.

Figure 14:
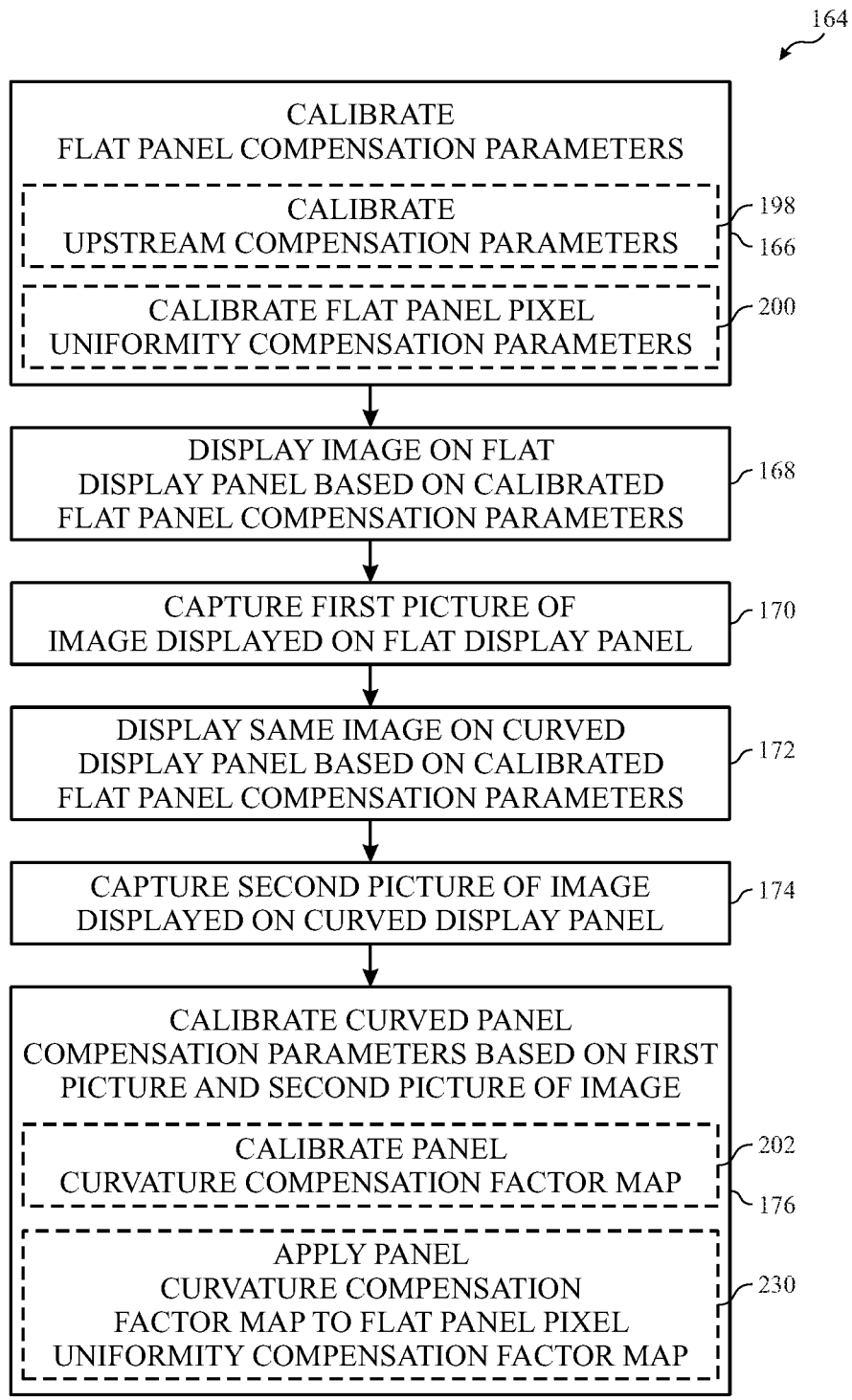
FIG. 14 is a flow diagram of an example calibration process for calibrating curved panel compensation factors, in accordance with an embodiment of the present disclosure.

To help illustrate, an example of a calibration process 164, which may be used to calibrate curved panel compensation parameters, is described in FIG. 14. Generally, the calibration process 164 includes calibrating flat panel compensation parameters (process block 166), displaying an image on a flat display panel based on the calibrated flat panel compensation parameters (process block 168), and capturing a first picture of the image displayed on the flat display panel (process block 170). Additionally, the calibration process 164 includes displaying the same image on a curved display panel based on the calibrated flat panel compensation parameters (process block 172), capturing a second picture of the image displayed on the curved display panel (process block 174), and calibrating curved panel compensation parameters based on the first picture of the image and the second picture of the image (process block 176).

Although described in a particular order, which represents a particular embodiment, it should be noted that the calibration process 164 may be performed in any suitable order. Additionally, embodiments of the calibration process 164 may omit process blocks and/or include additional process blocks. Furthermore, in some embodiments, the calibration process 164 may be performed at least in part by a calibration system, for example, offline during manufacture of an electronic device 10 and/or servicing of the electronic device 10. In fact, at least in some such embodiments, the calibration process 164 may be implemented at least in part by executing instructions stored in a tangible, non-transitory, computer-readable medium, such as calibration memory, using processing circuitry, such as a calibration processor.

Figure 15:
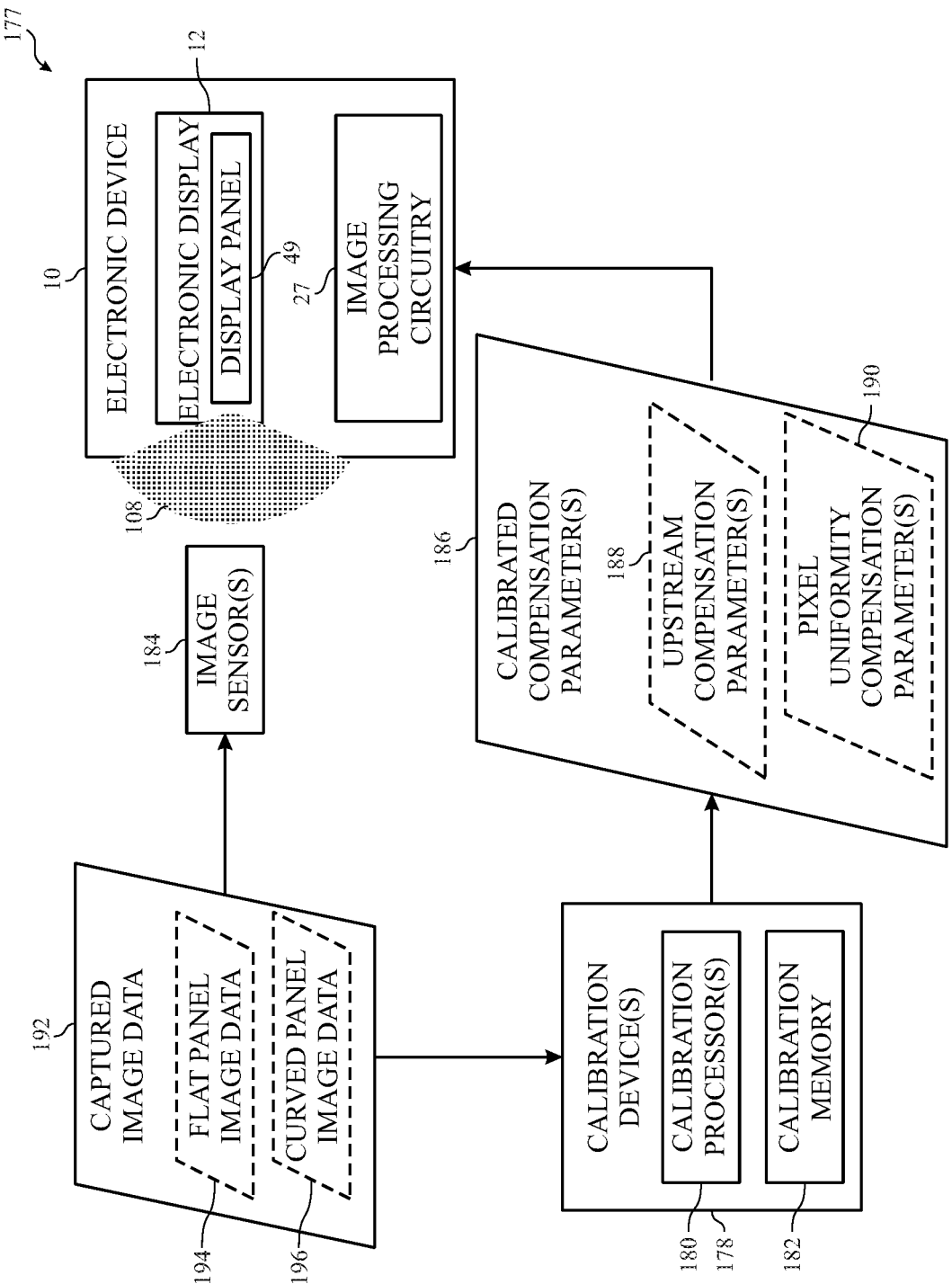
FIG. 15 is a block diagram of an example of calibration system that may facilitate performing the calibration process of FIG. 14, in accordance with an embodiment of the present disclosure.

To help illustrate, an example of a calibration (e.g., tuning and/or design) system 177, which may operate to facilitate calibrating compensation parameters to be used by image processing circuitry 27 of an electronic device 10, is shown in FIG. 15. As in the depicted example, the calibration system 177 may include one or more image sensors 184, such as one or more cameras, and one or more calibration (e.g., computing and/or different electronic) devices 178 communicatively coupled to the electronic device 10 being calibrated. In particular, as will be described in more detail below, the one or more calibration devices 178 may determine calibrated compensation parameters 186 based at least in part on captured image data 192 output from the one or more image sensors 184.

To facilitate calibrating compensation parameters, as in the depicted example, a calibration device 178 may include one or more calibration processors 180 and calibration memory 182. In particular, in some embodiments, the calibration memory 182 may be included in a tangible, non-transitory, computer-readable medium. Additionally, in some embodiments, the calibration processor 180 may include processing circuitry that executes instructions and/or processes data stored in the calibration memory 182, for example, to determine one or more calibrated compensation parameters 186 and/or to instruct an image sensor 184, such as a camera, to capture a picture.

In some embodiments, an image sensor 184, such as a camera, may capture a picture by generating captured image data 192 that indicates characteristics, such as color and/or achromatic brightness (e.g., grayscale) level, of light 108 sensed (e.g., measured) at one or more pixel positions. For example, the captured image data 192 corresponding with a pixel position may include captured red component image data 192 that indicates brightness level of red light sensed at the pixel position, captured blue component image data 192 that indicates brightness level of blue light sensed at the pixel position, captured green component image data 192 that indicates brightness level of green light sensed at the pixel position, captured white component image data 192 that indicates brightness level of white light sensed at the pixel position, or any combination thereof. In other words, captured image data 192 corresponding with a picture of image content being displayed on a display panel 49 may be indicative of luminance that would actually be perceived by a user's eye 102. Thus, as will be described in more detail below, to facilitate determining calibrated compensation parameters 186, an image sensor 184 may be positioned facing a viewing surface 103 of the display panel 49 and operated to capture one or more pictures of image content (e.g., calibration images) being displayed on the display panel 49.

For example, to facilitate determining calibrated flat panel compensation parameters 186, the image sensor 184 may capture one or more pictures (e.g., over time) of image content displayed on a flat display panel 49 at least in part by generating flat panel image data 194. Additionally, to facilitate determining calibrated curved panel compensation parameters 186, the image sensor 184 may capture one or more pictures (e.g., over time) of image content displayed on a curved display panel 49 at least in part by generating curved panel image data 196. In fact, as will be described in more detail below, in some embodiments, the one or more calibration processors 180 may determine calibrated curved panel compensation parameters 186 based at least in part on analysis of captured curved panel image data 196 in view of captured flat panel image data 194.

In other words, in such embodiments, an image sensor 184, such as camera, may be instructed and/or operated to capture a first one or more pictures of image content displayed on the display panel 49 while the display panel 49 has a flat shape (e.g., profile) and a second one or more pictures of image content displayed on the display panel 49 while the display panel 49 has a curved shape (e.g., profile). For example, the image sensor 184 may capture a first picture of image content displayed on the display panel 49 while the display panel 49 has a flat shape by generating flat panel image data 194 at a first time and capture a second picture of image content displayed on the display panel 49 while the display panel 49 has a curved shape by generating curved panel image data 196 at a second (e.g., subsequent and/or different) time. In fact, as will be described in more detail below, in some embodiments, a calibration device 178 may calibrate compensation parameters 186 for a curved display panel 49 based at least in part on captured curved panel image data 196 as well as captured flat panel image data 194.

As in the depicted example, the calibrated compensation parameters 186 may include one or more upstream compensation parameters 188 and/or one or more pixel uniformity compensation parameters 190 to be used by a pixel uniformity compensation block (e.g., circuitry group) 70 implemented in the image processing circuitry 27. As will be described in more detail below, in some embodiments, flat panel pixel uniformity compensation parameters 190 and curved panel pixel uniformity compensation parameters 190 may be selectively included in the calibrated compensation parameters 186 communicated (e.g., transmitted and/or output) to the electronic device 10. For example, calibrated flat panel compensation parameters 186 may be communicated to the electronic device 10 at a first time and calibrated curved panel compensation parameters 186 may be communicated to the electronic device 10 at a second (e.g., subsequent and/or different) time.

However, it should be appreciated that the depicted example is merely intended to be illustrative and not limiting. In particular, in other embodiments, upstream compensation parameters 188 may not be included in the calibrated compensation parameters 186, for example, when the image processing circuitry 27 does not include compensation circuitry implemented upstream relative to its pixel uniformity compensation block 70. Additionally or alternatively, the calibrated compensation parameters 186 may include downstream compensation parameters, for example, when the image processing circuitry 27 includes compensation circuitry, such as a pixel drive compensation (PDC) block, implemented downstream relative to its pixel uniformity compensation block 70.

As described above, in some embodiments, image processing circuitry 27 may include a white point compensation (WPC) block 66 and/or a burn-in compensation (BIC) block 68 implemented upstream relative to its pixel uniformity compensation block 70. Thus, in such embodiments, the calibrated upstream compensation parameters 188 may include one or more white point compensation parameters to be used by the white point compensation block 66 and/or one or more burn-in compensation parameters to be used by the burn-in compensation block 68. Additionally, as described above, in some embodiments, curved panel upstream compensation parameters 188 may be calibrated to match corresponding flat panel upstream compensation parameters 188. In other words, in such embodiments, the same upstream compensation parameters 188 may be used to process image data regardless of whether corresponding image content is to be displayed on a flat display panel 49 or a curved display panel 49.

Thus, returning to the calibration process 164 of FIG. 14, in some embodiments, the calibration system 177 may calibrate flat panel compensation parameters at least in part by calibrating one or more upstream compensation parameters 188, such as white point compensation parameters to be used by a white point compensation block 66 and/or burn-in compensation parameters to be used by a burn-in compensation block 68 (process block 198). Additionally or alternatively, the calibration system 177 may calibrate flat panel compensation parameters at least in part by calibrating one or more flat panel pixel uniformity compensation parameters 190, such as candidate flat panel pixel uniformity compensation factor maps 122 used to determine a target flat panel pixel uniformity compensation factor map 124, an interpolation scheme used to determine the target flat panel pixel uniformity compensation factor map 124, and/or an interpolation scheme used to determine a target flat panel pixel uniformity compensation factor 126 based on the target flat panel pixel uniformity compensation factor map 124 (process block 200). In fact, to facilitate improving calibration (e.g., computing and/or operational) efficiency, in some embodiments, compensation parameters may be calibrated in accordance with relative processing order of corresponding compensation blocks.

In other words, when the white point compensation block 66 is implemented upstream relative to the burn-in compensation block 68, in such embodiments, the white point compensation parameters may be calibrated before the burn-in compensation parameters. On the other hand, when the white point compensation block 66 is implemented downstream relative to the burn-in compensation block 68, in such embodiments, the burn-in compensation parameters may be calibrated before the white point compensation parameters. Additionally or alternatively, the flat panel pixel uniformity compensation parameters 190 may be calibrated after calibration of the upstream compensation parameters 188. In other words, in some such embodiments, the upstream compensation parameters 188 may be calibrated without performing pixel uniformity compensation.

As described above, displaying image content based on image data processed using upstream compensation parameters 188 properly calibrated for the display panel 49 may generally result in actual light emission magnitude 76 of its display pixels 54 on average matching corresponding target light emission magnitudes 74. However, as described above, not performing pixel uniformity compensation on the image data may result in actual light emission magnitude 76 of one or more individual display pixels 54 nevertheless differing from its target light emission magnitude 74, for example, due to light emission response non-uniformity resulting from manufacturing tolerances. As such, when image content is displayed based on image data processed using properly calibrated upstream compensation parameters 188, deviation of actual light emission magnitudes 76 and corresponding target light emission magnitudes 74 of individual display pixels 54 may be attributed to light emission response non-uniformity.

Accordingly, to facilitate calibrating the flat panel pixel uniformity compensation parameters 190, in some embodiments, the image processing circuitry 27 of the electronic device 10 may be instructed and/or operated to process source image data 40 corresponding with a (e.g., first and/or light emission response non-uniformity) calibration image using the calibrated upstream compensation parameters 188 to determine corresponding display image data 56. Additionally, a flat display panel 49 may be instructed and/or operated to display the calibration image based on the display image data 56 output from the image processing circuitry 27 and the calibration system 177 may instruct an image sensors 184 to capture a picture of the image content displayed on the flat display panel 49. Based on corresponding flat panel image data 194 output from the image sensor 184, the calibration system 177 may identify characteristics, such as strength and/or location (e.g., pixel position), of light emission response non-uniformities and calibrate (e.g., adjust) the flat panel pixel uniformity compensation parameters 190 accordingly, for example, by setting a flat panel pixel uniformity compensation factor to be applied at a pixel position based at least in part on strength of light emission response non-uniformity identified at the pixel position.

Moreover, as described above, in some embodiments, the effect of light emission response non-uniformity on perceived image quality may vary with panel brightness setting of a display panel 49. Thus, in some embodiments, the flat display panel 49 may be instructed and/or operated to display the calibration image using multiple different panel brightness setting and the calibration system 177 may instruct an image sensor 184 to capture a picture of the image content displayed on the flat display panel 49 at each of the different panel brightness settings. Based at least in part on corresponding flat panel image data 194 output from the image sensor 184, the calibration system 177 may calibrate flat panel pixel uniformity compensation factor maps 78 for each of the different panel brightness settings accordingly.

After calibration of the flat panel compensation parameters, the flat display panel 49 may be instructed and/or operated to display a (e.g., second and/or viewing angle non-uniformity) calibration image based on corresponding image data processed using the calibrated flat panel compensation parameters 186 (process block 168). In other words, in some embodiments, the image processing circuitry 27 may process source image data 40 corresponding with the calibration image based on calibrated upstream compensation parameters 188 and calibrated flat panel pixel uniformity compensation parameters 190 to determine corresponding display image data 56. Based on the display image data 56, driver circuitry 50 coupled to the flat display panel 49 may control light emission from its display pixels 54 to display the calibration image.

While the calibration image is being displayed on the flat display panel 49, the calibration system 177 may instruct an image sensor 184 to capture a first picture of the displayed calibration image (process block 170). As described above, an image sensor 184, such as a camera, may capture a picture by generating captured image data 192 that indicates characteristics, such as color and/or achromatic brightness (e.g., grayscale) level, of light 108 sensed (e.g., measured) at one or more pixel positions. In other words, the image sensor 184 may capture the first picture of the calibration image displayed on the flat display panel 49 by generating flat panel image data 194, which is indicative of perceived (e.g., sensed) luminance at each of one or more pixel positions on the flat display panel 49.

A curved display panel 49 may be instructed and/or operated to display the same calibration image based on image data processed using the calibrated flat panel compensation parameters 186 (process block 172). In other words, in some embodiments, the curved display panel 49 may display the calibration image based on the same display image data 56 as the flat display panel 49. In fact, in some embodiments, the curved display panel 49 may be implemented by bending the flat display panel 49. In other embodiments, the curved display panel 49 may be implemented by bending another flat display panel 49 of the same type as the flat display panel 49 used during the calibration process 164.

While the calibration image is being displayed on the curved display panel 49, the calibration system 177 may instruct the image sensor 184 to capture a second picture of the displayed calibration image (process block 174). As described above, an image sensor 184, such as a camera, may capture a picture by generating captured image data 192 that indicates characteristics, such as color and/or achromatic brightness (e.g., grayscale) level, of light 108 sensed (e.g., measured) at one or more pixel positions. In other words, the image sensor 184 may capture the second picture of the calibration image displayed on the curved display panel 49 by generating curved panel image data 196, which is indicative of perceived (e.g., sensed) luminance at each of one or more pixel positions on the curved display panel 49.

The calibration system 177 may calibrate one or more curved panel compensation parameters based on the first picture of the calibration image and the second picture of the calibration image (process block 176). In other words, in some embodiments, the calibration system 177 may calibrate the curved panel compensation parameters based on the captured flat panel image data 194 corresponding the first picture of the calibration image and the captured curved panel image data 196 corresponding with the second picture of the calibration image. As described above, in some embodiments, curved panel compensation parameters may include curved panel pixel uniformity compensation parameters, such candidate panel curvature compensation factor maps 132, for example, in addition to upstream compensation parameters 188.

Thus, in some embodiments, calibrating curved panel compensation factors may include calibrating one or more panel curvature compensation factor maps 120 (process block 202). In some embodiments, the calibration system 177 may determine a panel curvature compensation factor to be associated with a pixel position based at least in part on a ratio of sensed (e.g., measured) brightness level at the pixel position indicated in the captured flat panel image data 194 to sensed brightness level at the pixel position indicated in the captured curved panel image data 196. For example, a red component panel curvature compensation factor associated with the pixel position may be set as a ratio of corresponding red component flat panel image data 194 to corresponding red component curved panel image data 196, a blue component panel curvature compensation factor associated with the pixel position may be set as a ratio of corresponding blue component flat panel image data 194 to corresponding blue component curved panel image data 196, a green component panel curvature compensation factor associated with the pixel position may be set as a ratio of corresponding green component flat panel image data 194 to corresponding green component curved panel image data 196, a white component panel curvature compensation factor associated with the pixel position may be set as a ratio of corresponding white component flat panel image data 194 to corresponding white component curved panel image data 196, or any combination thereof.

As described above, in some embodiments, the effect of viewing angle non-uniformity resulting from curvature of a curved display panel 49 may vary with its panel brightness setting. Thus, in some embodiments, the curved display panel 49 may be instructed and/or operated to display the calibration image using multiple different panel brightness settings and the calibration system 177 may instruct an image sensor 184 to capture a picture of the calibration image displayed at each of the different panel brightness settings. Based at least in part on corresponding curved panel image data 196 output from the image sensor 184, the calibration system 177 may calibrate curved panel pixel uniformity compensation parameters 190 for each of the different panel brightness settings accordingly, for example, by calibrating a panel curvature compensation factor map 120 to explicitly associate a pixel position with a panel curvature compensation factor that is set to match a corresponding ratio of brightness level sensed at the pixel position on the flat display panel 49 to brightness level sensed at the pixel position on the curved display panel 49. However, at least in some instances, applying a panel curvature compensation factor set as a corresponding ratio of sensed flat panel brightness level to sensed curved panel brightness level may result in a target light emission magnitude that exceeds (e.g., violates) a pixel upper limit of light emission magnitudes producible by display pixels 54 on a display panel 49—particularly at higher (e.g., brighter) panel brightness settings, for example, due to associated brightness setting upper limits being closer to or even matching the pixel upper limit.

Figure 16:
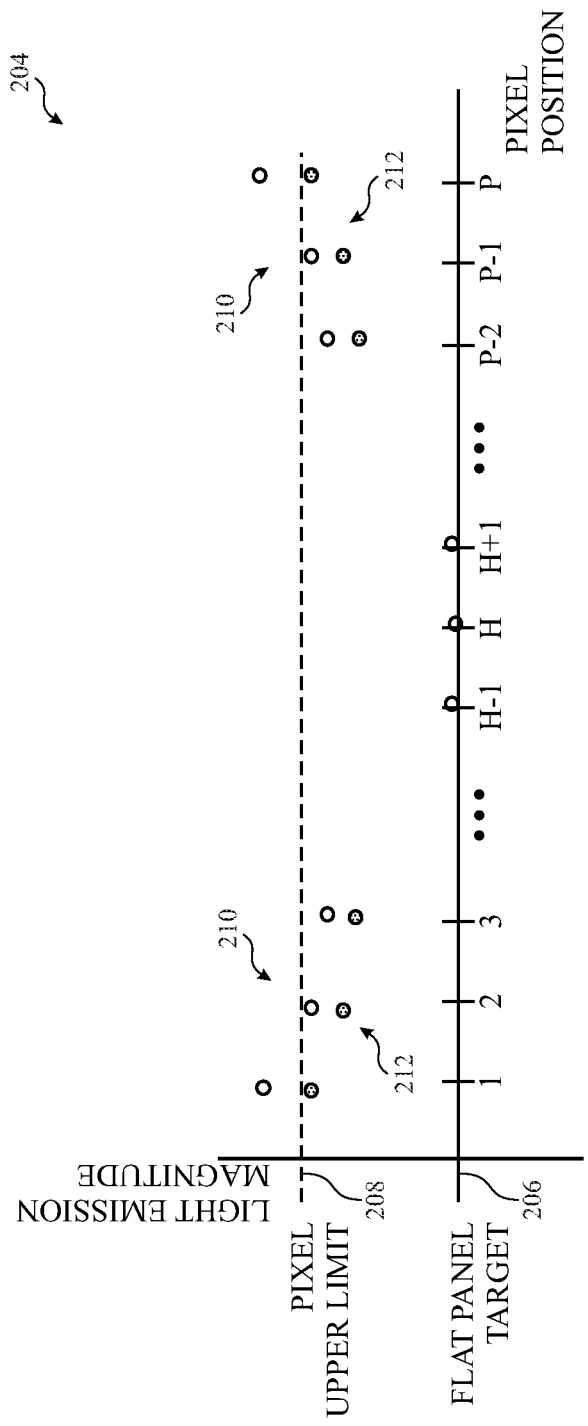
FIG. 16 is an example plot of maximum target light emission magnitudes resulting from application of different panel curvature compensation factors, in accordance with an embodiment of the present disclosure.

To help illustrate, an example plot 204 of target light emission magnitudes, which result from application of panel curvature compensation factors at pixel positions along a line (e.g., row or column) of display pixels 54 on a curved (e.g., convex) display panel 49, is shown in FIG. 16. However, it should be appreciated that the depicted example is merely intended to be illustrative and not limiting. In particular, in other embodiments, target light emission magnitudes resulting from application of different panel curvature compensation factors may result in a different profile.

Merely for illustrative purposes, source image data 40 corresponding with each of the pixel positions indicates a highest (e.g., maximum or two hundred fifty-five) grayscale (e.g., brightness) level. As such, merely for illustrative purposes, the display pixels 54 at each of the pixel positions in the depicted example is associated with the same target flat panel light emission magnitude 206. Additionally, actual light emission magnitude 76 of the display pixels 54 at each of the pixel positions in the depicted example is subject to a pixel upper limit 208.

As depicted, the plot 204 of FIG. 16 includes a first maximum target light emission profile 210, which includes a maximum target light emission magnitude for each of the pixel positions that results from application of a panel curvature compensation factor set as a corresponding ratio of sensed flat panel brightness level to sensed curved panel brightness level. In particular, as depicted, the first maximum target light emission profile 210 includes a target light emission magnitude associated with an Hth pixel position that generally matches the target flat panel light emission magnitude 206, for example, due to a display pixel 54 implemented at the Hth pixel position on a flat display panel 49 having the same viewing angle as a display pixel 54 implemented at the Hth pixel position on a curved display panel 49. However, as depicted, the first maximum target light emission profile 210 also includes target light emission magnitudes 74 associated with other pixel positions that deviate from the target flat panel light emission magnitude 206.

As described above, at least in some instances, perceived luminance resulting from actual light emission magnitude 76 of a display pixel 54 may vary with viewing angle. Moreover, due to curvature of a curved display panel 49, deviation of normal axes 110 of display pixels 54 from a normal axes 110C of a central display pixel 54C (e.g., implemented at Hth pixel position) may increase with distance from the central display pixel 54. Thus, to facilitate compensating for a change in perceived luminance resulting from curvature of the curved display panel 49, as in the depicted example, deviation of the first maximum target light emission profile 210 from the target flat panel light emission magnitude 206 generally increases as pixel position moves away from the Hth pixel position. In other words, the target light emission magnitudes included in the first maximum target light emission profile 210 may be expected to result in actual perceived luminances 116 at the pixel positions that match corresponding target perceived luminances 118.

However, as depicted, the first maximum target light emission profile 210 exceeds the pixel upper limit 208 at a first pixel position and a Pth pixel position. In fact, since actual light emission magnitude 76 from a display pixel 54 is nevertheless limited to the pixel upper limit 208 and the first maximum target light emission profile 210 matches the pixel upper limit at a second pixel position, the first maximum target light emission profile 210 may result in actual light emission magnitude 76 of a display pixel 54 at the first pixel position matching actual light emission magnitude 76 of a display pixel at the second pixel position. In other words, at least in some instances, applying panel curvature compensation factors that result in a maximum target light emission profile that exceeds the pixel upper limit 208 may affect (e.g., reduce) perceived contrast and, thus, quality of image content display on a curved display panel 49. Moreover, since curvature at the first pixel position is greater than curvature at the second pixel position, a first actual perceived luminance 116A at the first pixel position may be lower than a second actual perceived luminance 116B at the second pixel position, thereby distorting the image content perceived by a user's eye 102.

As such, to facilitate improving perceived image quality provided by a curved display panel 49, a calibration system 177 may adjust a panel curvature compensation factor to be applied to image data when application results in a maximum target light emission profile that exceeds a pixel upper limit 208. In other words, since the first maximum target light emission profile 210 resulting from application of panel curvature compensation factors each set as a corresponding ratio of sensed flat panel brightness level to sensed curve panel brightness level ratio exceeds the pixel upper limit 208, the calibration system 177 may adjust the panel curvature compensation factors applied to image data to instead produce a second maximum target light emission profile 212 that does not exceed the pixel upper limit 208. That is, the second maximum target light emission profile 212 may result from application of one or more panel curvature compensation factors that do not match a corresponding ratio of sensed flat panel brightness level to sensed curve panel brightness level.

To facilitate maintaining perceivable contrast in displayed image content, in some embodiments, the calibration system 177 may adjust the panel curvature compensation factors to scale the first maximum target light emission profile 210 down to the pixel upper limit 208. For example, the calibration system 177 may determine a scaling factor, which when applied, results in the maximum target light emission magnitude at the first pixel position in the first maximum target light emission profile 210 being scaled to the pixel upper limit 208. The calibration system 177 may adjust the value of each panel curvature compensation factor, which is set as a corresponding ratio of sensed flat panel brightness level to sensed curve panel brightness level, at least in part by applying the scaling factor to the corresponding ratio.

Figure 17:
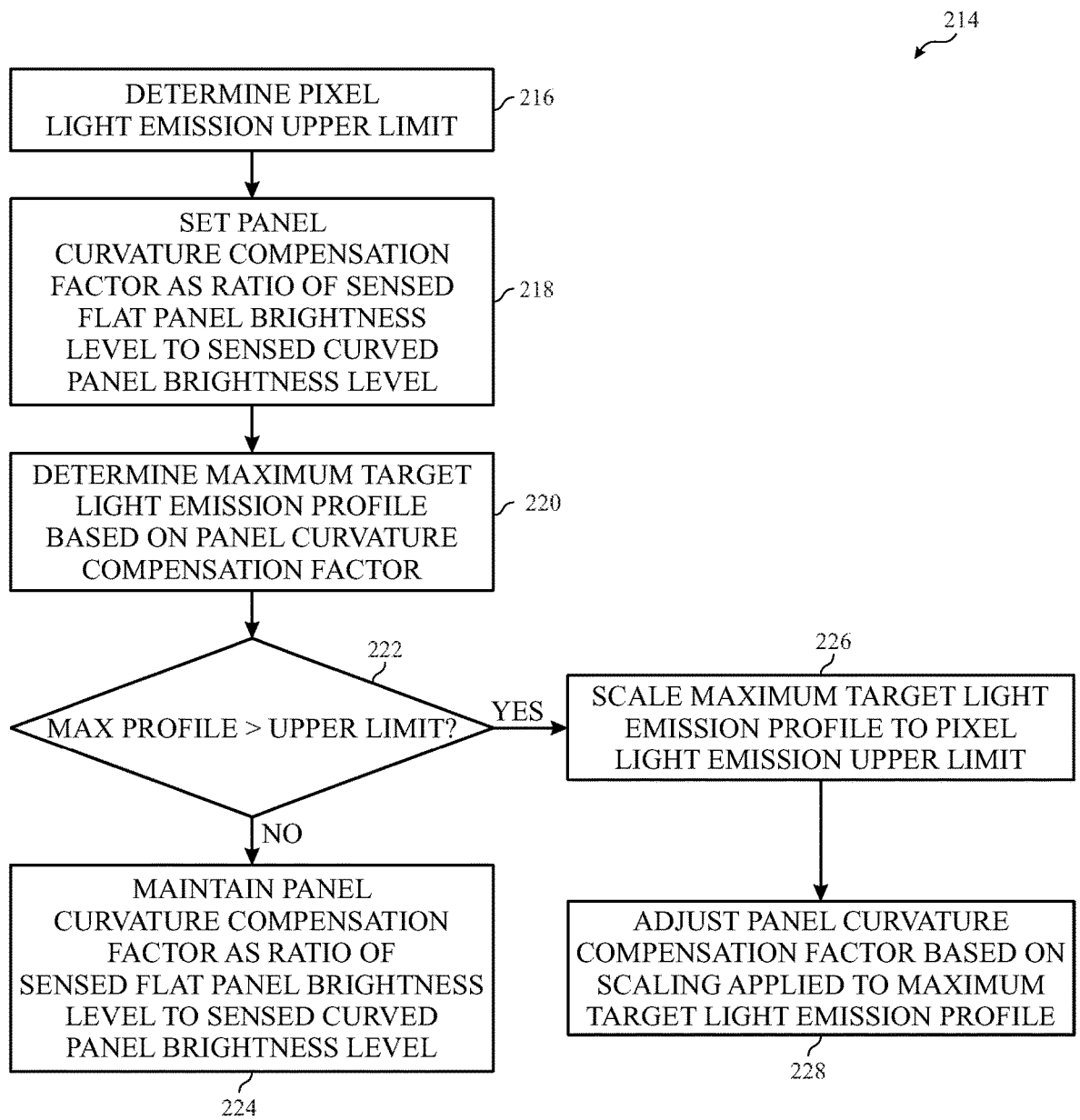
FIG. 17 is a flow diagram of an example process for calibrating a panel curvature compensation factor, in accordance with an embodiment of the present disclosure.

To help further illustrate, an example of a process 214 for calibrating a panel curvature compensation factor is described in FIG. 17. Generally, the process 214 includes determining a pixel light emission upper limit (process block 216), setting a panel curvature compensation factor as a ratio of sensed flat panel brightness level to sensed curve panel brightness level (process block 218), determining a maximum target light emission profile based on the panel curvature compensation factor (process block 220), determining whether the maximum target light emission profile exceeds the pixel light emission upper limit (decision block 222), and maintaining the panel curvature compensation factor as the ratio of the sensed flat panel brightness level to the sensed curve panel brightness level when the maximum target light emission profile does not exceed the pixel light emission upper limit (process block 224). Additionally, when the maximum target light emission profile exceeds the pixel light emission upper limit, the process 214 includes scaling the maximum target light emission profile to the pixel light emission upper limit (process block 226) and adjusting the panel curvature compensation factor based on the scaling applied to the maximum target light emission profile (process block 228).

Although described in a particular order, which represents a particular embodiment, it should be noted that the process 214 may be performed in any suitable order. Additionally, embodiments of the process 214 may omit process blocks and/or include additional process blocks. Furthermore, in some embodiments, the process 214 may be performed at least in part by a calibration system 177, for example, offline during manufacture of an electronic device 10 and/or servicing of the electronic device. In fact, at least in some such embodiments, the process 214 may be implemented at least in part by executing instructions stored in a tangible, non-transitory, computer-readable medium, such as calibration memory 182, using processing circuitry, such as a calibration processor 180.

Accordingly, in some embodiments, a calibration system 177 may determine a pixel upper limit 208 that governs actual light emission magnitude 76 of display pixels 54 implemented on a display panel 49 (process block 216). In some embodiments, the pixel upper limit 208 may be predetermined and stored in a tangible, non-transitory, computer-readable medium, such as calibration memory 182. Thus, in such embodiments, the calibration system 177 may retrieve an indication of the pixel upper limit 208 from the tangible, non-transitory, computer-readable medium.

Additionally, the calibration system 177 may associate each of one or more pixel positions on the display panel 49 to a panel curvature compensation factor set as a corresponding ratio of sensed flat panel brightness level resulting from a specific panel brightness setting to sensed curve panel brightness level resulting from the same panel brightness setting (process block 218). As described above, in some embodiments, an image sensor 184 may capture a picture of image content displayed on a flat display panel 49 by generating flat panel image data 194, which indicates brightness (e.g., grayscale) level of light 108 sensed (e.g., measured) at one or more pixel positions on a flat display panel 49. Additionally, as described above, an image sensor 184 may capture a picture of image content displayed on a curved display panel 49 by generating curved panel image data 196, which indicates brightness (e.g., grayscale) level of light 108 sensed (e.g., measured) at one or more pixel positions on a curved display panel 49. In other words, in some embodiments, the calibration system 177 may associate a pixel position with a panel curvature compensation factor set as a ratio of a grayscale level indicated in the captured flat panel image data 194 to a corresponding grayscale level indicated in the captured curved panel image data 196.

The calibration system 177 may determine a maximum target light emission profile that would result at the specific panel brightness setting due to application of panel curvature compensation factors that are each set as a corresponding ratio of sensed flat panel brightness level to sensed curve panel brightness level (process block 220). As described above, in some embodiments, the calibration system 177 may determine a maximum target light emission magnitude associated with a pixel position included in the maximum target light emission profile at least in part by applying a corresponding panel curvature compensation factor to a largest (e.g., maximum and/or two hundred fifty-five) grayscale level, for example, and subsequently scaling a resulting grayscale level to a default range of light emission magnitudes corresponding with the specific panel brightness setting. As will be described in more detail below, the value of a panel curvature compensation factor may be adjusted when application potentially results in a target light emission magnitude 74 that exceeds the pixel upper limit 208.

Thus, to facilitate maintaining perceivable contrast in displayed image content, in some embodiments, the calibration system 177 may include maximum target light emission magnitudes for each of multiple pixel positions on a display panel 49 in the maximum target light emission profile. For example, in some embodiments, the calibration system 177 may include a maximum target light emission magnitude for each pixel position on the display panel 49 in the maximum target light emission profile. In other embodiments, the calibration system 177 may include a maximum target light emission magnitude for each of a subset of pixel positions on the display panel 49 in the maximum target light emission profile.

The calibration system 177 may determine whether the maximum target light emission profile exceeds (e.g., is greater than) the pixel upper limit 208 (decision block 222). In other words, the calibration system 177 may determine whether any of the maximum target light emission magnitudes associated with a pixel position included in the maximum target light emission profile exceeds the pixel upper limit 208. When none of the maximum target light emission magnitudes exceed the pixel upper limit 208, the calibration system 177 may determine that the maximum target light emission profile does not exceed the pixel upper limit 208 and, thus, maintain each of the panel curvature compensation factors as a corresponding ratio of sensed flat panel brightness level to sensed curved panel brightness level (process block 224).

On the other hand, when one or more of the maximum target light emission magnitudes exceed the pixel upper limit 208, the calibration system 177 may determine that the maximum target light emission profile exceeds the pixel upper limit 208 and, thus, scale the maximum target light emission profile to the pixel upper limit 208 (process block 226). In particular, to facilitate appropriately scaling the maximum target light emission profile, in some embodiments, the calibration system 177 may identify a maximum target light emission magnitude from the maximum target light emission profile that exceeds the pixel upper limit 208 by the largest amount. Additionally, the calibration system 177 may determine a scaling factor, which when applied to the maximum target light emission magnitude that exceeds the pixel upper limit 208 by the largest amount, results in the maximum target light emission magnitude matching the pixel upper limit 208.

To facilitate maintaining perceivable contrast in displayed image content, the calibration system 177 may adjust each of the panel curvature compensation factors based on the scaling applied to the maximum target light emission profile (process block 228). In particular, in some embodiments, the calibration system 177 may apply the scaling factor to a panel curvature compensation factor, which is set as a corresponding ratio of sensed flat panel brightness level to sensed curve panel brightness level. In this manner, a calibration system 177 may operate to calibrate one or more panel curvature compensation factors associated with a specific panel brightness level, which, as described above, may be explicitly associated with corresponding pixel positions via a panel curvature compensation factor map 120.

Returning to the calibration process 164 of FIG. 14, as described above, in some embodiments, a calibrated panel curvature compensation factor map 120 may be combined with a calibrated flat panel pixel uniformity compensation factor map 78 associated with the same panel brightness setting to determine a calibrated curved panel pixel uniformity compensation factor map 78. Thus, to facilitate calibrating the curved panel compensation parameters, in such embodiments, the calibration system 177 may apply a calibrated panel curvature compensation factor map 120 to a calibrated flat panel pixel uniformity compensation factor map 78 to determine corresponding calibrated curved panel pixel uniformity compensation factor map 78 (process block 230). In particular, in some embodiments, the calibration system 177 may determine a curved panel pixel uniformity compensation factor to be included in the calibrated curved panel pixel uniformity compensation factor map 78 by applying a panel curvature compensation factor from the calibrated panel curvature compensation factor map 120 to a flat panel pixel uniformity compensation, which corresponds to the same color component and the same pixel position, in the calibrated flat panel pixel uniformity compensation factor map 78.

As described above, in other embodiments, calibrated panel curvature compensation factor maps 120 may be maintained separate from calibrated flat panel pixel uniformity compensation factor maps 78. In fact, in some embodiments, maintaining calibrated panel curvature compensation factor maps 120 and the calibrated flat panel pixel uniformity compensation factor maps 78 separate may facilitate improving operational flexibility of image processing circuitry 27. For example, in such embodiments, a pixel uniformity compensation block 70 implemented in the image processing circuitry 27 may selectively utilize the calibrated panel curvature compensation factor maps 120, which, at least in some instances, may enable the pixel uniformity compensation block 70 to properly compensate for pixel non-uniformity on a flat display panel 49 as well as pixel non-uniformity on a curved display panel 49.

In this manner, the techniques described in the present disclosure may enable curved panel compensation parameters, such as panel curvature compensation factors, used to process image data corresponding with image content to be displayed on a curved display panel to be calibrated based on flat panel compensation parameters calibrated for a flat display panel. At least in some instances, calibrating curved panel pixel uniformity compensation parameters in this manner may facilitate improving calibration (e.g., tuning, design, computing, and/or operational) efficiency as compared to calibration directly using the curved display panel, for example, due to deviation of actual perceived luminance from target perceived luminance in image content displayed on a curved display panel using image data on which pixel uniformity compensation has not been performed resulting from light emission response non-uniformity produced by manufacturing tolerances as well as viewing angle non-uniformities produced by curvature of the curved display panel. Comparatively, the techniques described in the present disclosure may enable compensation of light emission response non-uniformity to be calibrated using a flat display panel and compensation of viewing angle non-uniformity to be calibrated using the curved display panel.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device comprising:
   an electronic display comprising a display pixel implemented on a display panel, wherein the electronic display is configured to control light emission from the display pixel based at least in part on display image data to facilitate displaying image content on the display panel; and
   image processing circuitry configured to process input image data corresponding with the image content to determine the display image data at least in part by:
   when the electronic display is to display the display image data at a first brightness setting of the electronic display:
   applying a first pixel uniformity compensation factor to the input image data, wherein the image processing circuitry is configured to determine the first pixel uniformity compensation factor to be applied to the input image data based at least in part on a first pixel uniformity compensation factor map that is calibrated to the display panel while the display panel has a flat shape; and applying a first panel curvature compensation factor to the input image data when the image content is to be displayed on the display panel while the display panel has a curved shape, wherein the image processing circuitry is configured to determine the first panel curvature compensation factor to be applied to the input image data based at least in part on a first panel curvature compensation factor map that is calibrated to the display panel after the display panel is bent from the flat shape to the curved shape; and when the electronic display is to display the display image data at a second brightness setting of the electronic display:

applying a second pixel uniformity compensation factor to the input image data, wherein the image processing circuitry is configured to determine the second pixel uniformity compensation factor to be applied to the input image data based at least in part on a second pixel uniformity compensation factor map calibrated to the display panel while the display panel has the flat shape; and applying a second panel curvature compensation factor to the input image data when the image content is to be displayed on the display panel while the display panel has the curved shape, wherein the image processing circuitry is configured to determine the second panel curvature compensation factor to be applied to the input image data based at least in part on a second panel curvature compensation factor map that is calibrated to the display panel after the display panel is bent from the flat shape to the curved shape.

2. The electronic device of claim 1, wherein the display panel has a convex shape when the image content is to be displayed on the display panel.

3. The electronic device of claim 1, comprising an image source configured to output source image data corresponding with the image content to be displayed on the display panel, wherein:

the image processing circuitry comprises:

an upstream compensation block configured to process the source image data based at least in part on an upstream compensation parameter that is calibrated to the display panel while the display panel has the flat shape to facilitate determining the input image data; and a pixel uniformity compensation block configured to process the input image data to facilitate determining the display image data to be supplied to the electronic display; and the electronic display comprises driver circuitry configured to write the display pixel at least in part by controlling magnitude of an analog electrical signal supplied to the display pixel based at least in part on a grayscale level indicated in the display image data.

4. The electronic device of claim 1, wherein the image processing circuitry is configured to:

apply the first pixel uniformity compensation factor to the input image data to facilitate offsetting light emission response non-uniformity of display pixels on the display panel resulting from manufacturing tolerances; and apply the first panel curvature compensation factor to the input image data to facilitate offsetting viewing angle non-uniformity at pixel position on the display panel resulting from curvature of the display panel.

5. The electronic device of claim 1, wherein the image processing circuitry is configured to not apply the first panel curvature compensation factor to the input image data when the image content is to be displayed on the display panel while the display panel has the flat shape.

6. The electronic device of claim 1, wherein the first panel curvature compensation factor is calibrated based at least in part on:

a first picture of a calibration image displayed on the display panel while the display panel has the flat shape; and a second picture of the calibration image displayed on the display panel while the display panel has the curved shape.

7. The electronic device of claim 6, wherein:

the first picture of the calibration image comprises a first grayscale level indicative of brightness level sensed at a pixel position corresponding with the display pixel by one or more image sensors;

the second picture of the calibration image comprises a second grayscale level indicative of brightness level sensed at the pixel position corresponding with the display pixel by the one or more image sensors; and the first panel curvature compensation factor is calibrated based at least in part on a ratio of the first grayscale level to the second grayscale level.

8. A calibration system comprising:

a display panel, wherein the display panel comprises a display pixel;

one or more image sensors oriented facing a viewing surface of the display panel, wherein the one or more image sensors are configured to:

capture a first picture of a calibration image displayed on the display panel using a first panel brightness setting while the display panel has a flat profile at least in part by generating captured flat panel image data comprising a first grayscale level indicative of brightness level sensed at a pixel position corresponding with the display pixel; and capture a second picture of the calibration image displayed on the display panel using the first panel brightness setting while the display panel has a curved profile at least in part by generating captured curved panel image data comprising a second grayscale level indicative of brightness level sensed at the pixel position corresponding with the display pixel; and a calibration device configured to calibrate:

a first compensation factor to be subsequently applied to process image data corresponding with image content to be displayed on a curved display panel based at least in part on a ratio of the first grayscale level indicated in the captured flat panel image data to the second grayscale level indicated in the captured curved panel image data, wherein the first compensation factor comprises a panel curvature compensation factor to be subsequently applied to process image data only when corresponding image content is to be displayed on the curved display panel; and a pixel uniformity compensation factor to be subsequently applied to process image data when corresponding image content is to be displayed on the curved display panel or a flat display panel based at least in part on the first picture of the calibration image captured while the display panel has the flat profile.

9. The calibration system of claim 8, wherein the display panel is configured to be bent between capture of the first picture and capture of the second picture.

10. The calibration system of claim 8, wherein:
the display panel comprises another display pixel;
the captured flat panel image data comprises a third grayscale level indicative of brightness level sensed at another pixel position corresponding with the other display pixel;
the captured curved panel image data comprises a fourth grayscale level indicative of brightness level sensed at the other pixel position corresponding with the other display pixel; and
the calibration device is configured to calibrate another compensation factor to be subsequently applied to process image data corresponding with image content to be displayed on the curved display panel setting based at least in part on another ratio of the third grayscale level indicated in the captured flat panel image data to the fourth grayscale level indicated in the captured curved panel image data.

11. A calibration method comprising:
displaying, using a flat display panel, a calibration image based on calibration image data processed at least in part to offset light emission response non-uniformity between different display pixels on the flat display panel;
capturing, using one or more image sensors, a first picture of the calibration image being displayed on the flat display panel at least in part by generating captured flat panel image data comprising a first grayscale level indicative of brightness level sensed at a pixel position on the flat display panel and a third grayscale level indicative of brightness level sensed at another pixel position on the flat display panel;
displaying, using a curved display panel, the calibration image based on the calibration image data processed at least in part to offset light emission response non-uniformity between different display pixels on the flat display panel;
capturing, using the one or more image sensors, a second picture of the calibration image being displayed on the curved display panel at least in part by generating captured curved panel image data comprising a second grayscale level indicative of brightness level sensed at the pixel position on the curved display panel and a fourth grayscale level indicative of brightness level sensed at the other pixel position on the curved display panel; and
calibrating, using one or more processors, a panel curvature compensation factor map to be subsequently used to process image data corresponding with image content to be displayed on the curved display panel based at least in part on a comparison between the first picture of the calibration image being displayed on the flat display panel and the second picture of the calibration image being displayed on the curved display panel, wherein calibrating the panel curvature compensation factor map comprises:

calibrating a panel curvature compensation factor to be subsequently applied to process the image data corresponding with the image content to be displayed on the curved display panel based at least in part on a ratio of the first grayscale level indicated in the captured flat panel image data to the second grayscale level indicated in the captured curved panel image data; and
explicitly associating the pixel position with the panel curvature compensation factor in the panel curvature compensation factor map;
determining another panel curvature compensation factor to be subsequently applied to process the image data corresponding with the image content to be displayed on the curved display panel based at least in part on another ratio of the third grayscale level indicated in the captured flat panel image data to the fourth grayscale level indicated in the captured curved panel image data; and
explicitly associating the other pixel position with the other panel curvature compensation factor in the panel curvature compensation factor map, wherein calibrating the panel curvature compensation factor comprises:
determining a light emission upper limit of a display pixel on the curved display panel;
determining whether application of the ratio of the first grayscale level indicated in the captured flat panel image data to the second grayscale level indicated in the captured curved panel image data to a maximum grayscale level results in a target light emission magnitude that exceeds the light emission upper limit of the display pixel;
setting the panel curvature compensation factor to be subsequently applied to process the image data corresponding with the image content to be displayed on the curved display panel as the ratio of the first grayscale level indicated in the captured flat panel image data to the second grayscale level indicated in the captured curved panel image data in response to determining that application of the ratio to the maximum grayscale level does not result in the target light emission magnitude exceeding the light emission upper limit of the display pixel; and
in response to determining that application of the ratio to the maximum grayscale level results in the target light emission magnitude exceeding the light emission upper limit of the display pixel:
determining a scaling factor that when applied to the target light emission magnitude results in the target light emission magnitude matching the light emission upper limit; and
setting the panel curvature compensation factor to be subsequently applied to process the image data corresponding with the image content to be displayed on the curved display panel at least in part by applying the scaling factor to the ratio of the first grayscale level indicated in the captured flat panel image data to the second grayscale level indicated in the captured curved panel image data.

12. The calibration method of claim 11, comprising bending the flat display panel between capture of the first picture and capture of the second picture to implement the curved display panel.

13. A calibration system comprising:
a display panel, wherein the display panel comprises a display pixel;
one or more image sensors oriented facing a viewing surface of the display panel, wherein the one or more image sensors are configured to:
capture a first picture of a calibration image displayed on the display panel using a first panel brightness setting while the display panel has a flat profile at least in part by generating captured flat panel image data comprising a first grayscale level indicative of brightness level sensed at a pixel position corresponding with the display pixel;
capture a second picture of the calibration image displayed on the display panel using the first panel brightness setting while the display panel has a curved profile at least in part by generating captured curved panel image data comprising a second grayscale level indicative of brightness level sensed at the pixel position corresponding with the display pixel;
capture the first picture while the display panel is displaying the calibration image using a specific panel brightness setting;
capture the second picture while the display panel is displaying the calibration image using the specific panel brightness setting;
capture a third picture of the calibration image displayed on the display panel using another panel brightness setting while the display panel has the flat profile at least in part by generating other captured flat panel image data comprising a third grayscale level indicative of brightness level sensed at the pixel position corresponding with the display pixel; and
capture a fourth picture of the calibration image displayed on the display panel using the other panel brightness setting while the display panel has the curved profile at least in part by generating other captured curved panel image data comprising a fourth grayscale level indicative of brightness level sensed at the pixel position corresponding with the display pixel; and
a calibration device configured to:
calibrate a first compensation factor to be subsequently applied to process image data corresponding with image content to be displayed on a curved display panel based at least in part on a ratio of the first grayscale level indicated in the captured flat panel image data to the second grayscale level indicated in the captured curved panel image data;
calibrate a compensation factor map associated with the specific panel brightness setting at least in part by explicitly associating the pixel position of the display pixel with the first compensation factor;
calibrate another compensation factor to be subsequently applied to process image data corresponding with image content to be displayed on the curved display panel using the other panel brightness setting; and
calibrate another compensation factor map associated with the other panel brightness setting at least in part by explicitly associating the pixel position of the display pixel with the other compensation factor.

14. A calibration system comprising:
a display panel, wherein the display panel comprises a display pixel;
one or more image sensors oriented facing a viewing surface of the display panel, wherein the one or more image sensors are configured to:
capture a first picture of a calibration image displayed on the display panel using a first panel brightness setting while the display panel has a flat profile at least in part by generating captured flat panel image data comprising a first grayscale level indicative of brightness level sensed at a pixel position corresponding with the display pixel; and
capture a second picture of the calibration image displayed on the display panel using the first panel brightness setting while the display panel has a curved profile at least in part by generating captured curved panel image data comprising a second grayscale level indicative of brightness level sensed at the pixel position corresponding with the display pixel; and
a calibration device configured to:
calibrate a first compensation factor to be subsequently applied to process image data corresponding with image content to be displayed on a curved display panel based at least in part on a ratio of the first grayscale level indicated in the captured flat panel image data to the second grayscale level indicated in the captured curved panel image data;
determine a light emission upper limit of the display pixel;
determine whether application of the ratio of the first grayscale level indicated in the captured flat panel image data to the second grayscale level indicated in the captured curved panel image data to a maximum grayscale level results in a target light emission magnitude that exceeds the light emission upper limit of the display pixel; and
set the first compensation factor as the ratio of the first grayscale level indicated in the captured flat panel image data to the second grayscale level indicated in the captured curved panel image data when application of the ratio to the maximum grayscale level does not result in the target light emission magnitude exceeding the light emission upper limit of the display pixel.

15. A calibration system comprising:
a display panel, wherein the display panel comprises a display pixel;
one or more image sensors oriented facing a viewing surface of the display panel, wherein the one or more image sensors are configured to:
capture a first picture of a calibration image displayed on the display panel using a first panel brightness setting while the display panel has a flat profile at least in part by generating captured flat panel image data comprising a first grayscale level indicative of brightness level sensed at a pixel position corresponding with the display pixel; and
capture a second picture of the calibration image displayed on the display panel using the first panel brightness setting while the display panel has a curved profile at least in part by generating captured curved panel image data comprising a second grayscale level indicative of brightness level sensed at the pixel position corresponding with the display pixel; and
a calibration device configured to:
calibrate a first compensation factor to be subsequently applied to process image data corresponding with image content to be displayed on a curved display panel based at least in part on a ratio of the first grayscale level indicated in the captured flat panel image data to the second grayscale level indicated in the captured curved panel image data;

determine a light emission upper limit of the display pixel;

determine whether application of the ratio of the first grayscale level indicated in the captured flat panel image data to the second grayscale level indicated in the captured curved panel image data to a maximum grayscale level results in a target light emission magnitude that exceeds the light emission upper limit of the display pixel;

set the first compensation factor as the ratio of the first grayscale level indicated in the captured flat panel image data to the second grayscale level indicated in the captured curved panel image data when application of the ratio to the maximum grayscale level does not result in the target light emission magnitude exceeding the light emission upper limit of the display pixel;

when application of the ratio to the maximum grayscale level results in the target light emission magnitude exceeding the light emission upper limit, determine a scaling factor that when applied to the target light emission magnitude results in the target light emission magnitude matching the light emission upper limit; and when application of the ratio to the maximum grayscale level results in the target light emission magnitude exceeding the light emission upper limit, set the first compensation factor at least in part by applying the scaling factor to the ratio of the first grayscale level indicated in the captured flat panel image data to the second grayscale level indicated in the captured curved panel image data.

16. A calibration system comprising:

a display panel, wherein the display panel comprises a display pixel;

one or more image sensors oriented facing a viewing surface of the display panel, wherein the one or more image sensors are configured to:

capture a first picture of a calibration image displayed on the display panel using a first panel brightness setting while the display panel has a flat profile at least in part by generating captured flat panel image data comprising a first grayscale level indicative of brightness level sensed at a pixel position corresponding with the display pixel;

capture a second picture of the calibration image displayed on the display panel using the first panel brightness setting while the display panel has a curved profile at least in part by generating captured curved panel image data comprising a second grayscale level indicative of brightness level sensed at the pixel position corresponding with the display pixel;

capture a third picture of the calibration image displayed on the display panel using a second panel brightness setting while the display panel has a flat profile at least in part by generating other captured curved panel image data comprising a third grayscale level indicative of brightness level sensed at the pixel position corresponding with the display pixel; and capture a fourth picture of the calibration image displayed on the display panel using the second panel brightness setting while the display panel has a curved profile at least in part by generating other captured curved panel image data comprising a fourth grayscale level indicative of brightness level sensed at the pixel position corresponding with the display pixel; and a calibration device configured to calibrate:

a first compensation factor to be subsequently applied to process image data corresponding with image content to be displayed on a curved display panel based at least in part on a ratio of the first grayscale level indicated in the captured flat panel image data to the second grayscale level indicated in the captured curved panel image data;

a first compensation factor map associated with the first panel brightness setting at least in part by explicitly associating the pixel position of the display pixel with the first compensation factor;

a second compensation factor to be subsequently applied to process image data corresponding with image content to be displayed on the curved display panel using the second panel brightness setting; and a second compensation factor map associated with the second panel brightness setting at least in part by explicitly associating the pixel position of the display pixel with the second compensation factor.

* * * * *